(12) United States Patent
Shimizu et al.

(10) Patent No.: US 11,850,940 B2
(45) Date of Patent: Dec. 26, 2023

(54) DISPLAY CONTROL DEVICE AND NON-TRANSITORY COMPUTER-READABLE STORAGE MEDIUM FOR DISPLAY CONTROL ON HEAD-UP DISPLAY

(71) Applicant: DENSO CORPORATION, Kariya (JP)

(72) Inventors: Yasuhiro Shimizu, Kariya (JP); Akihiko Yagyu, Kariya (JP); Daisuke Takemori, Kariya (JP); Kazuki Kojima, Kariya (JP); Shiori Maneyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 87 days.

(21) Appl. No.: 17/453,419

(22) Filed: Nov. 3, 2021

(65) Prior Publication Data

US 2022/0055481 A1 Feb. 24, 2022

Related U.S. Application Data

(63) Continuation of application No. PCT/JP2020/012620, filed on Mar. 23, 2020.

(30) Foreign Application Priority Data

May 8, 2019 (JP) ................................ 2019-088606
Mar. 11, 2020 (JP) ................................ 2020-042187

(51) Int. Cl.
*B60K 35/00* (2006.01)
*G02B 27/01* (2006.01)
(Continued)

(52) U.S. Cl.
CPC .......... *B60K 35/00* (2013.01); *G02B 27/0101* (2013.01); *G09G 3/002* (2013.01);
(Continued)

(58) Field of Classification Search
CPC ............ B60K 35/00; B60K 2370/1529; B60K 2370/166; G02B 27/0101; G02B 2027/0141; G09G 3/002; G09G 2340/0464; G09G 2340/12; G09G 2380/10; B60W 30/12; B60W 50/14; B60W 30/095;
(Continued)

(56) References Cited

U.S. PATENT DOCUMENTS

2016/0327402 A1 11/2016 Funabiki et al.
2017/0212513 A1* 7/2017 Iida .......................... B62D 6/00
(Continued)

FOREIGN PATENT DOCUMENTS

JP 2016145783 A 8/2016
JP 2016-182891 A 10/2016
(Continued)

*Primary Examiner* — Douglas M Wilson
(74) *Attorney, Agent, or Firm* — Harness, Dickey & Pierce, P.L.C.

(57) ABSTRACT

In a display control device for a vehicle to control a display on a head-up display, when lane change information related to a lane change of the vehicle is acquired from a lane change control unit that controls the lane change of the vehicle, a lane change content indicating an estimated trajectory of the lane change is displayed to be superimposed on a road surface as a superimposition target based on the lane change information.

29 Claims, 49 Drawing Sheets

(51) Int. Cl.
  *G09G 3/00* (2006.01)
  *B60W 30/095* (2012.01)
  *G08G 1/16* (2006.01)
  *B60W 30/18* (2012.01)
  *B62D 15/02* (2006.01)
  *B60W 50/14* (2020.01)
  *B60W 30/12* (2020.01)

(52) U.S. Cl.
  CPC ................ *B60K 2370/1529* (2019.05); *B60K 2370/166* (2019.05); *B60W 30/095* (2013.01); *B60W 30/0953* (2013.01); *B60W 30/12* (2013.01); *B60W 30/18163* (2013.01); *B60W 50/14* (2013.01); *B62D 15/0255* (2013.01); *G02B 2027/0141* (2013.01); *G05D 2201/0213* (2013.01); *G08G 1/16* (2013.01); *G08G 1/167* (2013.01); *G09G 2340/0464* (2013.01); *G09G 2340/12* (2013.01); *G09G 2380/10* (2013.01)

(58) Field of Classification Search
  CPC ........ B60W 30/0953; B60W 30/18163; G08G 1/16; G08G 1/167; B62D 15/0255; G05D 2201/0213
  See application file for complete search history.

(56) References Cited

U.S. PATENT DOCUMENTS

| | | |
|---|---|---|
| 2017/0334460 A1 | 11/2017 | Arakawa et al. |
| 2018/0023970 A1 | 1/2018 | Iguchi |
| 2018/0058879 A1 | 3/2018 | Tayama et al. |
| 2018/0297611 A1 | 10/2018 | Fujisawa et al. |
| 2018/0299286 A1 | 10/2018 | Iguchi |
| 2019/0016338 A1* | 1/2019 | Ishioka .................. G08G 1/16 |
| 2019/0120646 A1 | 4/2019 | Iguchi |
| 2021/0003414 A1* | 1/2021 | Yamaguchi .......... G01C 21/365 |
| 2021/0016793 A1* | 1/2021 | Yamaguchi .......... G08G 1/0962 |
| 2022/0144297 A1* | 5/2022 | Seitz .................. G06V 20/588 |

FOREIGN PATENT DOCUMENTS

| | | |
|---|---|---|
| JP | 2017074918 A | 4/2017 |
| JP | 6387369 B2 | 9/2018 |
| WO | WO-2015118859 A1 | 8/2015 |
| WO | WO-2017/018192 A1 | 2/2017 |
| WO | WO-2019/004245 A1 | 1/2019 |

* cited by examiner

FIG. 14
<LTA TRANSITION DISPLAY>
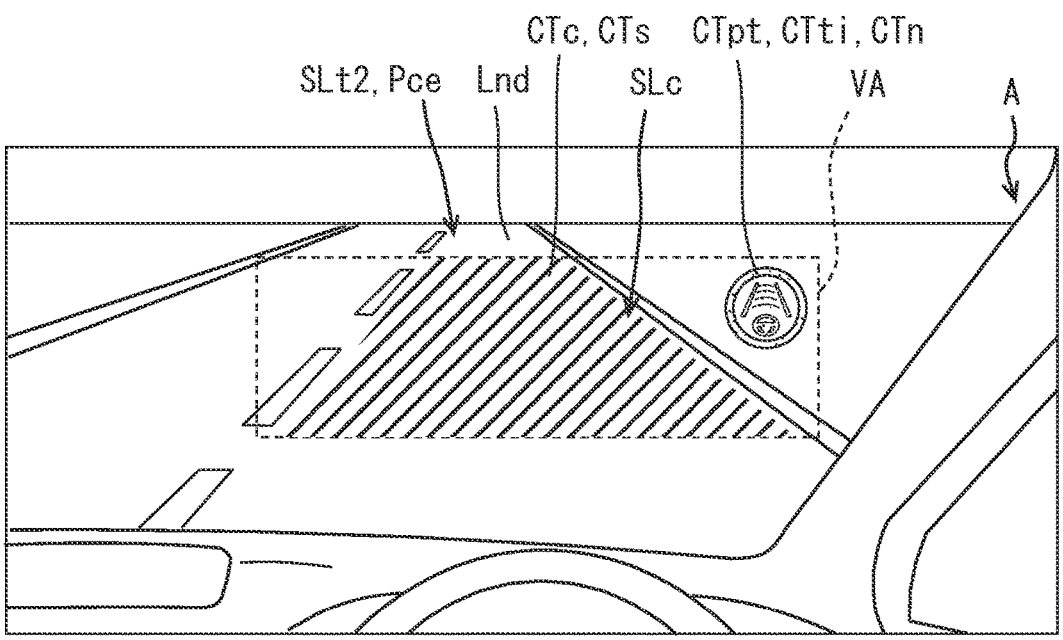
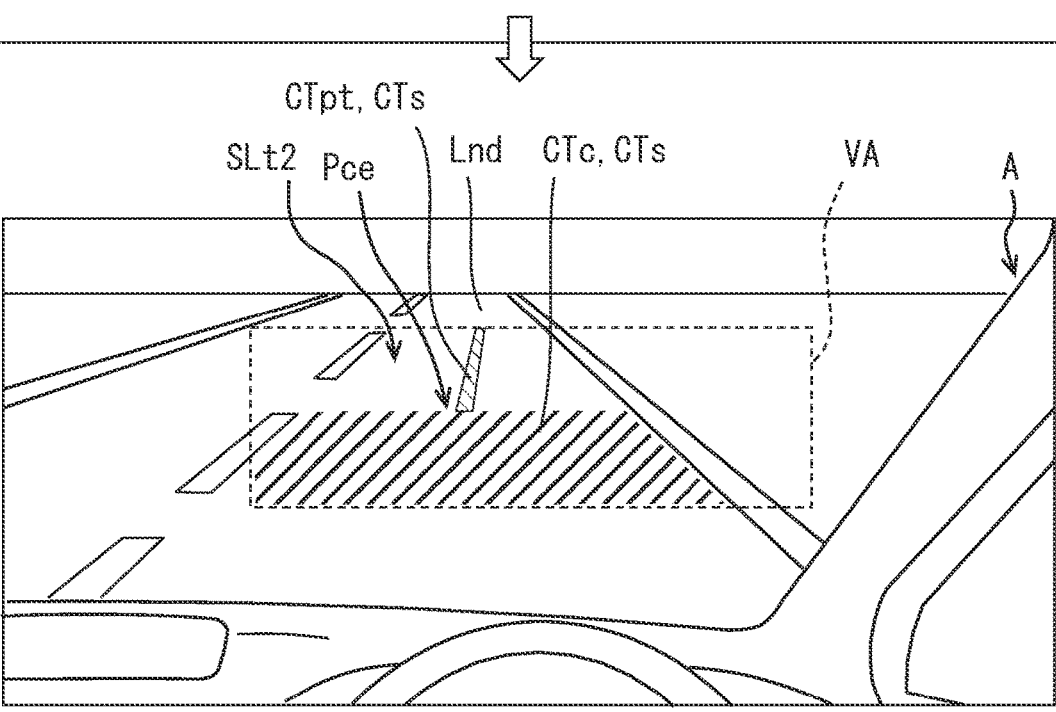

<LTA STANDBY DISPLAY>

<LTA EXECUTION DISPLAY>

<LCA ACCEPTANCE DISPLAY>

<LCA STANDBY DISPLAY>

<LTA STANDBY DISPLAY>

<LTA EXECUTION DISPLAY>

<LCA ACCEPTANCE DISPLAY>

Labels: Lns, CTt,CTs, CTa,CTn, Lnd, VA

<LCA STANDBY DISPLAY>

Labels: Lns, Pcs, CTt, SLc, CTpc,CTs, Lnd, VA, A

<LTA TRANSITION DISPLAY>

<LCA ACCEPTANCE DISPLAY>

<LCA STANDBY DISPLAY>

<LCA CANCELATION DISPLAY>

<LCA STANDBY DISPLAY>

<LCA STANDBY DISPLAY>

<LTA STANDBY DISPLAY>

DISPLAY CONTROL DEVICE AND NON-TRANSITORY COMPUTER-READABLE STORAGE MEDIUM FOR DISPLAY CONTROL ON HEAD-UP DISPLAY

CROSS REFERENCE TO RELATED APPLICATIONS

The present application is a continuation application of International Patent Application No. PCT/JP2020/012620 filed on Mar. 23, 2020, which designated the U.S. and claims the benefit of priority from Japanese Patent Application No. 2019-088606 filed on May 8, 2019 and Japanese Patent Application No. 2020-042187 filed on Mar. 11, 2020. The entire disclosures of all of the above applications are incorporated herein by reference.

TECHNICAL FIELD

The present disclosure relates to a display control device and a non-transitory computer-readable storage medium to control display on a head-up display.

BACKGROUND

For example, there is known a travel control device that automatically generates a trajectory of a lane change and automatically guides a subject vehicle to the destination of the lane change according to the generated trajectory. In such a travel control device, a real image generated from a view captured in front of the subject vehicle is displayed on a display instrument such as a meter or a navigation device. The travel control device superimposes on the real image displayed on the display instrument a guidance display indicating a start position and an end position of the lane change based on the automatic guidance and a guidance display indicating a traveling path to the start position of the lane change inside a lane.

SUMMARY

The present disclosure describes a display control device and a non-transitory computer-readable storage medium storing instructions for display control on a head-up display of a vehicle, which are capable of capable of presenting a lane change guidance in an easy-to-understand manner. A lane change content indicating an estimated trajectory of a lane change is displayed to be superimposed on a road surface as a superimposition target based on a lane change information acquired from a lane change control unit that controls the lane change of the vehicle.

BRIEF DESCRIPTION OF DRAWINGS

Features and advantages of the present disclosure will become more apparent from the following detailed description made with reference to the accompanying drawings, in which:

FIG. 14 is a diagram illustrating an LTA transition display;

DETAILED DESCRIPTION

Figure 1:
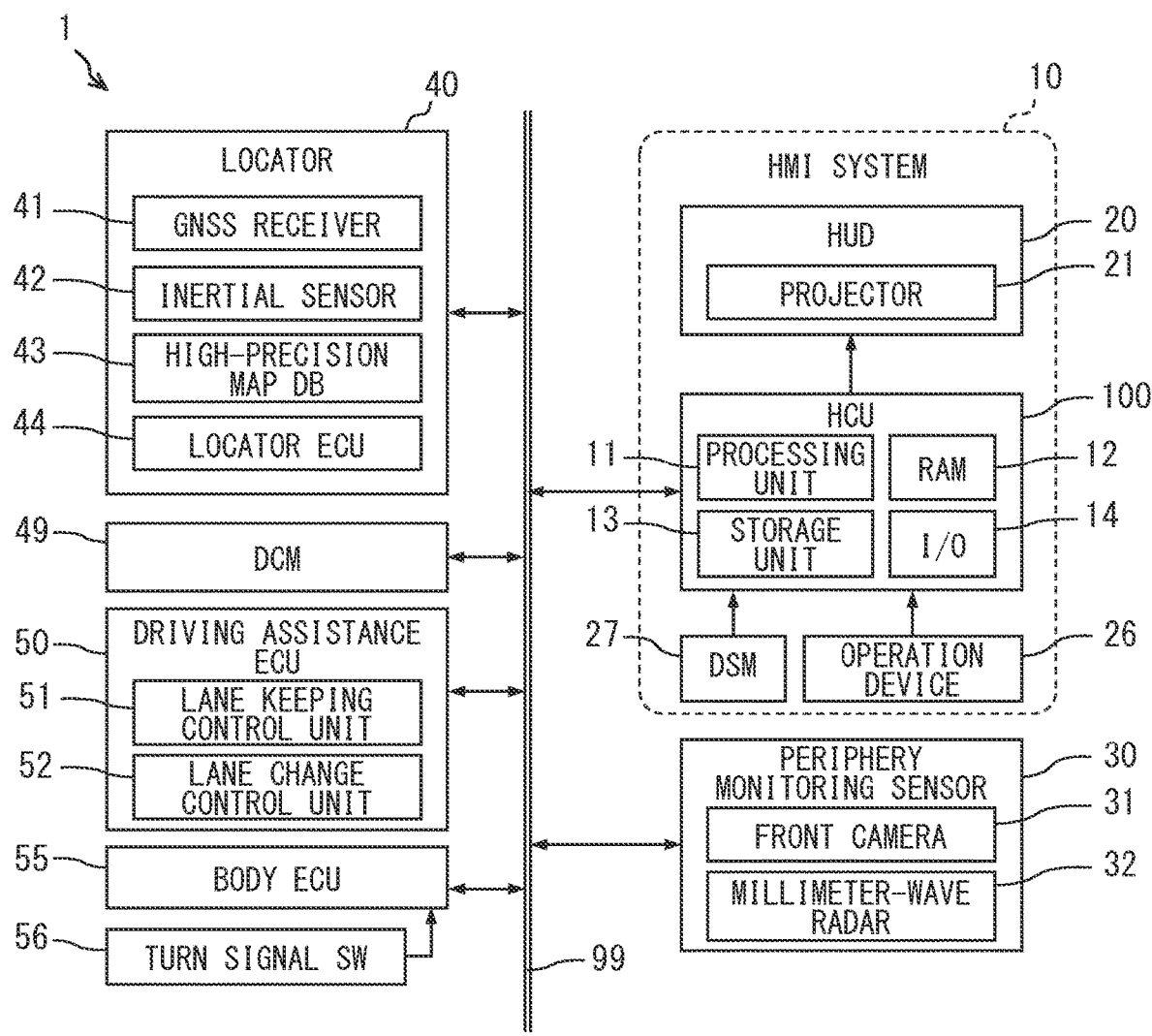
FIG. 1 is a diagram illustrating an overview of an in-vehicle network including a HCU according to a first embodiment of the present disclosure.

As an instrument to display a guidance for a lane change or a lane keeping, a head-up display can be adopted. However, if a screen display for a normal display is displayed as a virtual image using a head-up display, there is a fear that the guidance of the lane change and the guidance to travel inside the vehicle lane will not be easy to understand.

The present disclosure provides a display control device and a non-transitory computer-readable storage medium storing instructions, which are capable of presenting a lane change guidance in an easy-to-understand manner.

According to an aspect of the present disclosure, a display control device is used for a vehicle to control a display on a head-up display. The display control device includes a control information acquisition unit, a change information acquisition unit, and a display control unit. The control information acquisition unit acquires driving control information related to a driving control of the vehicle, from a lane keeping control unit that controls an in-lane traveling of the vehicle to cause the vehicle to travel in a lane. The change information acquisition unit acquires lane change information related to a lane change of the vehicle, from a lane change control unit that controls the lane change of the vehicle. The display control unit displays an estimated trajectory content indicating an estimated trajectory of the in-lane traveling to be superimposed on a road surface as a superimposition target, based on the driving control information. When acquiring the lane change information during the in-lane traveling, the display control unit displays a lane change content indicating an estimated trajectory of the lane change based on the lane change information.

For example, the display control unit may display the lane change content indicating the estimated trajectory of the lane change to be superimposed on the road surface and to be integrally continuous with the estimated trajectory content.

According to an aspect of the present disclosure, a display control program is used in a vehicle to control display on a head-up display, and the program causes one or more processors to perform a process including: acquiring driving control information related to a driving control of the vehicle from a lane keeping control unit that controls an in-lane traveling of the vehicle to cause the vehicle to travel in a lane; displaying an estimated trajectory content indicating an estimated trajectory of the in-lane traveling to be superimposed on a road surface as a superimposition target; acquiring lane change information related to a lane change of the vehicle from a lane change control unit that controls the lane change of the vehicle; and displaying a lane change content indicating an estimated trajectory of the lane change together with the estimated trajectory content based on the lane change information, when the lane change information is acquired during the in-lane traveling.

According to an aspect of the present disclosure, a non-transitory computer-readable storage medium stores program instructions for controlling a head-up display of a vehicle, and the program instructions are configured to cause one or more processors to: acquire driving control information related to a driving control of the vehicle, from a lane keeping control unit that controls an in-lane traveling of the vehicle to cause the vehicle to travel in a lane; display an estimated trajectory content indicating an estimated trajectory of the in-lane traveling to be superimposed on a road surface as a superimposition target, based on the driving control information; acquire lane change information related to a lane change of the vehicle from a lane change control unit that control the lane change of the vehicle; and, in response to acquiring the lane change information during the in-lane traveling, display a lane change content indicating an estimated trajectory of the lane change together with the estimated trajectory content, based on the lane change information.

These aspects display the lane change content indicating the estimated trajectory of the lane change in addition to the estimated trajectory content displayed to be superimposed on the road surface, when the vehicle is transitioned from the in-lane traveling by the lane keeping control unit to the lane change by the lane change control unit. As described above, when the lane change content and the estimated trajectory content include a superimposition content specifying the superimposition target, a driver can understand a transition schedule of the control based on a change in display recognized through a normal visual action. In such a case, it is possible to provide easy-to-understand guidance for the in-lane traveling and the lane change.

According to an aspect of the present disclosure, a display control device is used for a vehicle to control a display on a head-up display, includes a control information acquisition unit, a change information acquisition unit, and a display control unit. The control information acquisition unit acquires driving control information related to a driving control of the vehicle, from a lane keeping control unit that controls an in-lane traveling of the vehicle to cause the vehicle to travel in a lane. The change information acquisition unit acquires lane change information related to a lane change of the vehicle, from a lane change control unit that controls the lane change of the vehicle. The display control unit displays an estimated trajectory content indicating an estimated trajectory of the in-lane traveling to be superimposed on a road surface as a superimposition target, based on the driving control information. When acquiring the lane change information during the in-lane traveling, the display control unit begins to display a lane change content indicating an estimated trajectory of the lane change based on the lane change information, after terminating display of the estimated trajectory content.

For example, the display control unit may display the estimated trajectory content indicating the estimated trajectory of the in-lane traveling to be superimposed only on a road surface of a subject vehicle lane on which the vehicle is currently traveling, without displaying on a road surface of an adjacent lane as a destination lane of the lane change. Also, the display control unit may display the lane change content indicating the estimated trajectory of the lane change only on the road surface of the adjacent lane.

According to an aspect of the present disclosure, a display control program is used in a vehicle to control display on a head-up display, and the program causes one or more processors to perform a process including: acquiring driving control information related to a driving control of the vehicle from a lane keeping control unit that controls an in-lane traveling of the vehicle to cause the vehicle to travel in a lane; displaying an estimated trajectory content indicating an estimated trajectory of the in-lane traveling to be superimposed on a road surface as a superimposition target, based on the driving control information; acquiring a lane change information related to a lane change of the vehicle from a lane change control unit that controls the lane change of the vehicle; and, in response to acquiring the lane change information during the in-lane traveling, begins to display a lane change content indicating an estimated trajectory of the lane change based on the lane change information, after terminating display of the estimated trajectory content.

According to an aspect of the present disclosure, a non-transitory computer-readable storage medium stores program instructions for controlling a head-up display of a vehicle, and the program instructions are configured to cause one or more processors to: acquire driving control information related to a driving control of the vehicle from a lane keeping control unit that controls an in-lane traveling of the vehicle to cause the vehicle to travel in a lane; display an estimated trajectory content indicating an estimated trajectory of the in-lane traveling to be superimposed on a road surface as a superimposition target, based on the driving control information; acquire a lane change information related to a lane change of the vehicle from a lane change control unit that controls the lane change of the vehicle; and, in response to acquiring the lane change information during the in-lane traveling, begins to display a lane change content indicating an estimated trajectory of the lane change based on the lane change information, after terminating display of the estimated trajectory content.

These aspects display the lane change content indicating the estimated trajectory of the lane change to be superimposed on the road surface, in place of the estimated trajectory content, when the vehicle is transitioned from the in-lane traveling by the lane keeping control to the lane change by the lane change control unit. As described above, if the lane change content and the estimated trajectory content are displayed in sequence, a driver can recognize the transition schedule of the control from a change in display recognized through a normal visual action. In such a case, it is possible to provide easy-to-understand guidance for the in-lane traveling and the lane change.

According to an aspect of the present disclosure, a display control device for a vehicle to control a display on a head-up display, includes a change information acquisition unit and a display control unit. The change information acquisition unit acquires lane change information related to a lane change of the vehicle, from a lane change control unit that controls the lane change of the vehicle. The display control unit displays a lane change content indicating an estimated trajectory of the lane change to be superimposed on a road surface as a superimposition target, based on the lane change information, in response to acquiring the lane change information. When an execution section of the lane change by the lane change control unit is within an angle of view of the head-up display, the display control unit may display the lane change content to be superimposed on the road surface including at least a part of the execution section. When the execution section is outside the angle of view, the display control unit may display a change standby content indicating that the lane change is to be performed in a mode different from the lane change content that is displayed when the execution section is within the angle of view.

According to an aspect of the present disclosure, a non-transitory computer-readable storage medium stores program instructions for controlling a head-up display of a vehicle, and the program instructions are configured to cause one or more processors to: acquire lane change information related to a lane change of the vehicle from a lane change control unit that control the lane change of the vehicle; and, in response to acquiring the lane change information, display a lane change content indicating an estimated trajectory of the lane change to be superimposed on a road surface as a superimposition target, based on the lane change information. When an execution section of the lane change by the lane change control unit is within an angle of view of the head-up display, the lane change content may be displayed to superimpose on the road surface including at least a part of the execution section. When the execution section is outside the angle of view, a change standby content indicating that the lane change is to be performed may be displayed in a mode different from the lane change content that is displayed when the execution section is within the angle of view.

Hereinafter, a plurality of embodiments of the present disclosure will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined even if the combinations are not explicitly shown if there is no problem in the combination in particular. Unspecified combinations of the configurations described in the plurality of embodiments and the modification examples are also disclosed in the following description.

First Embodiment

Figure 2:
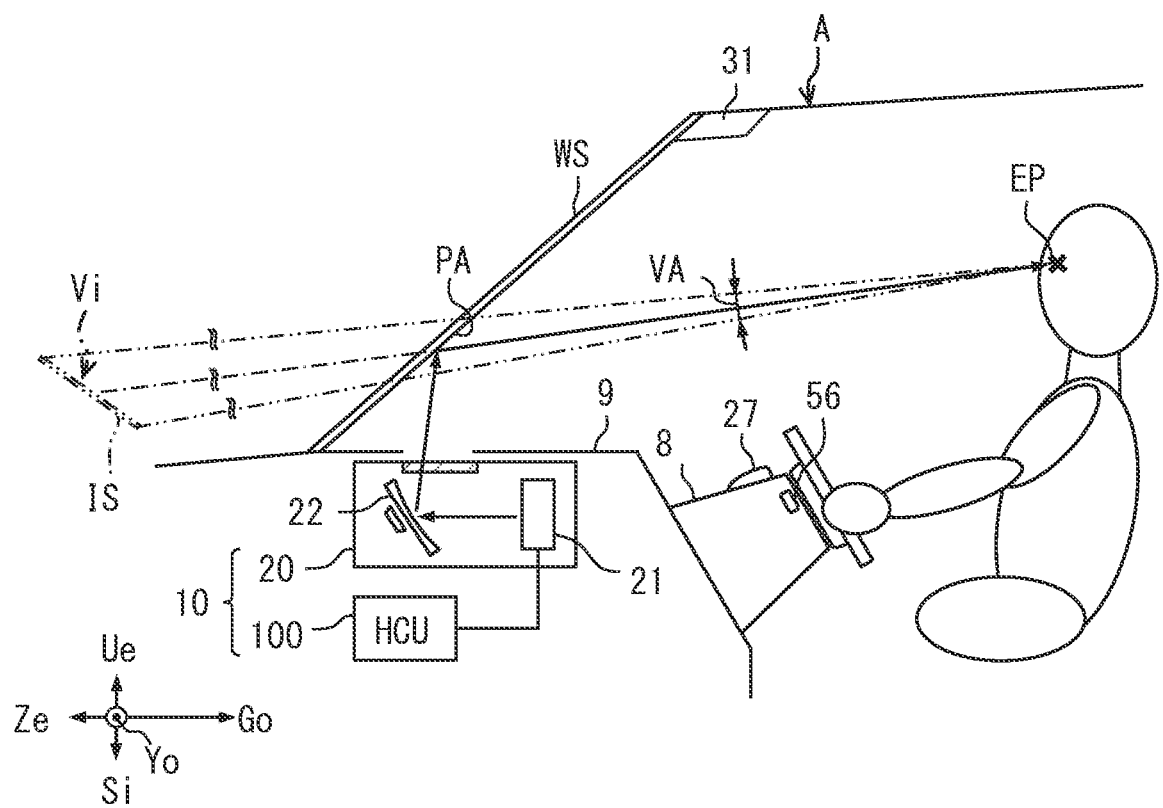
FIG. 2 is a diagram illustrating a head-up display mounted on a vehicle.
Figure 3:
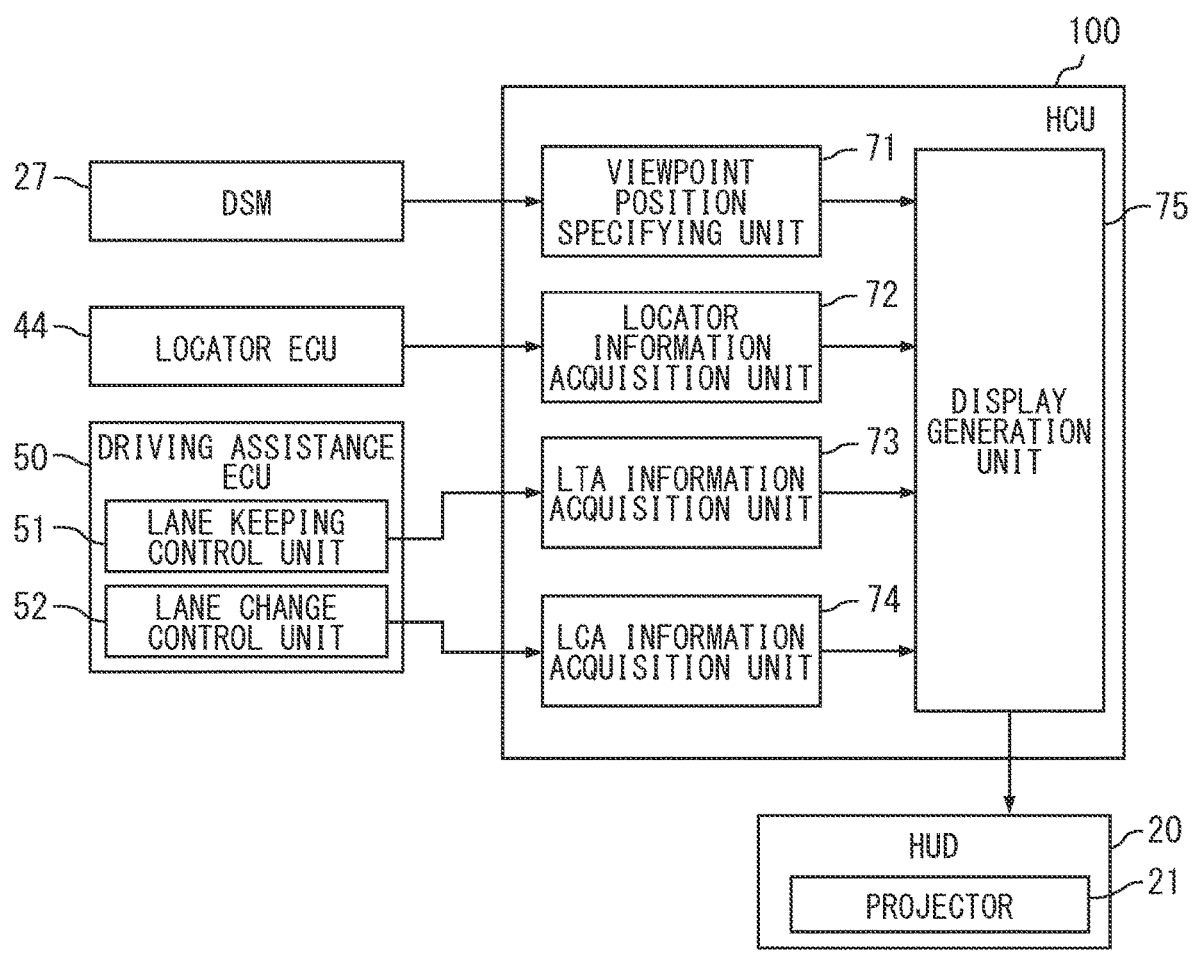
FIG. 3 is a diagram illustrating a schematic configuration of the HCU.

Functions of a display control device according to a first embodiment of the present disclosure is provided by a human machine interface (HMI) control unit 100 shown in FIGS. 1 to 3. Hereinafter, the HMI control unit 100 is also referred to as an HCU 100. The HCU 100 constitutes a human machine interface (HMI) system 10 used in a vehicle A together with a head-up display (hereinafter, HUD) 20 and the like. In addition, the HMI system 10 further includes an operation device 26, a driver status monitor (hereinafter, DSM) 27, and the like. The HMI system 10 has an input interface function that accepts a user's operation made by an occupant (for example, a driver) of the vehicle A, and an output interface function that presents information to the driver.

The HMI system 10 is communicably connected to a communication bus 99 of an in-vehicle network 1 mounted on the vehicle A. The HMI system 10 is one of multiple nodes included in the in-vehicle network 1. A periphery monitoring sensor 30, a locator 40, a data communication module (DCM) 49, and the like are connected to the communication bus 99 of the vehicle-mounted network 1 as nodes. Further, a driving assistance electronic control unit (ECU) 50, a body ECU 55, and the like are connected to the communication bus 99 as nodes. These nodes connected to the communication bus 99 can communicate with one another. The specific nodes of these devices and ECUs may be electrically, directly connected to each other to communicate with each other without passing through the communication bus 99.

In the following description, a front-rear direction (see FIG. 2, Ze corresponding to forward, and Go corresponding to rearward) and a left-right (see FIG. 2, Yo corresponding to sideways) are defined with reference to the vehicle A motionlessly stationed on a horizontal plane. Specifically, the front-rear direction is defined along the longitudinal direction (traveling direction) of the vehicle A. The left-right direction is defined along a width direction of the vehicle A. Further, a vertical direction (see FIG. 2, Ue corresponding to upward and Si corresponding to downward) is defined along a direction vertical to the horizontal plane that defines the front-rear direction and the left-right direction. Further, for the sake of simplification of the description, the description of the reference numeral indicating each direction may be omitted as appropriate.

The periphery monitoring sensor 30 is an autonomous sensor that monitors a peripheral environment of the vehicle A. The periphery monitoring sensor 30 can detect moving objects and stationary objects in a detection range around the subject vehicle. The moving objects include pedestrians, cyclists, non-human animals, and other vehicles, for example. The stationary objects include falling objects on the road, guardrails, curbs, road signs, road markings such as road lane lines, and structures beside the road, for example. The periphery monitoring sensor 30 provides detection information of detecting an object around the vehicle A to the driving assistance ECU 50 and the like via the communication bus 99.

The periphery monitoring sensor 30 includes a front camera 31, a millimeter wave radar 32, and the like as detection configurations for object detection. The front camera 31 outputs at least one of image data obtained by photographing the front range of the vehicle A and an analysis result of the image data, as detection information. The multiple millimeter wave radars 32 are arranged, for example, on the front and rear bumpers of the vehicle A at intervals from each other. The millimeter wave radar 32 emits millimeter waves or quasi-millimeter waves toward a front range, a front side range, a rear range, a rear side range, or the like of the vehicle A. The millimeter wave radar 32 generates detection information by a process of receiving reflected waves reflected by moving objects, stationary objects, or the like. The periphery monitoring sensor 30 may include detection configurations such as a lidar and a sonar.

The locator 40 generates highly accurate position information of the vehicle A by a complex positioning method that combines multiple types and pieces of acquired information. The locator 40 can specify a travelling lane on which the vehicle A travels among multiple lanes. The locator 40 includes a global navigation satellite system (GNSS) receiver 41, an inertial sensor 42, a high-precision map database (hereinafter, high-precision map DB) 43, and a locator ECU 44. The locator 40 may include other sensor configurations such as an electronic compass.

The GNSS receiver 41 receives positioning signals transmitted from multiple artificial satellites, such as positioning satellites. The GNSS receiver 41 is capable of receiving positioning signals from respective positioning satellites of at least one satellite positioning system among multiple satellite positioning systems such as GPS, GLONASS, Galileo, IRNSS, QZSS, and Beidou.

The inertial sensor 42 includes a gyro sensor and an acceleration sensor, for example. The high-precision map DB 43 is mainly composed of a non-volatile memory, and stores map data (hereinafter, high-precision map data) having higher accuracy than ordinary map data used for navigation. The high-precision map data holds detailed information at least for information in the height (z) direction. The high-precision map data contains information that can be used for advanced driving assistance and automated driving, such as three-dimensional shape information about roads, information about the number of lanes, and information indicating a travelling direction allowed for each lane.

The locator ECU 44 mainly includes a microcomputer equipped with a processor, RAM, a storage unit, an input/output interface, and a bus connecting these elements. The locator ECU 44 combines positioning signal received by the GNSS receiver 41, measurement result of the inertial sensor 42, vehicle speed information output to the communication bus 99, and the like, and successively specifies the position and the travelling direction of the vehicle A. The locator ECU 44 provides the position information and direction information of the vehicle A based on the positioning result to the driving assistance ECU 50, the HCU 100, and the like through the communication bus 99. In addition, in response to the request from the driving assistance ECU 50, the HCU 100 and the like, the locator ECU 44 reads a corresponding high-precision map data from the high-precision map DB 43, and provides the data to the ECU as a request source.

The DCM 49 is a communication module mounted on the vehicle A. The DCM 49 transmits and receives radio waves to and from base stations around the vehicle A by wireless communication compliant with communication standards such as long term evolution (LTE) and 5G. The DCM 49, when mounted, enables the vehicle A to be connect to the Internet. The DCM 49 can acquire the latest high-precision map data from a cloud-based probe server. The DCM 49 cooperates with the locator ECU 44 to update the high-precision map data stored in the high-precision map DB 43 to the latest information.

The driving assistance ECU 50 mainly includes a computer equipped with a processor, RAM, a storage unit, an input/output interface, a bus connecting these elements, and the like. The driving assistance ECU 50 has a driving assistance function to assist the driving operation of a driver. The driving assistance ECU 50 enables partial automated driving control (advanced driving assistance) of the level 2 or lower in the automatic driving level specified by Society of Automotive Engineers.

The driving assistance ECU 50 recognizes the driving environment around the vehicle A for the driving control described later based on the detection information acquired from the peripheral monitoring sensor 30. The driving assistance ECU 50 provides the HCU 100 with the result of the analysis of the detection information performed by the driving environment recognition as the analyzed detection information. The driving assistance ECU 50 provides the HCU 100 with information (hereinafter, boundary information) indicating the relative positions and shapes of the left and right lane markings (or road edges) of the lane on which the vehicle A is currently traveling (hereinafter, subject vehicle lane Lns, see FIG. 7). As described above, the left-right direction referred herein is a direction that coincides with the width direction of the vehicle A stationary on the horizontal plane, and is set with reference to the traveling direction of the vehicle A.

The driving assistance ECU 50 has a plurality of functional units that realize advanced driving assistance by executing a program by a processor. Specifically, the driving assistance ECU 50 includes an adaptive cruise control (ACC) unit, a lane keeping control unit 51, and a lane change control unit 52. The ACC control unit is a functional unit that realizes the function of ACC for driving the vehicle A at a constant speed as a target vehicle speed or for driving the vehicle A to follow a leading vehicle while maintaining an inter-vehicular distance from the leading vehicle. The ACC control unit successively provides the HCU 100 with ACC status information indicating the operating state of the ACC function.

Figure 4:
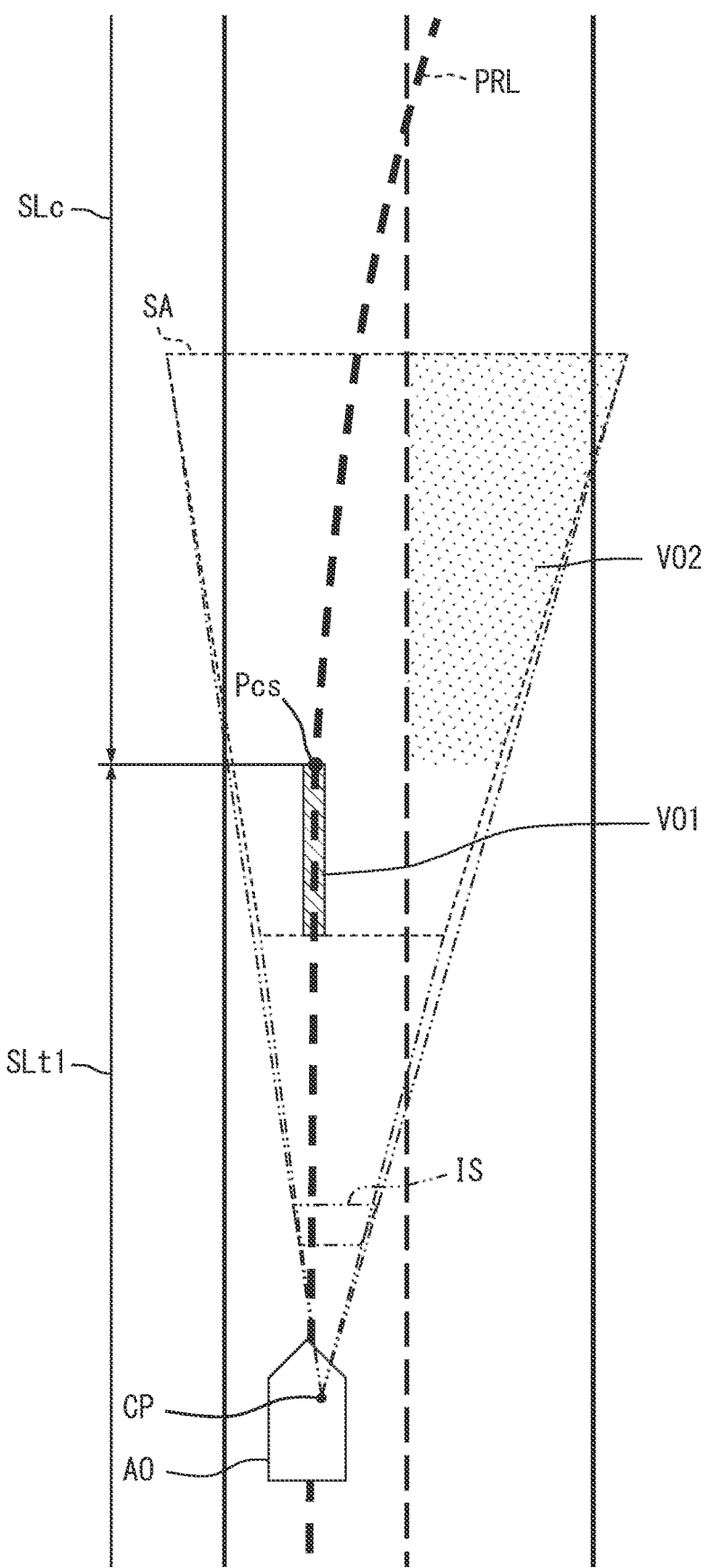
FIG. 4 is a diagram visually illustrating simulation of a display layout provided by a display generation unit.
Figure 5:
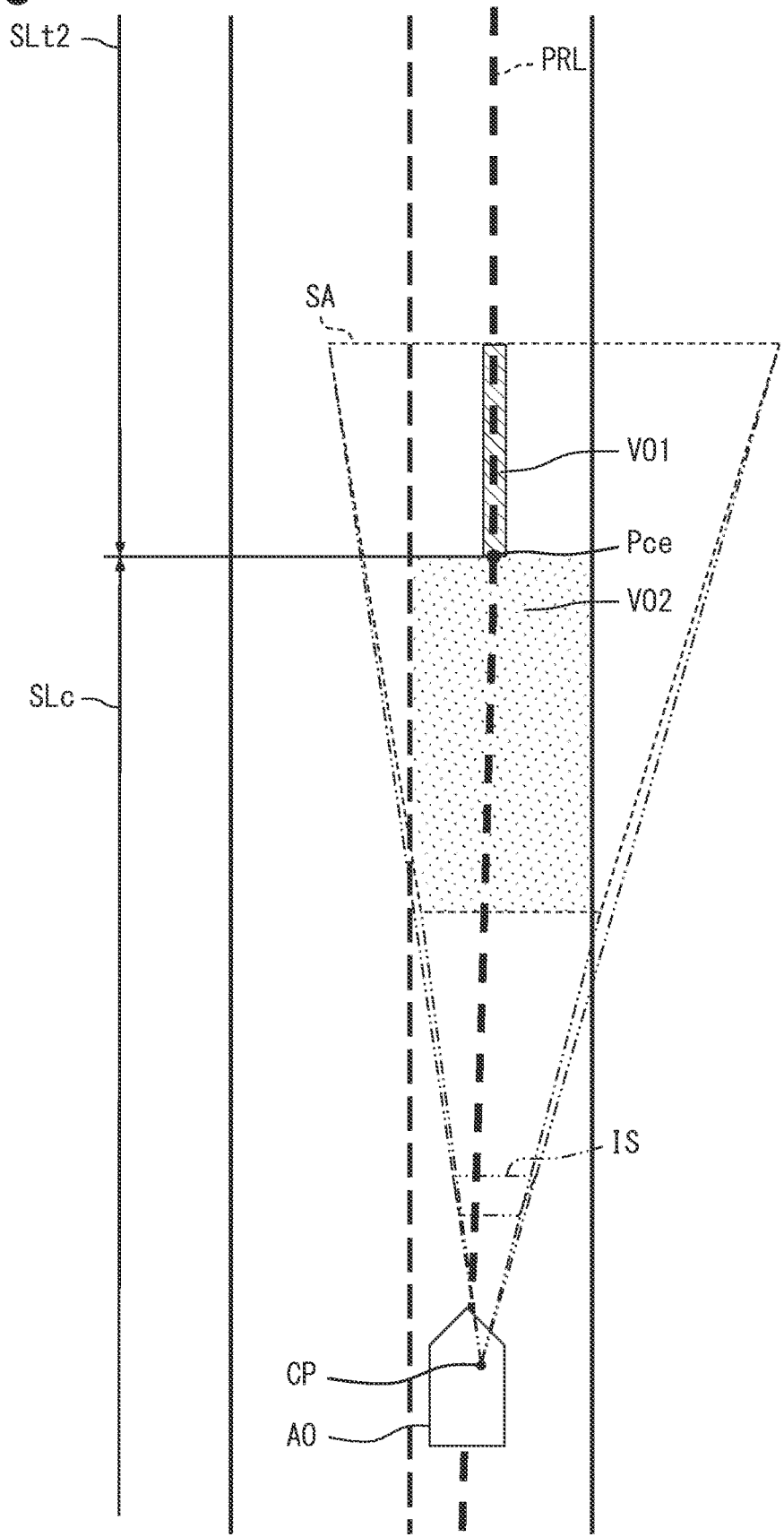
FIG. 5 is a diagram visually illustrating simulation of a display layout provided by the display generation unit.

The lane keeping control unit 51 is a functional unit that realizes the function of lane tracing assist (LTA) that controls the vehicle to travel in a lane. The LTA is also referred to as a lane trace control (LTC). The lane keeping control unit 51 controls the steering angle of the steering wheel of the vehicle A based on the boundary information extracted from the image data of the front camera 31 and the like. The lane keeping control unit 51 generates a scheduled traveling line PRL (see FIGS. 4 and 5) having a shape along the subject vehicle lane Lns so that the vehicle A travels in the center of the subject vehicle lane Lns (see FIG. 7). The lane keeping control unit 51 cooperates with the ACC control unit to perform a driving control that controls the vehicle A to travel within the subject vehicle lane Lns (hereinafter referred to as in-lane traveling or lane keeping) along the scheduled traveling line PRL. The driving control is referred to as a lane keeping control or a lane tracing control.

When the LTA function is activated, for example, by a user's operation on the operation device 26, the lane keeping control unit 51 successively provides the HCU 100 with driving control information (hereinafter, LTA information) relating to the driving control of the in-lane traveling. The LTA information includes at least status information and line shape information.

The status information is information indicating whether the activation state of the LTA function is any of a standby state, an executing state, and an executable state. In the standby state, the search for a lane marking or a roadside is continuously carried out. On the other hand, the driving control for the in-lane traveling is not executed (started) in the standby state. The executing state is s state in which the lane marking or the roadside is recognized and the driving control is being executed. The executable state is a state in which the driving control for the in-lane traveling is temporarily interrupted because the lane change control unit 52 executes the lane change, which will be described later. In the executable state, a lane marking or a roadside is recognized. Therefore, if the lane keeping control unit 51 is in the executable state, the driving control for the in-lane traveling can be restarted after the lane change is completed. The status information indicating the executable state is the LTA information related to the driving control after the lane change is completed.

The line shape information is information indicating the shape of the schedules traveling line PRL. Based on the line shape information, the HCU 100 can restore the shape of the scheduled traveling line PRL. As an example, the line shape information may be in a data format that includes at least the three-dimensional coordinates of a plurality of specific points that define the shape of the scheduled traveling line PRL, the length and the radius of curvature of a virtual line connecting the specific points, and the like. As another example, the line shape information may be in a data format that includes a large number of coordinate information that defines points lined up on the scheduled traveling line PRL at predetermined intervals.

The lane change control unit 52 is a functional unit that realizes the function of lane change assist (LCA) that controls the lane change of the vehicle. The lane change control unit 52 activates the LCA function when the driver inputs an on operation (described later) instructing the execution of the lane change by the driving assistance function. The LCA function can be used only when the LTA function is in the activated state. The lane change control unit 52 automatically controls the steering angle of the steering wheel of the vehicle A to move the vehicle A from the subject vehicle lane Lns to an adjacent lane. At this time, the lane change control unit 52 temporarily shifts the LTA function by the lane keeping control unit 51 to the standby state (or the executable state) to temporarily interrupt the driving control for the in-lane traveling, thereby to allow movement of the vehicle A to the adjacent lane while departing from the subject vehicle lane Lns. When the lane change control unit 52 completes the lane change, the lane change control unit 52 transitions to the off state. As a result, the lane keeping control unit 51 transitions from the executable state to the executing state, and restarts the driving control for the in-lane traveling.

The lane change control unit 52 generates a scheduled traveling line PRL (see FIGS. 4 and 5) from the subject vehicle lane Lns to the adjacent lane as a destination of the lane change (hereinafter referred to as the destination lane Lnd, see FIG. 8). The lane change control unit 52 executes a lane change from the subject vehicle lane Lns to the destination lane Lnd according to the scheduled traveling line PRL. The scheduled traveling line PRL for the lane change is generated in a shape continuous from the scheduled traveling line PRL for the in-lane traveling generated by the lane keeping control unit 51.

In the automated lane change by the lane change control unit 52, the lateral acceleration or the moving speed has an upper limit. Therefore, the shape of the scheduled traveling line PRL indicated by the trajectory shape information becomes longer along the extending direction of the road as the traveling speed indicated by the vehicle speed information increases. As such, the distance required for changing lanes (see FIGS. 4 and 5, LC execution section SLc described later) also becomes long.

When the LCA function is activated in accordance with the on operation, the lane change control unit 52 successively provides the HCU 100 with lane change information (hereinafter, LCA information) relating to the lane change. Similar to the LTA information, the LCA information also includes at least status information in addition to the line shape information. Further, the LCA information may additionally include input information of the on operation and input information of a cancelation operation for canceling the on operation.

The status information is information indicating whether the activation state of the LCA function is any of a start-up state, a standby state, and an execution state. The start-up state is the state immediately after the on operation is accepted. In the start-up state, it is checked whether or not another vehicle exists in the destination lane Lnd (see FIG. 8), which is the destination for changing lanes based on the detection information. Hereinafter, this check is referred to as a peripheral check. Other vehicles to be detected by the peripheral check are not limited to vehicles traveling in the destination lane Lnd, and may include a vehicle that can change lanes from an opposite lane, which is on the opposite side of the subject vehicle lane Lns across the destination lane Lnd, to the destination lane Lnd. When the peripheral check is finished, the activation state of the LCA function is set to either the standby state or the execution state. As a result of the peripheral check, if there is another vehicle that hinders the lane change of the subject vehicle, the LCA function enters the standby state. On the other hand, when there is no other vehicle that hinders the lane change of the subject vehicle, the activation state of the LCA function shifts from the start-up state or the standby state to the execution state in which the lane change is started.

The body ECU 55 mainly includes a microcontroller equipped with a processor, RAM, a storage unit, an input/output interface, and a bus connecting these elements. The body ECU 55 has at least a function of controlling the operation of a lighting device mounted on the vehicle A, such as a headlight and a turn signal. The body ECU 55 is electrically connected to a turn signal switch 56.

The turn signal switch 56 is a lever-shaped operation unit provided on a steering column unit 8. The body ECU 55 starts blinking one of the left and right turn signals corresponding to the operation direction applied to the turn signal switch 56, based on the detection of the user operation input to the turn signal switch 56. The turn signal switch 56 receives a normal user operation to start the blinking operation of the turn signal in the state of manual driving, as well as the on operation made to instruct the execution of the lane change control to the lane change control unit 52 in the state where the LTA function is in the activation state. As an example, a user operation in which the turn signal switch 56 is half-pressed for a predetermined time (for example, about 1 to 3 seconds) is regarded as the on operation for the LCA function. When detecting the input of the on operation of the LCA function, the body ECU 55 outputs the on operation information to the driving assistance ECU 50. By the on operation information, the fact that the on operation has been input and the left or right input direction of the on operation are notified as information related to the on operation. The operation of the turn signal switch 56 in the direction opposite to the on operation is regarded as the cancellation operation of the LCA function. Further, steering operation, accelerator operation, brake operation and the like exceeding a specific operation amount by the driver are also regarded as the cancellation operations of the LCA function.

Next, the operation device 26, the DSM 27, the HUD 20, and the HCU 100 included in the HMI system 10 will be described in detail in turn.

The operation device 26 is an input unit that accepts an operation of user, such as a driver. A user operation for switching between starting and stopping of such as a driving assistance function is input to the operation device 26. Specifically, the operation device 26 includes a steering switch provided on a spoke portion of the steering wheel, an operation lever provided on a steering column portion 8, and a voice input device for detecting the driver's voice or speech.

The DSM 27 includes a near-infrared light source, a near-infrared camera, and a control unit for controlling the near-infrared light source and the near-infrared camera. The DSM 27 is installed on the upper surface of the steering column portion 8 or the upper surface of the instrument panel 9, for example, so that the near-infrared camera faces the headrest portion of the driver's seat. The DSM 27 uses the near-infrared camera to capture the driver's head to which the near-infrared light is emitted from the near-infrared light source. The control unit applies image analysis to images captured by the near-infrared camera. The control unit extracts information such as positions and eye directions of the eye point EP from the captured image, and successively outputs the state information extracted to the HCU 100.

The HUD 20 is mounted on the vehicle A as one of the multiple in-vehicle display devices along with a meter display, a center information display, and the like. The HUD 20 is electrically connected to the HCU 100 and successively acquires video data generated by the HCU 100. Based on the video data, the HUD 20 presents various information related to the vehicle A, such as route information, sign information, and control information of each in-vehicle function, to the driver using the virtual image Vi.

The HUD 20 is accommodated in a housing space inside the instrument panel 9 below a windshield WS. The HUD 20 projects the light formed as a virtual image Vi toward the projection range PA of the windshield WS. The light projected on the windshield WS is reflected toward the driver's seat in the projection range PA and is perceived by the driver. The driver visually recognizes a display in which a virtual image Vi is superimposed on the foreground visible through the projection range PA.

The HUD 20 includes a projector 21 and a magnifying optical system 22. The projector 21 includes a liquid crystal display (LCD) panel and a backlight. The projector 21 is fixed to a housing of the HUD 20 so that the display surface of the LCD panel faces the magnifying optical system 22. The projector 21 displays each frame image of the video data on the display surface of the LCD panel, and illuminates the display surface with the backlight that transmits the display surface. Thus, the light formed as a virtual image Vi is emitted toward the magnifying optical system 22. The magnifying optical system 22 includes at least one concave mirror in which metal such as aluminum is vapor-deposited on a surface of base material made of, such as synthetic resin or glass. The magnifying optical system 22 projects the light emitted from the projector 21 on an upper projection range PA while spreading the light by reflection.

The HUD 20 is given the angle of view VA. When a virtual range in the space where the virtual image Vi can be imaged by the HUD 20 is defined as an imaging plane IS, the angle of view VA is defined as a viewing angle defined based on a virtual line connecting the driver's eye point EP and an outer edge of the image plane IS. The angle of view VA is a range of angle within which the driver can visually recognize the virtual image Vi when viewed from the eye point EP. In the HUD 20, a horizontal angle of view (for example, about 10 degrees to 12 degrees) in the horizontal direction is larger than a vertical angle of view (for example, about 4 degrees to 5 degrees) in the vertical direction. When viewed from the eye point EP, a forward range (for example, a range of about a dozen m to 100 m) that overlaps with the image plane IS is a range within the angle of view VA.

The HUD 20 displays a superimposition content CTs (see FIG. 7 and the like) and a non-superimposition content CTn (see FIGS. 8 and 14 and the like) as virtual images Vi. The superimposition content CTs is an AR display objects used for augmented reality (hereinafter referred to as "AR") display. The display position of the superimposition content CTs is associated with a specific superimposition target existing in the foreground, such as a specific position on the road surface, a vehicle in front, a pedestrian, and a road sign. The superimposition content CTs is displayed in a superimposing manner on a specific superimposition target in the foreground, and is seemingly fixed relative to the specific superimposition target to be able to follow the specific superimposition target corresponding to the driver's eye line. That is, the relative positional relationship is continuously maintained among the driver's eye point EP, the superimposition target in the foreground, and the superimposition content CTs. Therefore, the shape of the superimposition content CTs may be continuously updated at a predetermined cycle according to the relative position and shape of the superimposition target. The superimposition content CTs is displayed to be approximately leveled, as compared with the non-superimposition content CTn, and have a display shape extending in the depth direction (traveling direction, forward Ze) when viewed from the driver, for example.

The non-superimposition content CTn is a non-AR display object excluding the superimposition content CTs among the display objects displayed in the superimposing manner in the foreground. Unlike the superimposition content CTs, the non-superimposition content CTn is displayed in the superimposing manner on the foreground independently of the superimposition target. The display position of the non-superimposition content CTn is not associated with a specific superimposition target. The non-superimposition content CTn is displayed at a fixed position within the projection range PA (the above-mentioned angle of view VA). Therefore, the non-superimposition content CTn is displayed as if it is relatively fixed to the vehicle configuration such as the windshield WS. Further, the shape of the non-superimposition content CTn may be substantially constant. The non-superimposition content CTn may be accidentally superposed on the superimposition target of the superimposition content CTs due to the positional relationship between the eye point EP and the superimposition target.

The HCU 100 is an electronic control unit that integrally controls the display by a plurality of in-vehicle display devices including the HUD 20 in the HMI system 10. The HCU 100, the HUD 20, and the like constitute a virtual image display system.

The HCU 100 mainly includes a computer equipped with a processing unit 11, a RAM 12, a storage unit 13, an input/output interface 14, and a bus connecting these elements. The processing unit 11 is a hardware combined with the RAM 12, and executes arithmetic processing. The processing unit 11 includes at least one arithmetic core, such as a central processing unit (CPU) or a graphics processing unit (GPU). The processing unit 11 may further include a field-programmable gate array (FPGA), a neural network processing unit (NPU), an IP core having other dedicated functions, and the like. The RAM 12 may include a video RAM for generating video. The processing unit 11 accesses the RAM 12 to execute various processes for providing the functions of the respective functional blocks, which will be described later. The storage unit 13 includes a non-volatile storage medium. The storage unit 13 stores various programs (display control programs, etc.) to be executed by the processing unit 11.

The HCU 100 shown in FIGS. 1 to 3 has a plurality of functional units for controlling the superimposed display of the content by the HUD 20 by executing the display control program stored in the storage unit 13 by the processing unit 11. Specifically, the HCU 100 is constructed with functional units such as a viewpoint position specifying unit 71, a locator information acquisition unit 72, an LTA information acquisition unit 73, an LCA information acquisition unit 74, and a display generation unit 75.

The viewpoint position specifying unit 71 specifies a position of the eye point EP of the driver seated on the driver seat based on the state information acquired from the DSM 27. The viewpoint position specifying unit 71 generates three-dimensional coordinates (hereinafter referred to as eye point coordinates) indicating the position of eye point EP, and successively provides the generated eye point coordinates to the display generation unit 75.

The locator information acquisition unit 72 acquires the information necessary for the superimposed display of the superimposition content CTs. Specifically, the locator information acquisition unit 72 acquires the latest position information and direction information about the vehicle A from the locator ECU 44 as the subject vehicle position information. In addition, the locator information acquisition unit 72 acquires high-precision map data of the peripheral range of the vehicle A from the locator ECU 44. The locator information acquisition unit 72 successively provides the acquired vehicle position information and high-precision map data to the display generation unit 75. Although the locator ECU 44 can provide information on a wider range than the peripheral range of the vehicle A, the locator ECU 44 provides the locator information acquisition unit 72 with the locator information on the range (for example, 50 m to 200 m around the vehicle A) necessary for the superimposed display of the superimposition content CTs.

The LTA information acquisition unit 73 acquires ACC status information and LTA information output to the communication bus 99. As described above, the LTA information is driving control information related to the driving control for the in-lane traveling, which is output to the communication bus 99 by the lane keeping control unit 51. The status information of the LTA information includes information indicating whether or not the in-lane traveling can be executed by the lane keeping control unit 51 after the completion of the lane change. In addition, the LTA information acquisition unit 73 acquires boundary information of the subject vehicle lane Lns (see FIG. 7) from the driving assistance ECU 50. The LTA information acquisition unit 73 successively provides the display generation unit 75 with the status information and the line shape information included in the LTA information and the boundary information.

The LTA information acquisition unit 73 may acquire the imaging data of the front camera 31 instead of the boundary information as the analysis result acquired from the driving assistance ECU 50. In this case, the LTA information acquisition unit 73 acquires the boundary information by a process of extracting the left and right lane markings or roadsides of the subject vehicle lane Lns from the imaging data. Here, the lane keeping control unit 51 can provide lane keeping control information in a wider range than the peripheral range of the vehicle A. The lane keeping control unit 51 provides the LTA information acquisition unit 73 with at least lane keeping control information in a range (for example, 50 m to 200 m around the vehicle A) necessary for the superimposed display of the superposed content CTs. The lane keeping control unit 51 may provide the LTA information to the LTA information acquisition unit 73 substantially all the time, for example, during the period when the lane keeping control is in the activated state, or successively when it is determined that a specific event has occurred.

The LCA information acquisition unit 74 acquires the LCA information output to the communication bus 99. As described above, the LCA information is the driving control information related to the lane change output to the communication bus 99 by the lane change control unit 52. The line shape information of the LCA information includes information indicating the start point and the end point of the lane change and the movement direction in the lane change, as information related to the destination lane Lnd (see FIG. 8) to which the vehicle A moves due to the lane change. The LCA information acquisition unit 74 sequentially provides the display generation unit 75 with the status information and the line shape information included in the LCA information.

The display generation unit 75 controls the presentation of information to the driver by the HUD 20 by generating video data that is sequentially output to the HUD 20. The display generation unit 75 draws the original image of each content displayed as a virtual image Vi on each frame image constituting the video data. When drawing the original image of the superimposition content CTs (see FIG. 7 and the like) on the frame image, the display generation unit 75 corrects the drawing position and drawing shape of the original image in the frame image according to the eye point EP and the superimposition target. Thus, the superimposition content CTs is displayed at the position and shape correctly superimposed on the superimposed object when viewed from the eye point EP.

The display generation unit 75 further has a virtual layout function and a content selection function in order to realize the above-mentioned video data generation function. The virtual layout function is a function of simulating the display layout of the superimposition content CTs based on various information provided to the display generation unit 75. The display generation unit 75 reproduces the current traveling environment of the vehicle A in the virtual space based on the vehicle position information, the high-precision map data, the detection information, and the like. The display generation unit 75 may start the simulation of the display layout by its own judgment based on the LTA information and the LCA information.

More specifically, as shown in FIGS. 2 to 5, the display generation unit 75 sets a subject vehicle object AO at a reference position in the virtual three-dimensional space. The display generation unit 75 maps the road model of the shape indicated by the high-precision map data to the three-dimensional space in association with the subject vehicle object AO based on the subject vehicle position information. The display generation unit 75 sets a scheduled traveling line PRL having a shape based on the line shape information on the road model while referring to the boundary information.

The display generation unit 75 sets the virtual camera position CP and the superimposition range SA in association with the subject vehicle object AO. The virtual camera position CP is a virtual position corresponding to the driver's eye point EP. The display generation unit 75 sequentially corrects the virtual camera position CP with respect to the subject vehicle object AO based on the latest eye point coordinates acquired by the viewpoint position specifying unit 71. The superimposition range SA is a range in which the virtual image Vi can be displayed in the superimposing manner. The display generation unit 75 sets a front range positioned inside the imaging plane IS as the superimposition range SA, when viewed forward from the virtual camera position CP, based on the virtual camera position CP and the outer edge position (coordinates) information of the imaging plane IS stored in advance in the storage unit 13 (see FIG. 1). The superimposition range SA corresponds to the angle of view VA of the HUD 20.

The display generation unit 75 can arrange a first virtual object VO1 and a second virtual object VO2 on the road surface of the road model in the three-dimensional space. The first virtual object VO1 is a virtual object that defines the positions and shapes of an LTA execution content CTt (see FIG. 7) and an LTA announcement content CTpt (see FIG. 14), which will be described later. The first virtual object VO1 is set in the virtual space when displaying these contents CTt and CTpt as virtual images. The first virtual object VO1 is arranged on the virtual road surface corresponding to LTA execution sections SLt1 and SLt2 in the virtual space. The LTA execution sections SLt1 and SLt2 are scheduled control sections in which the LTA function is in the execution state and the vehicle A executes the in-lane traveling. The first virtual object VO1 has a shape extending in a strip shape on the scheduled traveling line PRL arranged in the center of the virtual road surface of the subject vehicle lane.

The second virtual object VO2 is a virtual object that defines the positions and shapes of an LCA standby content CTwc (see FIG. 9), an LCA announcement content CTpc (see FIG. 10), and an LCA execution content CTc (see FIG. 11), which will be described later. The second virtual object VO2 is set in the virtual space when displaying each content CTwc, CTpc, CTc as a virtual image. The second virtual object VO2 is arranged on the virtual road surface corresponding to the LC execution section SLc in the virtual space. The LC execution section SLc is a scheduled control section in which the LCA function is in the execution state and the vehicle A changes lanes. The second virtual object VO2 has a shape that covers the virtual road surface of the destination lane in a plane.

The shape of each of the above virtual objects VO1 and VO2 as viewed from the virtual camera position CP is the virtual image shape of each superimposition content CTs visually recognized from the eye point EP. In other words, the shape obtained by projecting each of the virtual objects VO1 and VO2 toward the virtual camera position on the virtual image plane IS is regarded as the virtual image shape of each superimposition content CTs. The display generation unit 75 calculates the virtual image shape and, by extension, a drawing shape of the original image from the shape of each of the virtual objects VO1 and VO2 based on the specification information of the optical system of the HUD 20.

The content selection function is a function for selecting a content to be used for presenting information. The display generation unit 75 selects the content to be drawn in the video data based on the LTA information, the LCA information, and the like acquired by the information acquisition units 73 and 74 and the simulation result of the display layout. The display generation unit 75 properly uses the superposed content CTs and the non-superimposition content CTn, and presents information related to the lane keeping control and the lane change control to the driver.

Figure 6:
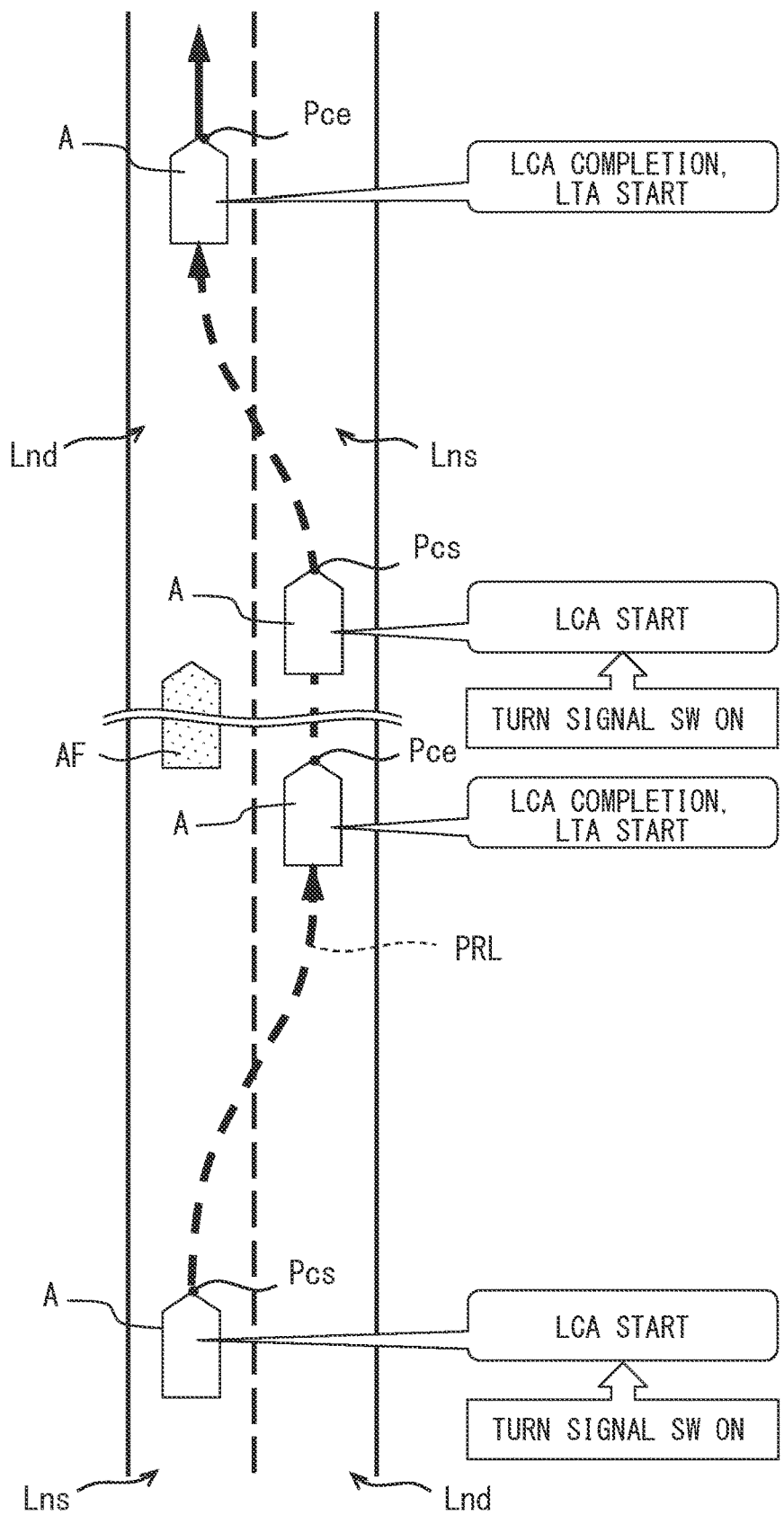
FIG. 6 is a diagram schematically illustrating an overall image of a scene of a lane change in order to overtake a vehicle in front.

The display generation unit 75 described so far presents an LTA execution display (see FIGS. 7 and 16), an LCA acceptance display (see FIG. 8), an LCA standby display (see FIGS. 9, 10, 13 and 17) and the like in a scene overtaking the preceding vehicle AF as shown in FIG. 6. Further, the display generation unit 75 includes an LCA execution display (see FIGS. 11, 13 and 18), an LCA cancellation display (see FIG. 12), an LTA transition display (see FIG. 14), an LTA standby display (see FIG. 15) and the like are presented.

These displays include the LTA execution content CTt, the LTA announcement content CTpt, and the LTA standby content CTwt as the contents for giving notifications related to the LTA. Further, each display includes a response notification content CTa, an LCA standby content CTwc, an LCA announcement content CTpc, and an LCA execution content CTc as the contents for giving notifications related to the LCA. Hereinafter, the details of each display will be described in order with reference to FIGS. 3 to 6 based on FIGS. 7 to 18.

Figure 7:
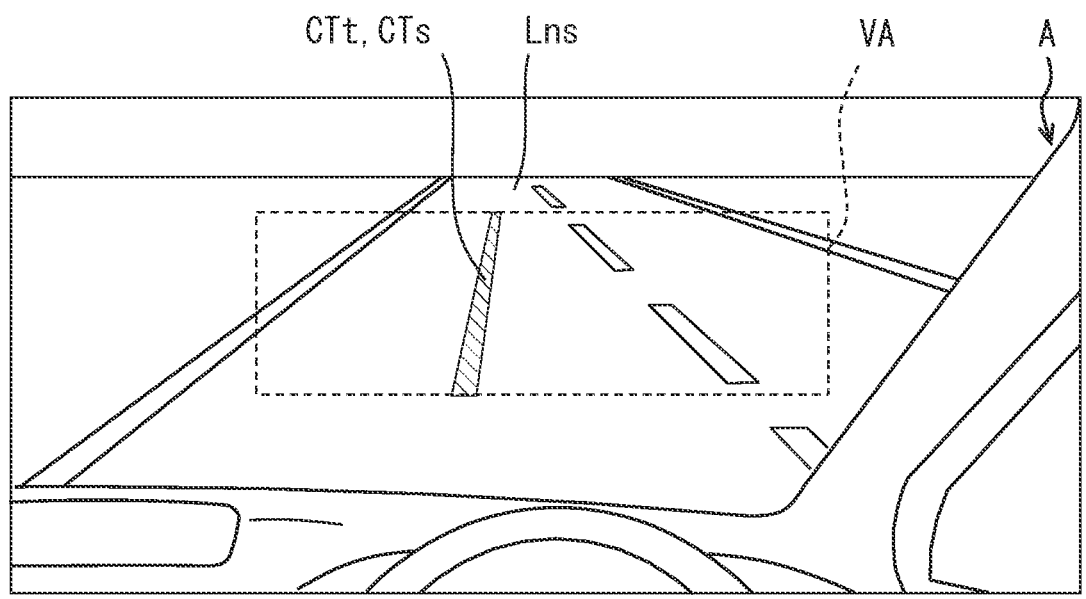
FIG. 7 is a diagram illustrating an LTA execution display.

The LTA execution display shown in FIG. 7 is a display indicating to the driver that the LTA function is being executed by the lane keeping control unit 51. The LTA execution display includes the LTA execution content CTt. The LTA execution content CTt is a superimposition content CTs that is displayed in a superimposing manner in the center of the road surface of the subject vehicle lane Lns in the foreground. The LTA execution content CTt shows an estimated trajectory of the in-lane traveling by the LTA function. In addition, the LTA execution content CTt indicates that the lane keeping control unit 51 controls the traveling position of the vehicle A to the center of the subject vehicle lane Lns.

The drawing shape of the LTA execution content CTt is determined based on the above-mentioned first virtual object VO1. The LTA execution content CTt is displayed so as to seemingly stick to the road surface and be along the road surface. The LTA execution content CTt has a linear shape when the subject vehicle lane Lns is straight, and has a curved shape along the curved shape when the subject vehicle lane Lns is curved. The drawing shape of the LTA execution content CTt is updated at a predetermined update cycle so as to match the road surface shape viewed from the eye point EP (see FIG. 2) as the vehicle A travels.

Figure 8:
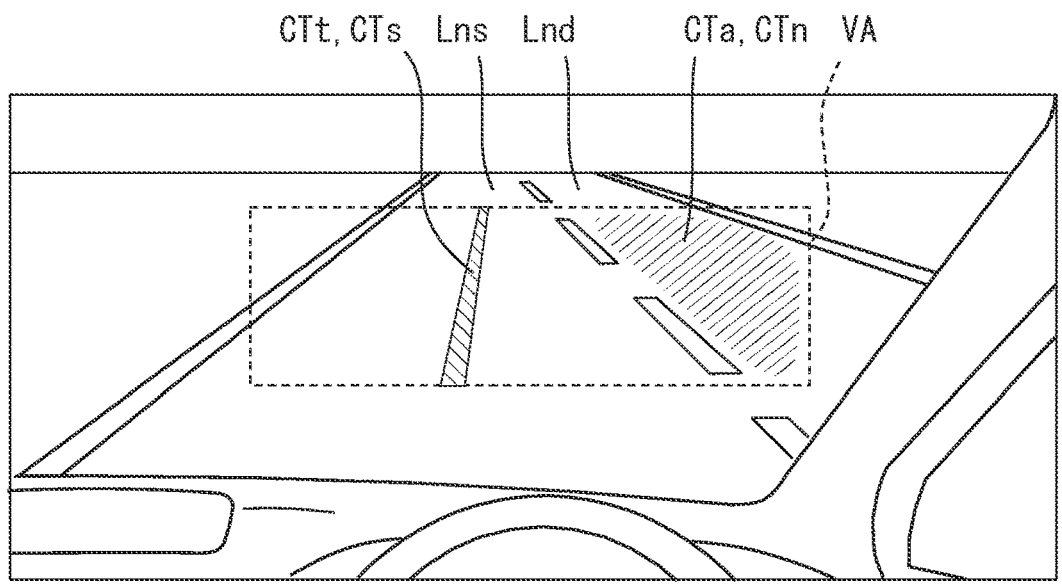
FIG. 8 is a diagram illustrating an LCA acceptance display.

The LCA acceptance display shown in FIG. 8 is a display that notifies the driver that the input of the on operation to the turn signal switch 56 is received and the LCA function is activated. The LCA acceptance display includes the response notification content CTa in addition to the LTA execution content CTt.

The response notification content CTa is a content that notifies the acceptance of the on operation by the lane change control unit 52. The display of the response notification content CTa is started based on the fact that the LCA information acquisition unit 74 has acquired the status information indicating the start-up state. The display of the response notification content CTa is continued until the lane change control unit 52 completes the peripheral check and the LCA information acquisition unit 74 acquires the status information indicating the standby state or the execution state of the LCA function.

The response notification content CTa is a non-superimposition content CTn, and continues to maintain a predetermined shape from the start of display to the end of display. The response notification content CTa is displayed on a destination side of the lane change with respect to the LTA execution content CTt, to be superimposed on the road surface of the destination lane Lnd of the lane change, based on the on operation information, the LCA information or the like. The response notification content CTa is drawn in a display color or display shape associated with the LCA announcement content CTpc (see FIG. 10) described later. Since the response notification content CTa is the non-superimposition content CTn, the response notification content CTa does not have to be accurately superimposed on the destination lane Lnd due to the curve shape and slope of the road.

Figure 9:
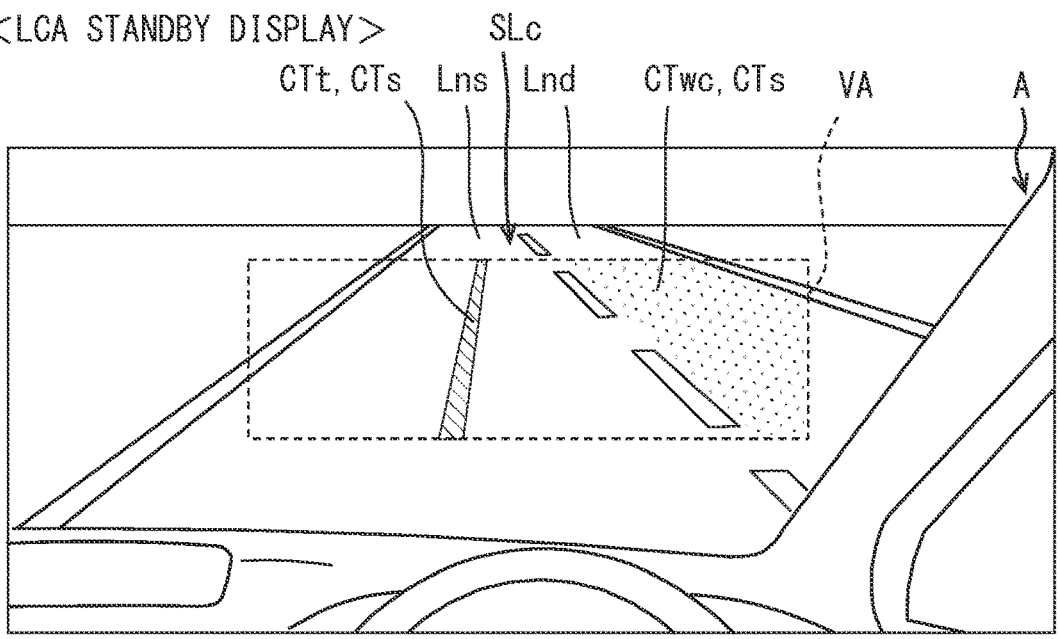
FIG. 9 is a diagram illustrating an LCA standby display when a LC execution section is not positioned inside the angle of view.

The LCA standby display shown in FIG. 9 is a display for notifying the driver that the LCA function is in the standby state and that the lane change is not started within a predetermined time (for example, 3 seconds). The predetermined time is set based on the angle of view VA of the HUD 20. Specifically, the predetermined time is set to a time immediately before the LC execution section SLc enters the angle of view VA. The LCA standby display includes the LCA standby content CTwc, in addition to the LTA execution content CTt.

The LCA standby content CTwc is a content indicating that the LCA function is about to perform a change lane when the LC execution section SLc is not within the angle of view VA. In other words, the LCA standby content CTwc is also a content indicating that the movement to the destination lane Lnd is not available. The LCA standby content CTwc is displayed in place of the response notification content CTa (see FIG. 8) based on the acquisition of the status information indicating the standby state of the LCA function. The LCA standby content CTwc is a superimposition content CTs and is displayed in a superimposing manner at a position that does not overlap with the LTA execution content CTt. For example, the LCA standby content CTwc is displayed in a superimposing manner on the entire road surface of the destination lane Lnd included in the angle of view VA. Further, the LCA standby content CTwc is displayed in a mode different from the LCA announcement content CTpc (see FIG. 10) that is displayed when the LC execution section SLc is not within the angle of view VA. For example, the LCA standby content CTwc is displayed with a lower brightness than the LCA announcement content CTpc.

The drawing shape of the LCA standby content CTwc is determined based on the above-mentioned second virtual object VO2. The LCA standby content CTwc is displayed so as to seemingly stick to the road surface and be along the road surface. The drawing shape of the LCA standby content CTwc is updated at a predetermined update cycle so as to match the road surface shape viewed from the eye point EP (see FIG. 2) as the vehicle A travels.

Figure 10:
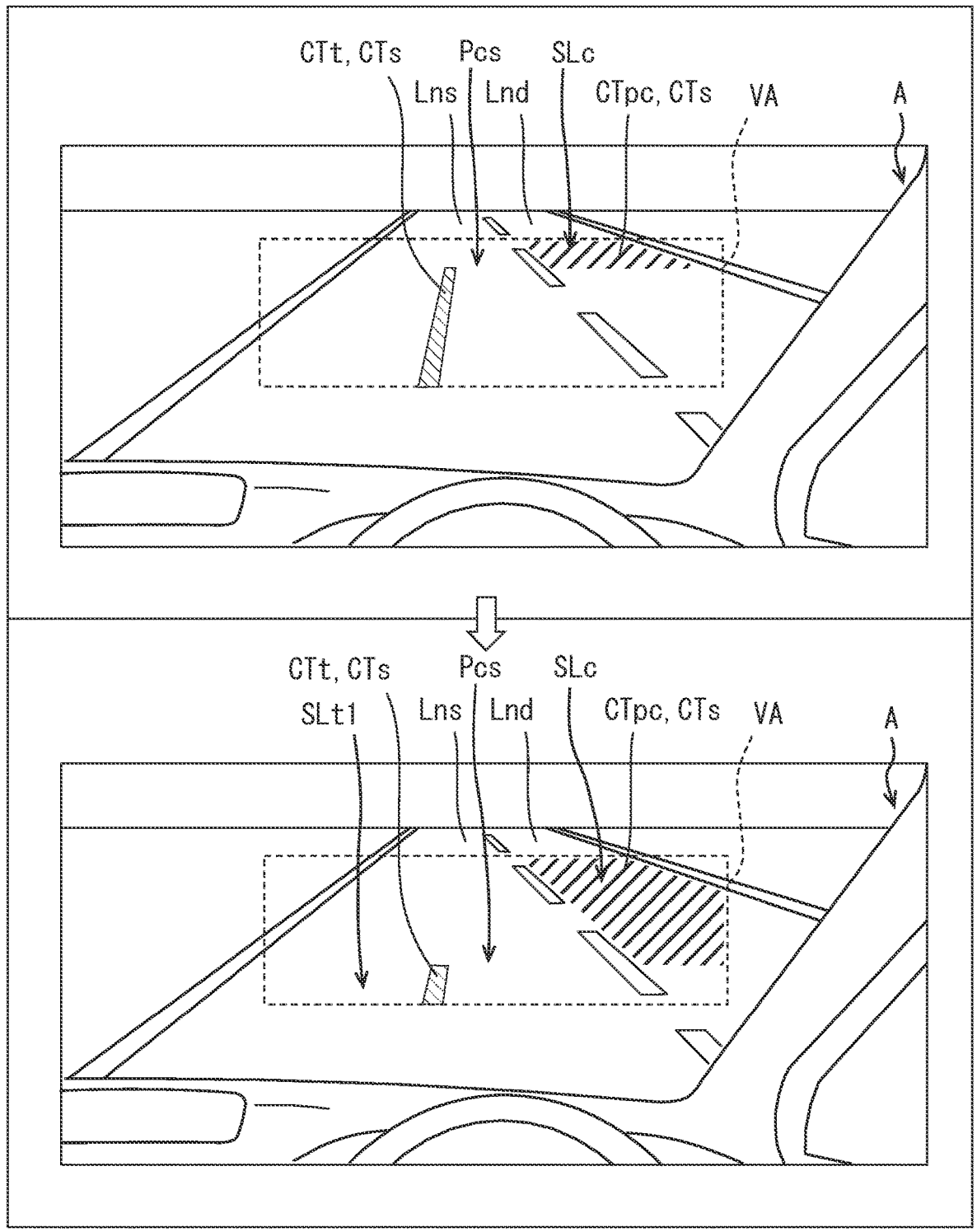
FIG. 10 is a diagram illustrating an LCA standby display when the LC execution section is positioned outside the angle of view.

The LCA standby display shown in FIG. 10 is a display for notifying the driver that the LCA function is in the standby state and that the lane change is scheduled to start within a predetermined time. In this case, the LCA standby display includes the LCA announcement content CTpc in addition to the LTA execution content CTt.

The LTA execution content CTt is superimposed on a range of the road surface of the subject vehicle lane Lns, the range being the LTA execution section SLt1. In other words, the LTA execution content CTt is superimposed on the range that is on the front side (subject vehicle side) of the LC execution section SLc. Therefore, as the vehicle A travels, the point where the LTA execution section SLt1 shifts to the LC execution section SLc (hereinafter, LC transition point Pcs, see FIG. 4) approaches the vehicle A. As the LC transition point Pcs approaches the vehicle A, the LTA execution content CTt is gradually shortened.

When the LC execution section SLc is within the angle of view VA, the LCA announcement content CTpc is superimposed on the road surface of the destination lane Lnd. The LCA announcement content CTpc is displayed so as to fill the range of the road surface that becomes the LC execution section SLc. The LCA announcement content CTpc is displayed at a position that does not overlap with the LTA execution content CTt. Specifically, the LCA announcement content CTpc is displayed at a position visible on the foreside (upper side) of the LTA execution content CTt and on the destination lane Lnd side. The LCA announcement content CTpc is gradually expanded in accordance with the contraction of the LTA execution content CTt as the LC transition point Pcs approaches the vehicle A.

The drawing shape of the LCA announcement content CTpc is determined based on the second virtual object VO2 described above, similarly to the LCA standby content CTwc (see FIG. 9). The LCA announcement content CTpc is displayed so as to seemingly stick to the road surface in a position along the road surface. The drawing shape of the LCA announcement content CTpc is updated at a predetermined update cycle so as to match the road surface shape viewed from the eye point EP (see FIG. 2).

Figure 11:
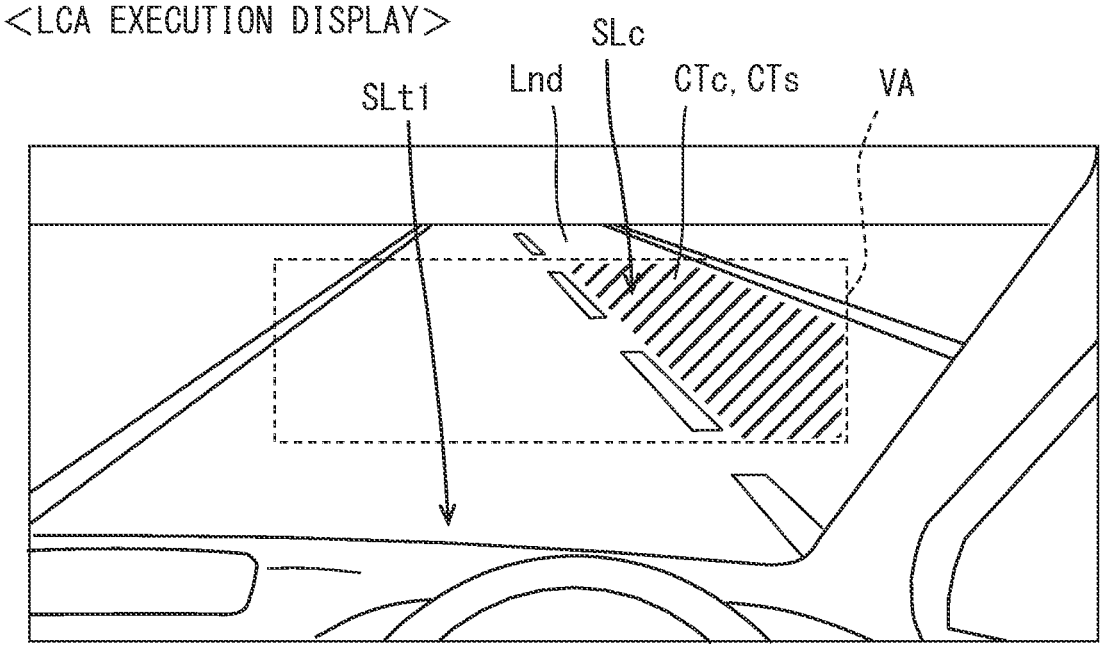
FIG. 11 is a diagram illustrating an LCA execution display.

The LCA execution display shown in FIG. 11 is a display for notifying the driver that the LCA function is in the execution state. When the activation state of the LCA function directly transitions from the start-up state to the execution state, the display generation unit 75 shifts the LCA acceptance display (see FIG. 8) to the LCA execution display. The LCA execution display includes the LCA execution content CTc. At the timing where the LCA function transitions from the standby state to the execution state, the LTA execution section SLt1 is already outside the angle of view VA. Therefore, the LTA execution content CTt (see FIG. 10) is hidden in the LCA execution display.

The LCA execution content CTc is displayed in substantially the same mode as the LCA announcement content CTpc (see FIG. 10) displayed when the LC execution section SLc is within the angle of view VA. The LCA execution content CTc is a superimposition content CTs, and is displayed in the mode to fill the entire range of the road surface of the destination lane Lnd that overlaps with the angle of view VA. The drawing shape of the LCA execution content CTc is determined based on the second virtual object VO2 described above, similarly to the LCA announcement content CTpc. Therefore, the display transition from the LCA announcement content CTpc to the LCA execution content CTc is continuously performed.

Figure 12:
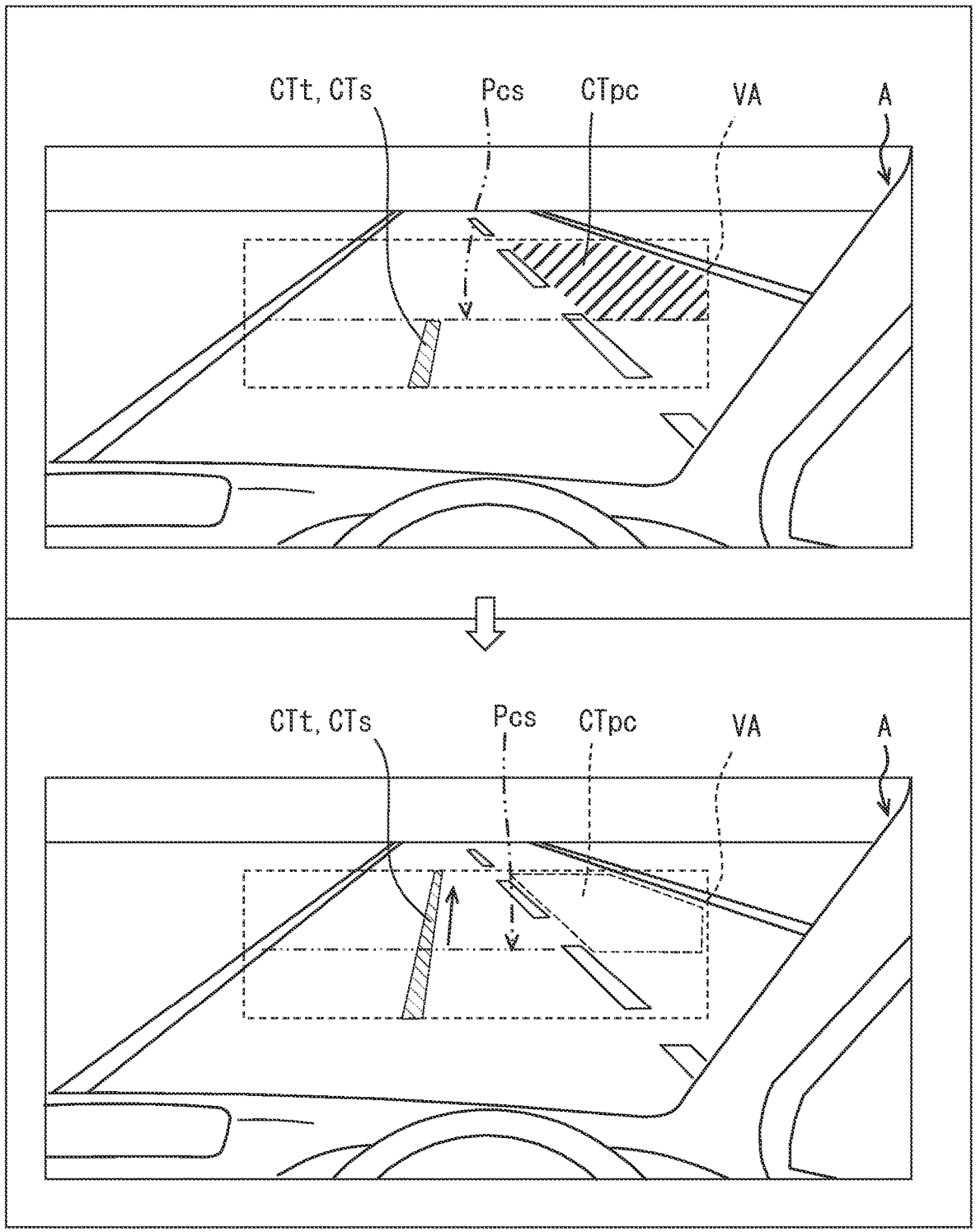
FIG. 12 is a diagram illustrating an LC cancellation display when an automatic change is canceled.

The LCA cancellation display shown in FIG. 12 is a display for notifying the driver that the LCA function has transitioned to the off state. In addition, the LCA cancellation display also functions as a display indicating the continuation of the in-lane traveling by the LTA function. The lane change control unit 52 finishes the automated lane change when a cancel operation of the LCA function is input to the turn signal switch 56, or when a predetermined time period has elapsed while the activation state of the LCA being not able to transition to the execution state, that is, in the case of timeout. When the display generation unit 75 recognizes the end of the automated lane change based on the LCA information, the display generation unit 75 transitions the LCA standby display to the LCA cancellation display.

In the LCA cancellation display, the display of the LCA announcement content CTpc (or the LCA standby content CTwc) is terminated (see the broken line range in the lower part of FIG. 12). In addition, in the LCA cancellation display, the LTA execution content CTt is highlighted in order to impress the driver on the continuation of the in-lane traveling. Specifically, the display generation unit 75 extends the LCA execution content CTc, the overlapping range of which has been limited on the subject vehicle side than the LC transition point Pcs, in the traveling direction over the point where the LC transition point Pcs was positioned. The animation of extending the LCA execution content CTc may be repeated a plurality of times.

Figure 13:
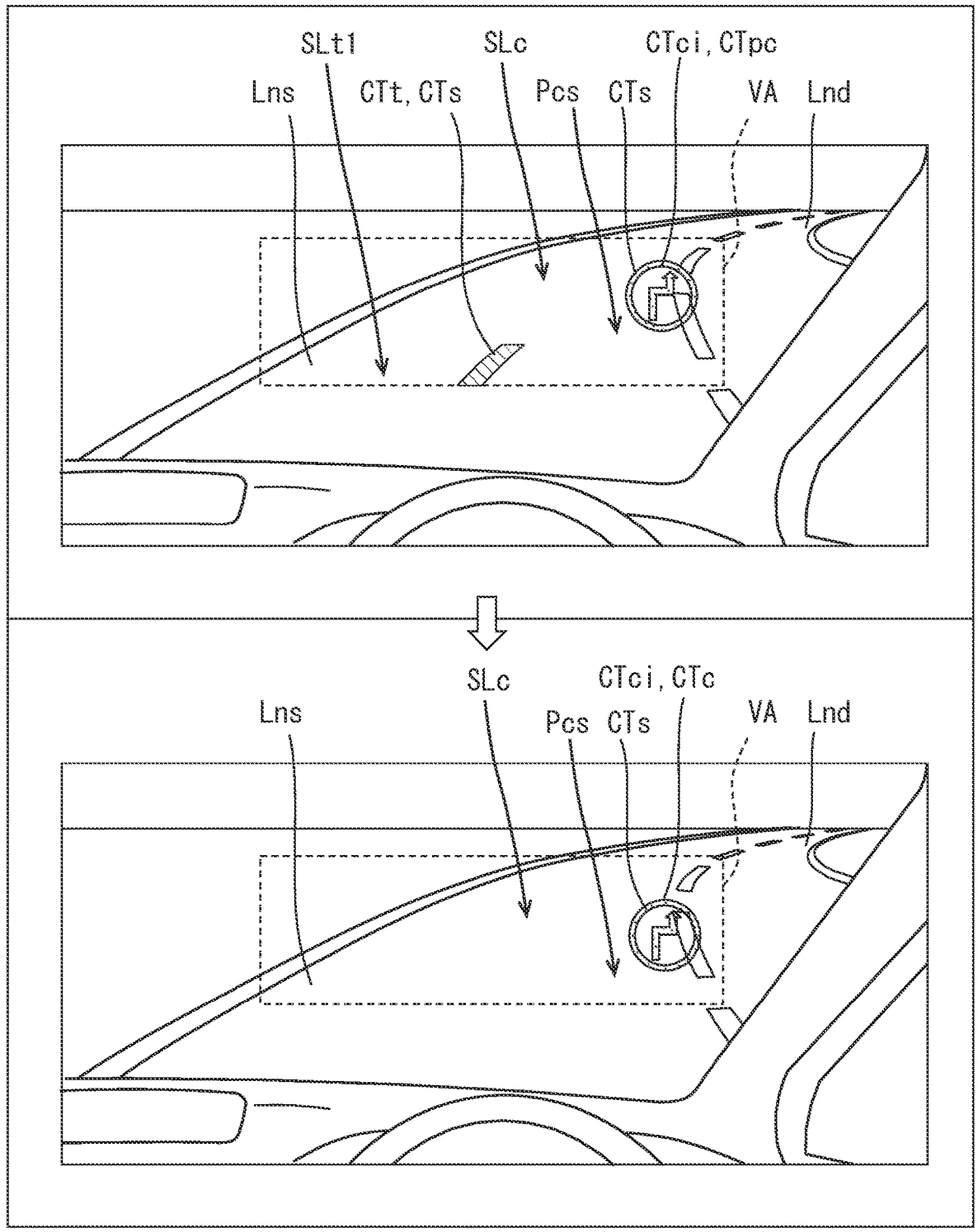
FIG. 13 is a diagram illustrating an LCA standby display and an LCA execution display when a destination lane is not positioned inside the angle of view.

The LCA standby display and the LCA execution display shown in FIG. 13 are displays selected in a driving scene in which the road surface of the destination lane Lnd does not enter the angle of view VA. Based on the simulation result of the display layout, the display generation unit 75 determines that the destination lane Lnd is outside the angle of view VA when the area of the road surface of the destination lane Lnd included in the superposition range SA is less than a predetermined value. As an example, when the road in the traveling direction has a curved shape, the road surface of the destination lane Lnd deviates from the angle of view VA. In the LCA standby display and the LCA execution display in such a driving scene, the LCA icon CTci is used as the LCA announcement content CTpc and the LCA execution content CTc.

The LCA icon CTci is a display object including an arrow-shaped image portion and an outer peripheral image portion. The arrow-shaped image portion has an arrow shape indicating the traveling direction (upward) while bending toward the destination lane Lnd side. The outer peripheral image portion surrounds the arrow-shaped image portion in an annular shape. The LCA icon CTci is a superimposition content CTs that is displayed in a superimposing manner on the road surface of the subject vehicle lane Lns. The LCA icon CTci is set to the road surface of the LC transition point Pcs as the superimposition target. The LCA icon CTci is superimposed on the vicinity of the lane marking of the subject vehicle lane Lns on the destination lane Lnd side. The LCA icon CTci moves within the angle of view VA, as the LC transition point Pcs approaches. The drawing shape of the LCA icon CTci may be kept constant, or may be enlarged, as the LC transition point Pcs approaches.

The LTA transition display shown in FIG. 14 is a display for notifying the driver that the in-lane traveling in the destination lane Lnd is scheduled to start after the lane change by the LCA function is completed. The LTA transition display is displayed when the LTA information acquisition unit 73 acquires the status information indicating the executable state of the LTA function after the transition to the LTA execution display. The LCA transition display includes the LTA announcement content CTpt in addition to the LCA execution content CTc.

The LTA announcement content CTpt is a content indicating an execution schedule of the in-lane traveling after the lane change. The LTA announcement content CTpt is drawn based on the line shape information, in the case where the status information indicating the executable state is acquired. The mode of the LTA announcement content CTpt is changed based on whether or not the point at which the LC execution section SLc shifts to the LTA execution section SLt2 (hereinafter, the LTA transition point Pce, see FIG. 5) is within the angle of view VA. When the LTA transition point Pce is outside the angle of view VA, the LTA icon CTti is displayed as the LTA announcement content CTpt.

The LTA icon CTti is a non-superimposition content CTn displayed at a position that does not overlap with the LCA execution content CTc, inside the angle of view VA. The LTA icon CTti is displayed in a mode different from the normal LTA announcement content CTpt that is displayed when the LTA transition point Pce is within the angle of view VA. Specifically, the LTA icon CTti is a display object including a central image portion and an outer peripheral image portion. The central image portion has a drawing object that imitates the lane markings and a drawing object that imitates the steering wheel. The outer peripheral image portion surrounds the central image portion in an annular shape. The LTA icon CTti continues to be displayed in the vicinity of the LCA execution content CTc in a predetermined drawing shape until the LTA transition point Pce enters the angle of view VA.

On the other hand, when the LTA transition point Pce is positioned inside the angle of view VA, the normal LTA announcement content CTpt is displayed. The LTA announcement content CTpt is a superimposition content CTs that is displayed on the road surface of the destination lane Lnd, which is now the subject vehicle lane Lns, as the superimposition target. The LTA announcement content CTpt is displayed in substantially the same mode as the LTA execution content CTt (see FIG. 10). The LTA announcement content CTpt is superimposed on the center of the road surface of the destination lane Lnd, and indicates a scheduled trajectory of the in-lane traveling started after the completion of the lane change.

The LTA announcement content CTpt is displayed at a position that does not overlap with the LCA execution content CTc. Specifically, the LTA announcement content CTpt is arranged at a position visible on the foreside (upper side) of the LCA execution content CTc, and is displayed in a superimposing manner on the road surface ahead of the LTA transition point Pce.

The LTA announcement content CTpt is displayed in a mode continuous with the LCA execution content CTc, and thus can indicate a continuous scheduled trajectory of the vehicle A generated on the system side together with the LCA execution content CTc. The LTA announcement content CTpt is gradually expanded downward (on the subject vehicle side) in accordance with the contraction of the LCA execution content CTc as the LTA transition point Pce approaches the vehicle A.

Figure 15:
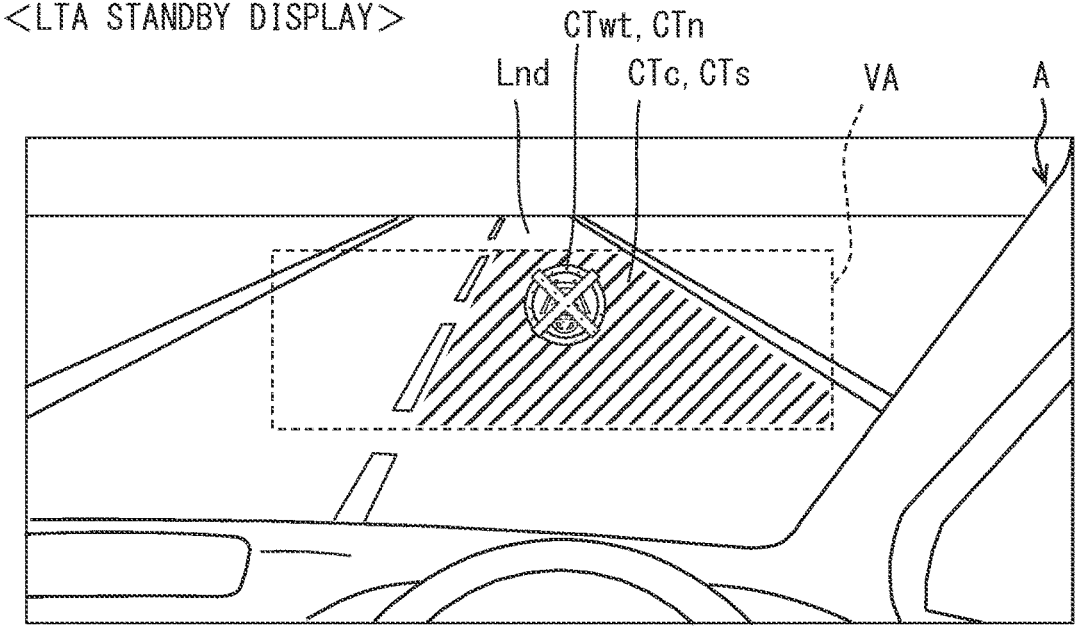
FIG. 15 is a diagram illustrating an LTA standby display.

The LTA standby display shown in FIG. 15 is a display for notifying the driver that it may not be possible to resume the in-lane traveling in the destination lane Lnd after the lane change is completed. For example, the LTA standby display is displayed, when the LTA function is not in the executable state at the timing where the vehicle A crosses the lane marking after the display is transitioned to the LCA execution display. The LTA standby display includes the LTA standby content CTwt in addition to the LCA execution content CTc.

The LTA standby content CTwt is displayed when the in-lane traveling after the lane change is not available. The LTA standby content CTwt indicates that the LTA function is in the standby state in the lane keeping control unit 51 in which the operation control is interrupted. For example, the LTA standby content CTwt is kept to be displayed for a period until the detection of the lane marking (or road edge) of the destination lane Lnd is completed. When the lane marking of the destination lane Lnd or the like can be detected, the LTA standby content CTwt is replaced with the LTA announcement content CTpt (see FIG. 14). On the other hand, when the lane marking of the destination lane Lnd or the like cannot be detected, the display of the LTA standby content CTwt is continued until the display of the LCA execution content CTc is ended.

The LTA standby content CTwt is a non-superimposition content CTn having a drawing shape associated with the LTA icon CTti (see FIG. 14). The drawing shape of the LTA standby content CTwt is such that an "x" indicating negation is superimposed on the LTA icon CTti. The LTA standby content CTwt has a display color different from that of the LTA icon CTti. Specifically, the LTA standby content CTwt is displayed in a display color such as amber that calls attention. Further, the LTA standby content CTwt may be displayed blinking immediately before the LCA function shifts to the off state.

Figure 16:
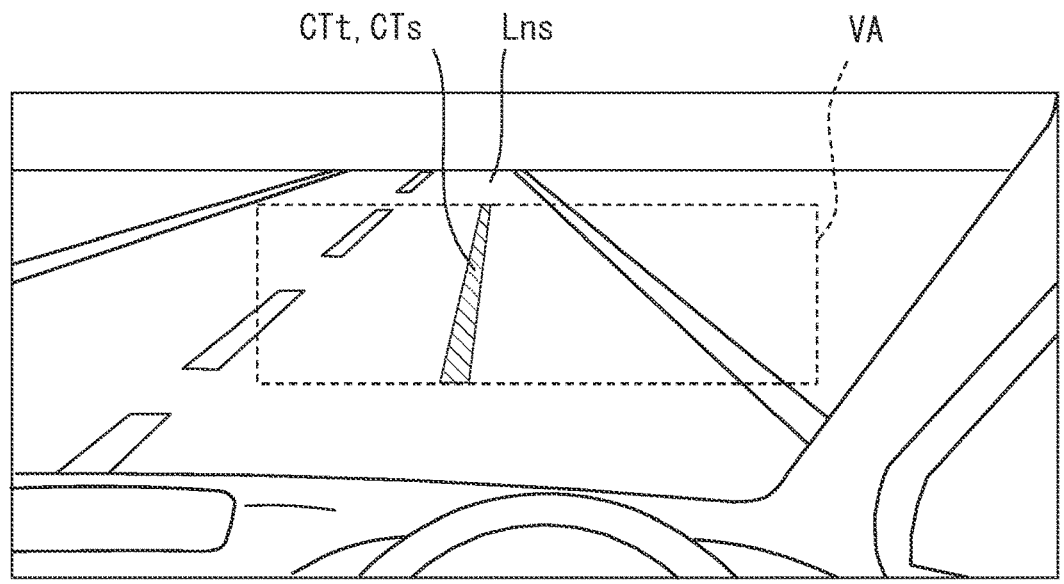
FIG. 16 is a diagram illustrating an LTA execution display after the completion of a lane change by a LCA function.

The LTA execution display shown in FIG. 16 is a display for notifying the driver of the transition to the off state of the LCA function and the transition to the execution state of the LTA function at the timing where the lane change is completed. The LTA execution display is a display including the LTA execution content CTt. The LTA execution content CTt is a superimposition content CTs that is superimposed on the center of the road surface that has become the subject vehicle lane Lns and indicates the estimated trajectory of the in-lane traveling by the LTA function. The LTA execution content CTt has substantially the same drawing shape as the LTA announcement content CTpt (see FIG. 14) of the LTA transition display and the LTA execution content CTt (see FIG. 7) before the lane change is performed.

Figure 17:
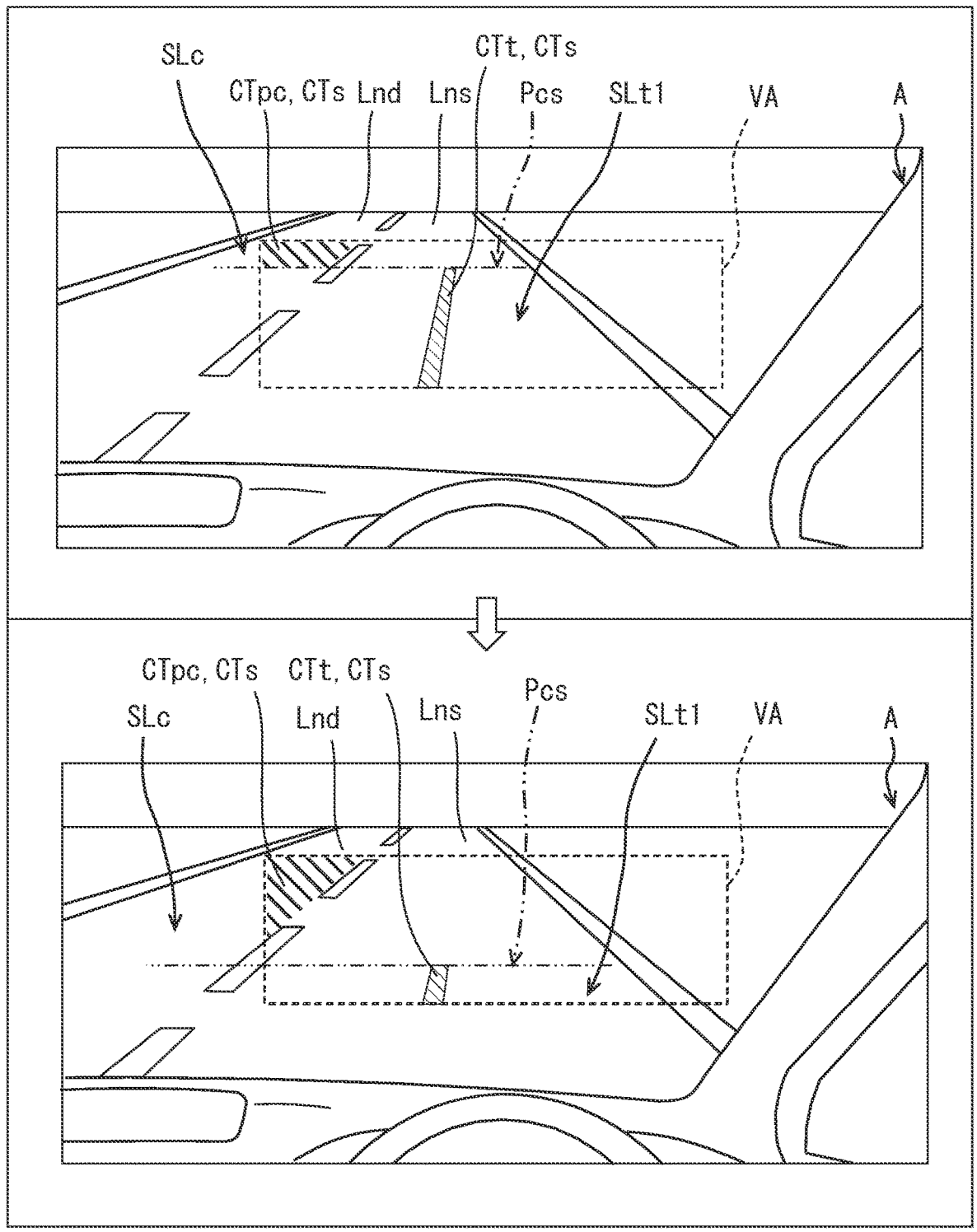
FIG. 17 is a diagram illustrating an LCA standby display when the LC execution section is positioned inside the angle of view.

Similar to the LCA standby display (see FIG. 10) in the lane change of the first time, the LCA standby display in the lane change of the second time shown in FIG. 17 notifies the driver that the LCA function is in the standby state and the lane change is scheduled to start within a predetermined time. In the second lane change, the subject vehicle lane Lns and the destination lane Lnd are replaced with those of the first lane change. Also in this case, the LTA standby display includes the LTA execution content CTt, which is superimposed on the subject vehicle lane Lns on the subject vehicle side of the LC transition point Pcs, and the LCA announcement content CTpc, which is superimposed on the destination lane Lnd ahead of the LC transition point Pcs.

Figure 18:
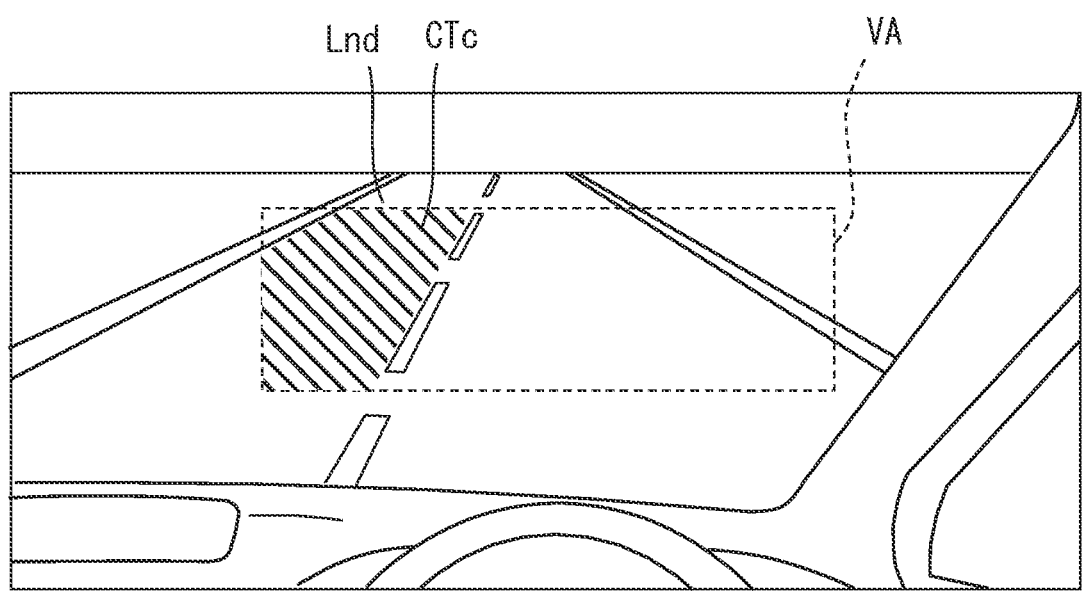
FIG. 18 is a diagram illustrating an LCA execution display.

The LCA execution display in the second lane change shown in FIG. 18 notifies the driver that the LCA function is in the execution state, similarly to the LCA execution display in the first lane change (see FIG. 11). The LCA execution display includes the LCA execution content CTc having substantially the same mode as the LCA announcement content CTpc (see FIG. 17) displayed in the immediately preceding LCA standby display. The LCA execution content CTc is displayed in a mode that fills the entire road surface range of the destination lane Lnd that overlaps with the angle of view VA.

Figure 19:
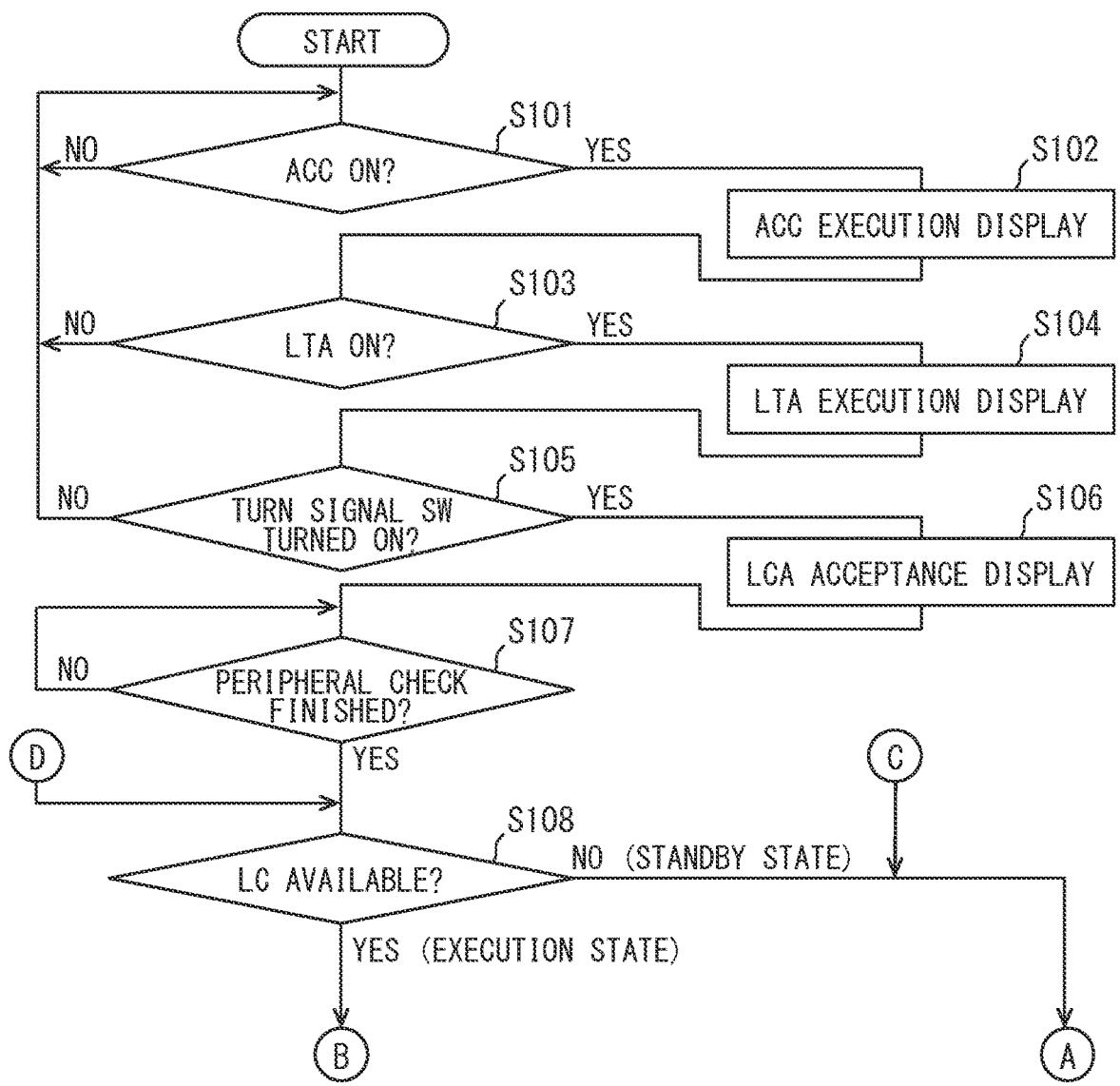
FIG. 19 is a flowchart illustrating details of a process for realizing a display control method of the first embodiment together with FIGS. 20 and 21.
Figure 20:
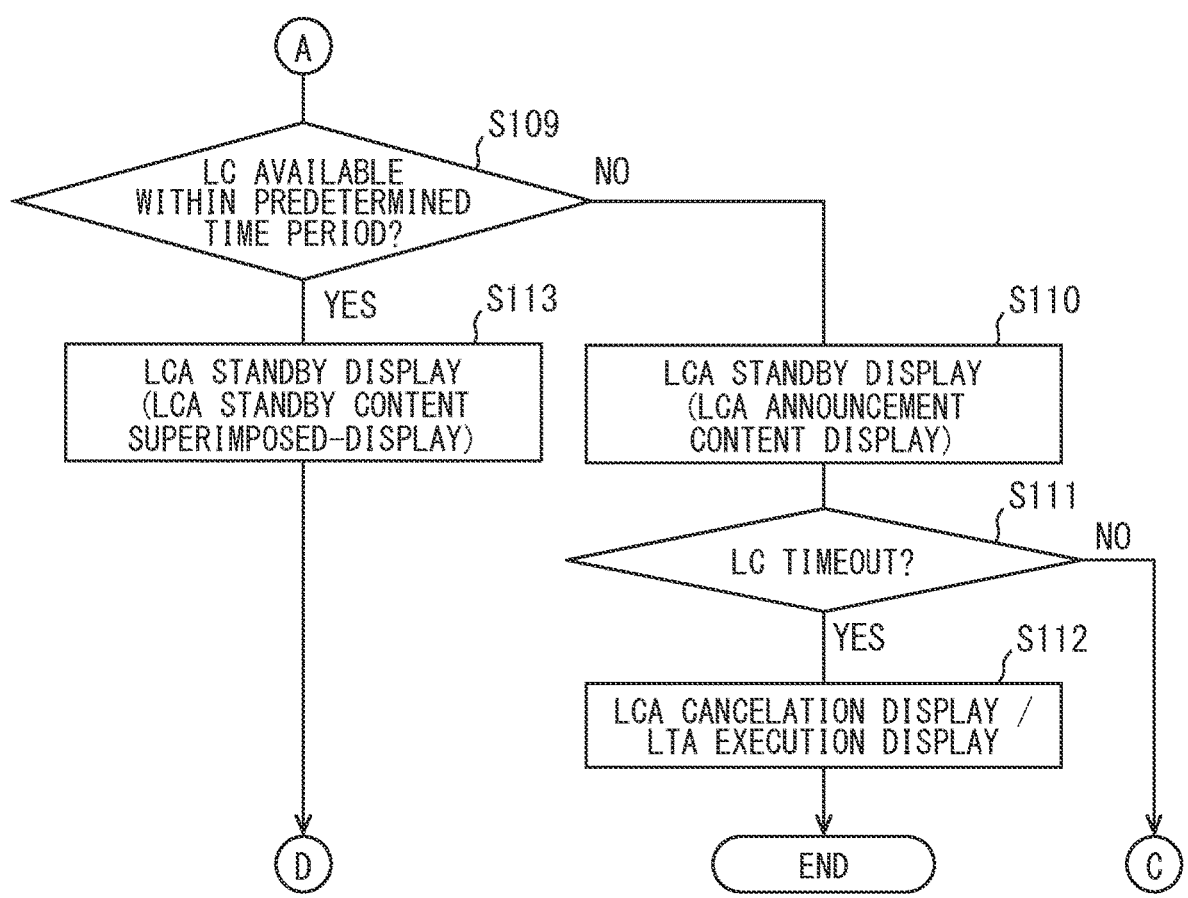
FIG. 20 is a flowchart illustrating details of the process for realizing the display control method of the first embodiment together with FIGS. 19 and 21.
Figure 21:
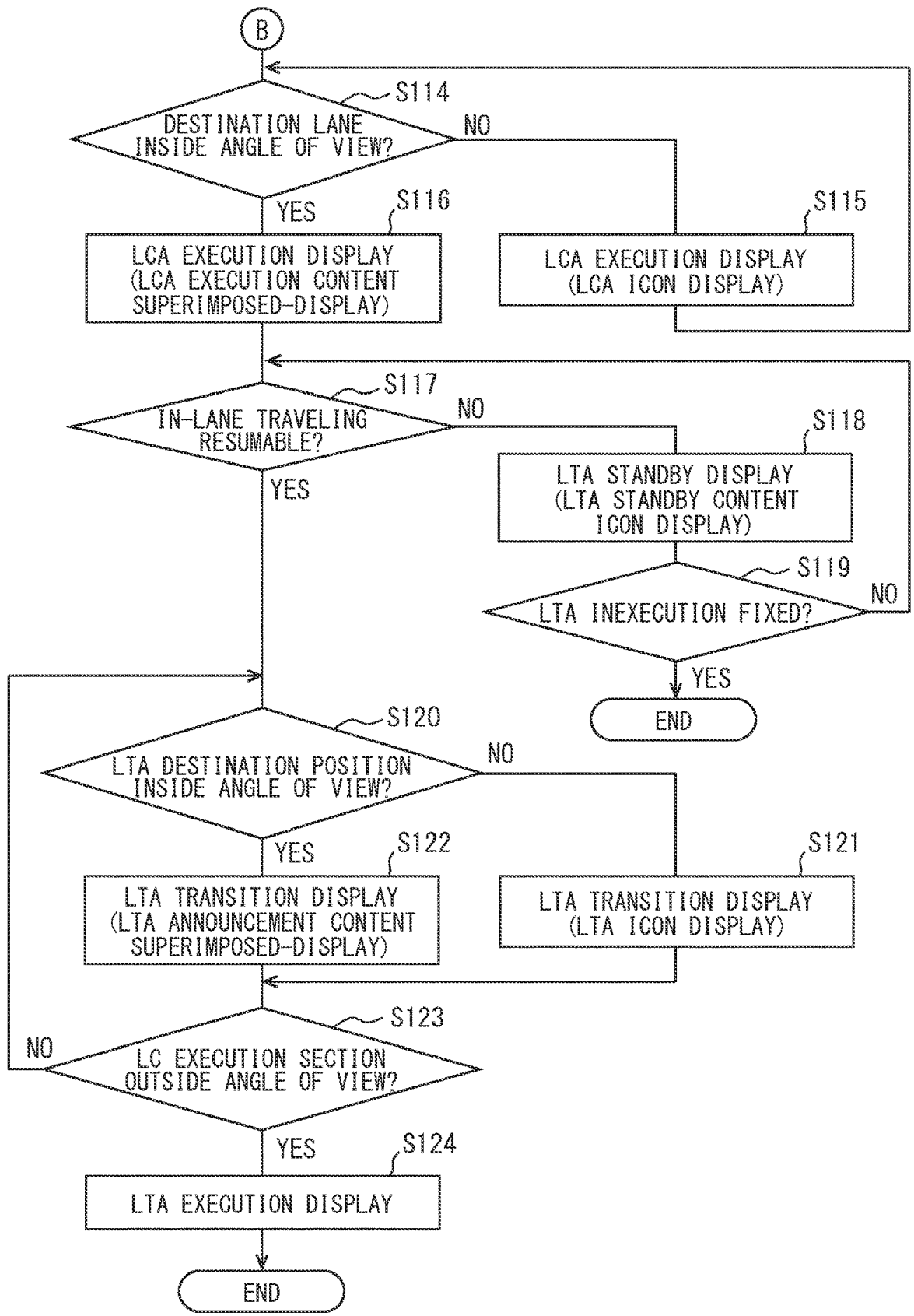
FIG. 21 is a flowchart illustrating details of the process for realizing the display control method of the first embodiment together with FIGS. 19 and 20.

Next, the details of the display control method for controlling respective displays related to the lane keeping control and the lane change control based on the display control program will be described along with the flowcharts shown FIGS. 19 to 21, with reference to FIGS. 3 and 7 to 18. The display control process shown in FIGS. 19 to 21 is started by the HCU 100 that has completed the start-up process or the like, for example, after the vehicle power supply is switched to the on state.

In S101, based on the ACC status information acquired by the LTA information acquisition unit 73, it is determined whether or not the ACC function by the driving assistance ECU 50 is in the execution state. When it is determined in S101 that the ACC function is not in the execution state, the determination in S101 is repeated to await the transition of the ACC function to the execution state. Then, when the ACC function transitions to the execution state, the process proceeds to S102. In S102, the HUD 20 is caused to display the ACC execution display indicating the execution state of the ACC function, and the process proceeds to S103.

In S103, the LTA information output from the lane keeping control unit 51 to the communication bus 99 and acquired by the LTA information acquisition unit 73 is referred to. In S103, based on the status information of the LTA function, it is determined whether or not the LTA function by the lane keeping control unit 51 is in the execution state. If it is determined in S103 that the LTA function is not in the execution state, the process returns to S101 and the ACC execution display is continued. On the other hand, when it is determined that the LTA function has transitioned to the execution state, the process proceeds to S104. In S104, the LTA execution display (see FIG. 7) is started, and the process proceeds to S105. According to S104, based on the latest LTA information, the LTA execution content CTt indicating the estimated trajectory of the in-lane traveling is displayed in a superimposing manner on the road surface of the subject vehicle lane Lns as the superimposition target.

In S105, based on the status information of the LCA function acquired by the LCA information acquisition unit 74, it is determined whether or not the on operation for activating the lane change control unit 52 is input to the turn signal switch 56. When the LCA information includes the operation information of the driver, the determination in S105 may be made based on the operation information of the driver. When it is determined in S105 that there is no input for the on operation, the process returns to S101 and the LTA execution display is continued. On the other hand, when it is determined that the on operation is input, the process proceeds to S106. In S106, the LCA acceptance display (see FIG. 8) is started, and the process proceeds to S107.

In S107, the LCA information output from the lane change control unit 52 to the communication bus 99 and acquired by the LCA information acquisition unit 74 is referred to. In S107, based on the status information about the LCA function, it is determined whether or not the peripheral check for the surroundings of the subject vehicle is completed, and the completion of the peripheral check is waited for. In S107, it is determined that the peripheral check is completed when the status information indicating the standby state or the execution state is acquired by the LCA information acquisition unit 74. Then, the process proceeds to S108. The LCA acceptance display started in S106 is continued until the determination of the completion of the peripheral check is made in S107.

In S108, the LCA information acquired by the LCA information acquisition unit 74, specifically, the latest status information of the LCA function is referred to. In S108, it is determined whether or not the lane change can be immediately executed based on the status information. When the status information indicating the standby state is acquired in S108, the process proceeds to S109 (see FIG. 20). At this time, the LCA function of the lane change control unit 52 is in the standby state, while the LTA function of the lane maintenance control unit 51 maintains the execution state.

In S109, it is determined whether or not the lane change can be started within a predetermined time (for example, 3 seconds) based on the LCA information acquired in S108. When it is determined in S109 that it is impossible to start the lane change within the predetermined time, the process proceeds to S110. In S110, the LCA standby display (see FIG. 9) including the LCA standby content CTwc is started, and the process proceeds to S111.

In S111, it is determined whether or not the lane change based on the on operation has timed out. When it is determined in S111 that the lane change has not timed out, the process returns to S109. On the other hand, when it is determined in S111 that the lane change has timed out, the process proceeds to S112. At this time, the LCA function of the lane change control unit 52 transitions to the off state, while the LTA function of the lane keeping control unit 51 maintains the execution state. Therefore, in S112, the display transitions to the LCA cancellation display (see FIG. 12) and the LCA execution display (see FIG. 7) are sequentially performed so as to match the transitions of the status of the lane keeping control unit 51 and the lane change control unit 52. Then, a series of display control processes are temporarily terminated.

When it is determined in S109 that it is possible to start the lane change within the predetermined time, the process proceeds to S113. In S113, the LCA standby display (see FIGS. 10 and 17) for the case where the LC transition point Pcs is within the angle of view VA is started, and the process returns to S108. According to S113, the LCA announcement content CTpc showing the estimated trajectory of the lane change is displayed together with the LTA execution content CTt, based on the latest line shape information included in the LCA information. When the destination lane Lnd is outside the angle of view VA, the LCA standby display may be a display using the LCA icon CTci (see FIG. 13).

When the status information indicating the execution status is acquired in S108, the process proceeds to S114 (see FIG. 21). At this time, the LCA function of the lane change control unit 52 is in the execution state, while the LTA function of the lane keeping control unit 51 transitions to the standby state. In S114, it is determined whether or not the destination lane Lnd is within the angle of view VA. When it is determined in S114 that the destination lane Lnd is outside the angle of view VA, the process proceeds to S115. In S115, the LCA execution display (see FIG. 13) using the LCA icon CTci is started, and the process returns to S114. This LCA execution display is continued until the destination lane Lnd enters the angle of view VA.

On the other hand, when it is determined in S114 that the destination lane Lnd is within the angle of view VA, the process proceeds to S116. In S116, the normal LCA execution display (see FIGS. 11 and 18) is started, and the process proceeds to S117. According to S116, based on the latest line shape information included in the LCA information, the LCA execution content CTc indicating the estimated trajectory of the lane change in the mode of filling the destination of the subject vehicle is displayed in a superimposing manner on the road surface of the destination lane Lnd as the superimposition target.

In S117, among the LTA information acquired by the LTA information acquisition unit 73, the information regarding the driving control after the completion of the lane change is referred to. In S117, based on the status information about the LTA function, it is determined whether or not the in-lane traveling can be resumed after the completion of the lane change. When it is determined in S117 that it is not possible to resume the in-lane traveling, the process proceeds to S118.

In S118, the LTA standby display (see FIG. 15) including the LTA standby content CTwt is started, and the process proceeds to S119. In S119, it is determined that the in-lane traveling after the lane change is not executed. When it is determined in S119 that the in-lane traveling has not been resumed, a series of display control processes are temporarily terminated. On the other hand, when it is determined in S119 that the in-lane traveling may be resumed, the process returns to S117. As described above, the LTA standby display is continued until, for example, the lane marking of the destination lane Lnd is detected.

On the other hand, when it is determined in S117 that the in-lane traveling by the LTA function can be resumed after the completion of the lane change, the process proceeds to S120. In S120, it is determined whether or not the LTA transition point Pce is within the angle of view VA. When it is determined in S120 that the LTA transition point Pce is outside the angle of view VA, the process proceeds to S121. In S121, the LTA transition display including the LTA icon CTti (see the upper part of FIG. 14) is started, and the process proceeds to S123. On the other hand, when it is determined in S120 that the LTA transition point Pce is within the angle of view VA, the process proceeds to S122. In S122, the LTA transition display (see the lower part of FIG. 14) including the LTA announcement content CTpt is started, and the process proceeds to S123. According to the above-described S121 and S122, based on the latest line shape information included in the LTA information, the LTA announcement content CTpt indicating the execution schedule of the in-lane traveling after the lane change is displayed together with the LCA execution content CTc.

In S123, it is determined whether or not the LC execution section SLc is outside the angle of view VA. When it is determined in S123 that a part of the LC execution section SLc remains inside the angle of view VA, the process returns to S120. As a result, the LTA transition display is continued. On the other hand, when it is determined in S123 that the entire LC execution section SLc is outside the angle of view VA, the process proceeds to S124. At this time, the LCA function of the lane change control unit 52 transitions to the off state, while the LTA function of the lane maintenance control unit 51 transitions from the executable state to the execution state. In S124, the display is changed from the LTA transition display to the LTA execution display (see FIG. 16) so as to match the above state transitions, and a series of display control processes are temporarily terminated.

In the first embodiment described so far, when shifting from the in-lane traveling by the lane keeping control unit 51 to the lane change by the lane change control unit 52, the LCA announcement content CTpc indicating the estimated trajectory of the lane change is displayed in addition to the LTA execution content. The LTA execution content CTt is the superimposition content CTs displayed to be superimposed on the road surface. As described above, if the LTA execution content CTt and the LCA announcement content CTpc include the superimposition content CTs to which the superimposition target is specified, the driver can recognize the transition schedule of the control based on the change in the display through a normal visual action. Therefore, it is possible to provide easy-to-understand guidance regarding the in-lane traveling and the lane change.

In addition, the LCA announcement content CTpc of the first embodiment is displayed at a position that does not overlap with the LTA execution content CTt. Based on the above, the LCA announcement content CTpc and the LTA execution content CTt can inform the driver of the timing and position at which the control is switched, in addition to the schedule of the control transition from the in-lane traveling to the lane change. As a result, the content display can provide guidance regarding the in-lane traveling and the lane change in an easier-to-understand manner.

Further, the LCA announcement content CTpc of the first embodiment is displayed at a position visually recognized on the forward side of the LTA execution content CTt. Such a positional relationship between the LTA execution content CTt and the LCA announcement content CTpc can clearly indicate the position where the control is switched from the in-lane traveling to the lane change. As a result, guidance on the in-lane traveling and the lane change is presented in a more understandable manner.

Further, in the first embodiment, when the LCA information acquisition unit 74 detects the interruption (cancellation) of the lane change once attempted based on the LCA information, the display generation unit 75 highlights the LTA execution content CTt. Specifically, the display generation unit 75 causes display of the LTA execution content CTt to be extended in the traveling direction. According to such a display, the driver can easily recognize that the lane keeping control is not canceled even if the lane change is canceled. Therefore, it is possible to provide more easy-to-understand guidance on the in-lane traveling and the lane change.

In addition, the LCA announcement content CTpc of the first embodiment is displayed at a position visually recognizable on the destination lane Lnd side with respect to the LTA execution content CTt. According to such a positional relationship, each content can suggest not only the start position of the lane change but also the moving direction in the lane change. As a result, the content display can present the control content of the scheduled lane change in an easy-to-understand manner.

In the first embodiment, when the LC execution section SLc is within the angle of view VA of the HUD 20, the LTA announcement content CTpt is displayed to be superimposed on the road surface of the LC execution section SLc. As described above, if the LCA announcement content CTpc is also displayed as the superimposition content CTs in addition to the LTA execution content CTt, the schedule of transition of the scheduled controls can be presented in an easy-to-understand manner.

In the first embodiment, the LCA standby content CTwc is displayed when the LC transition point Pcs is not within the angle of view VA. This LCA standby content CTwc is displayed in a mode different from the LTA announcement content CTpt that is displayed when the LC transition point Pcs is within the angle of view VA. The above content display can notify the driver that the start of the latest lane change is not available, while informing the driver that the LCA function is functioning normally and attempting the lane change. Therefore, even if the angle of view VA of the HUD 20 is limited, appropriate information is presented in a driving scene in which the lane change is not started promptly. As a result, the driver's anxiety about the LCA function can be reduced.

In addition, the LCA standby content CTwc of the first embodiment is displayed at a position that does not overlap with the LTA execution content CTt, similarly to the LTA announcement content CTpt. Therefore, the display transition from the LCA standby content CTwc to the LTA announcement content CTpt can be smoothly carried out in accordance with the approach of the LC transition point Pcs. Accordingly, it is possible to display contents with less annoyance while presenting necessary information on the lane change.

In the first embodiment, the response notification content CTa for notifying the acceptance of the on operation is displayed. Therefore, the driver can recognize that the system has normally accepted input of the on operation for instructing the execution of the lane change. As a result, the driver can increase the feeling of reliability in the automatic lane change control.

The response notification content CTa is the non-superimposition content CTn to which a superimposition target is not specified. Therefore, since there is no need for a process of specifying the superimposition target, the display of the response notification content CTa can be started quickly in response to the on operation. Accordingly, the driver can feel improved operability, and thus the driver can easily increase the reliability on the system.

In the first embodiment, the LTA information acquisition unit 73 corresponds to a "control information acquisition unit", the LCA information acquisition unit 74 corresponds to a "change information acquisition unit", and the display generation unit 75 corresponds to a "display control unit". The HCU 100 corresponds to a "display control device". Further, the LTA execution content CTt corresponds to an "estimated trajectory content", the LCA announcement content CTpc corresponds to a "lane change content", and the LCA standby content CTwc corresponds to a "change standby content". The LC execution section SLc corresponds to an "execution section (of the lane change)".

Second Embodiment

A second embodiment of the present disclosure illustrated in FIGS. 22 to 30 is a modification of the first embodiment. In the second embodiment, the contents of each display related to the lane keeping control and the lane change control are different from those in the first embodiment. Hereinafter, the details of the display of each pattern of the second embodiment will be described in order based on FIGS. 22 to 30 with reference to FIGS. 3 to 5.

Figure 22:
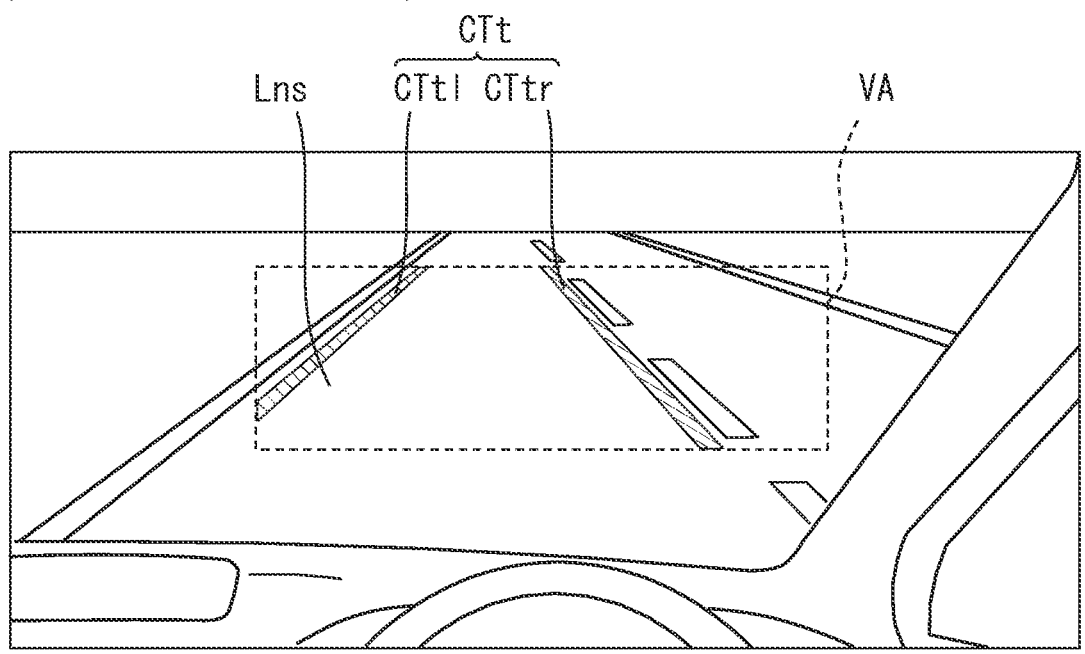
FIG. 22 is a diagram illustrating an LTA execution display of a second embodiment of the present disclosure.

The LTA execution content CTt of the second embodiment used in the LTA execution display shown in FIG. 22 includes a left boundary line CTtl and a right boundary line CTtr. The left boundary line CTtl and the right boundary line CTtr are arranged on inner sides of the left and right lane markings of the subject vehicle lane Lns, and each have a shape extending in a strip shape along the corresponding lane marking. The LTA execution content CTt can indicate the estimated trajectory of the in-lane driving by the LTA function, and also indicate the range recognized as a travelable range where the vehicle A can travel by the lane keeping control unit 51 (hereinafter, the travelable range).

Figure 23:
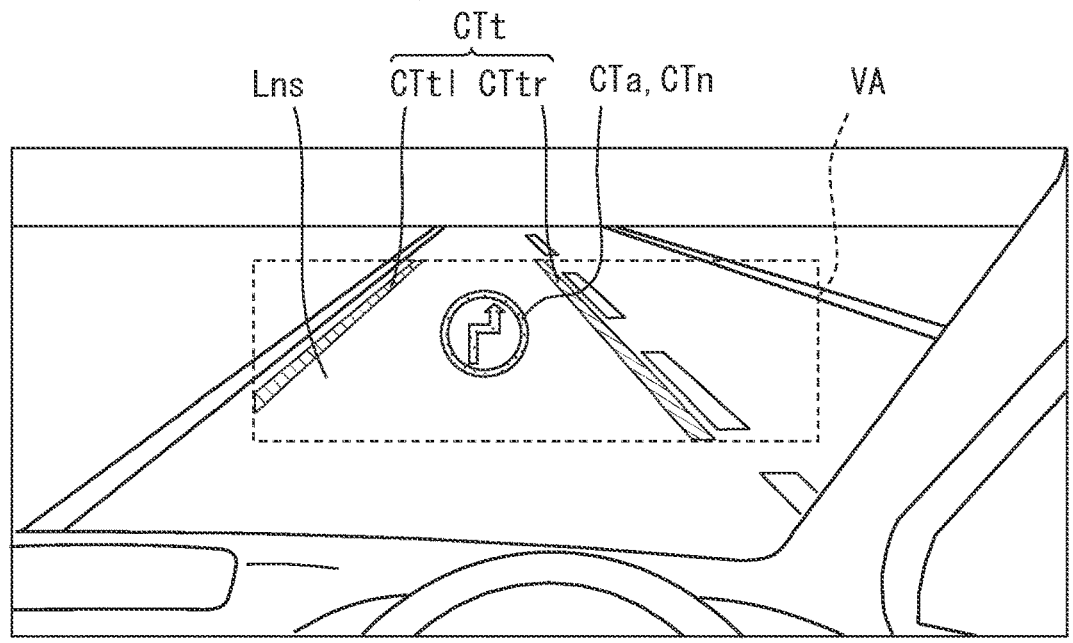
FIG. 23 is a diagram illustrating an LCA acceptance display of the second embodiment.

The LCA acceptance display shown in FIG. 23 includes the response notification content CTa in addition to the LTA execution content CTt described above. The response notification content CTa of the second embodiment is an icon-shaped non-superimposition content CTn. The response notification content CTa is a display object including an arrow-shaped image portion and an outer peripheral image portion, similarly to the LCA icon CTci (see FIG. 13) of the first embodiment. The display position of the response notification content CTa is predetermined so that the response notification content CTa does not overlap with the boundary lines CTtl and CTtr and is displayed between these boundary lines CTtl and CTtr. The response notification content CTa continues to be displayed in the substantially center of the angle of view VA so as to be superimposed on the road surface of the subject vehicle lane Lns until the completion of the peripheral check by the lane change control unit 52.

Figure 24:
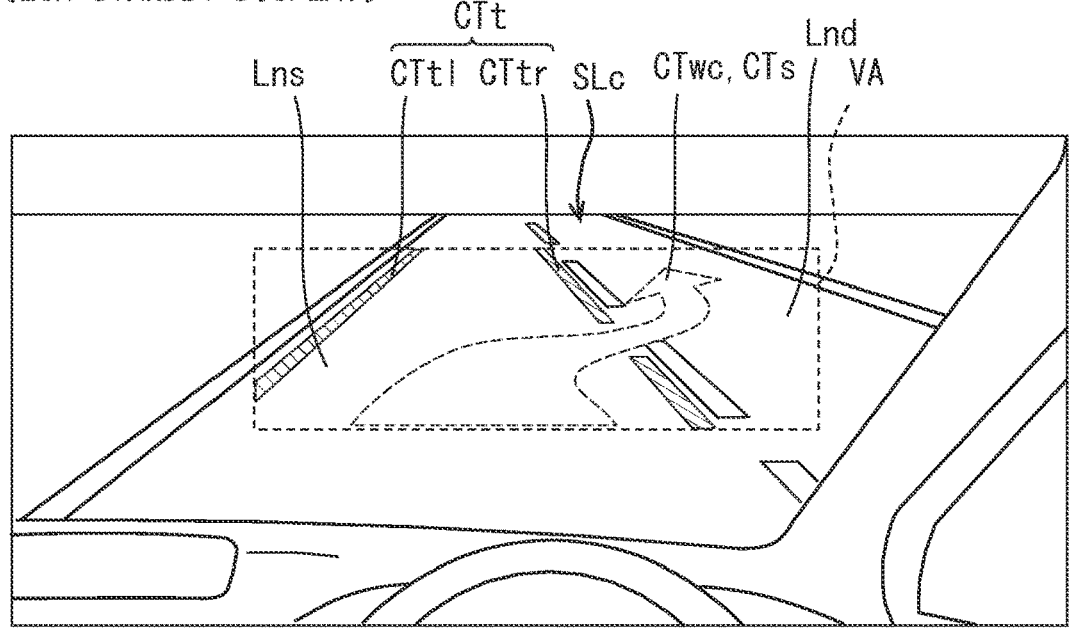
FIG. 24 is a diagram illustrating an LCA standby display of the second embodiment, of a case where a LC execution section is not positioned inside the angle of view.

The LCA standby display shown in FIG. 24 is an LCA standby display when the LC execution section SLc is outside the angle of view VA. The LCA standby display includes the LCA standby content CTwc and the LTA execution content CTt. The LCA standby content CTwc is a superimposition content CTs that notify the driver of the operation of the LCA function that is about to execute the lane change. The LCA standby content CTwc has a shape related to the LCA execution content CTc (see FIG. 26) described later, and is drawn in a form that is less attractive than the LCA execution content CTc. For example, the display brightness of the LCA standby content CTwc is lower than the display brightness of the LCA execution content CTc.

The LCA standby content CTwc has an arrow shape extending from the subject vehicle lane Lns to the destination lane Lnd. When a lane change to the right lane is instructed, the arrow-shaped LCA standby content CTwc extending from the subject vehicle lane Lns in the right front direction is displayed. On the other hand, when the lane change to the left lane is instructed, the arrow-shaped LCA standby content CTwc extending from the subject vehicle lane Lns in the left front direction is displayed.

The shape of the LTA execution content CTt is changed so as not to overlap with the LCA standby content CTwc. When the LCA standby content CTwc extends to the right, the middle portion of the right boundary line CTtr is hidden. Similarly, when the LCA standby content CTwc extends to the left, the middle portion of the left boundary line CTtl is hidden.

Figure 25:
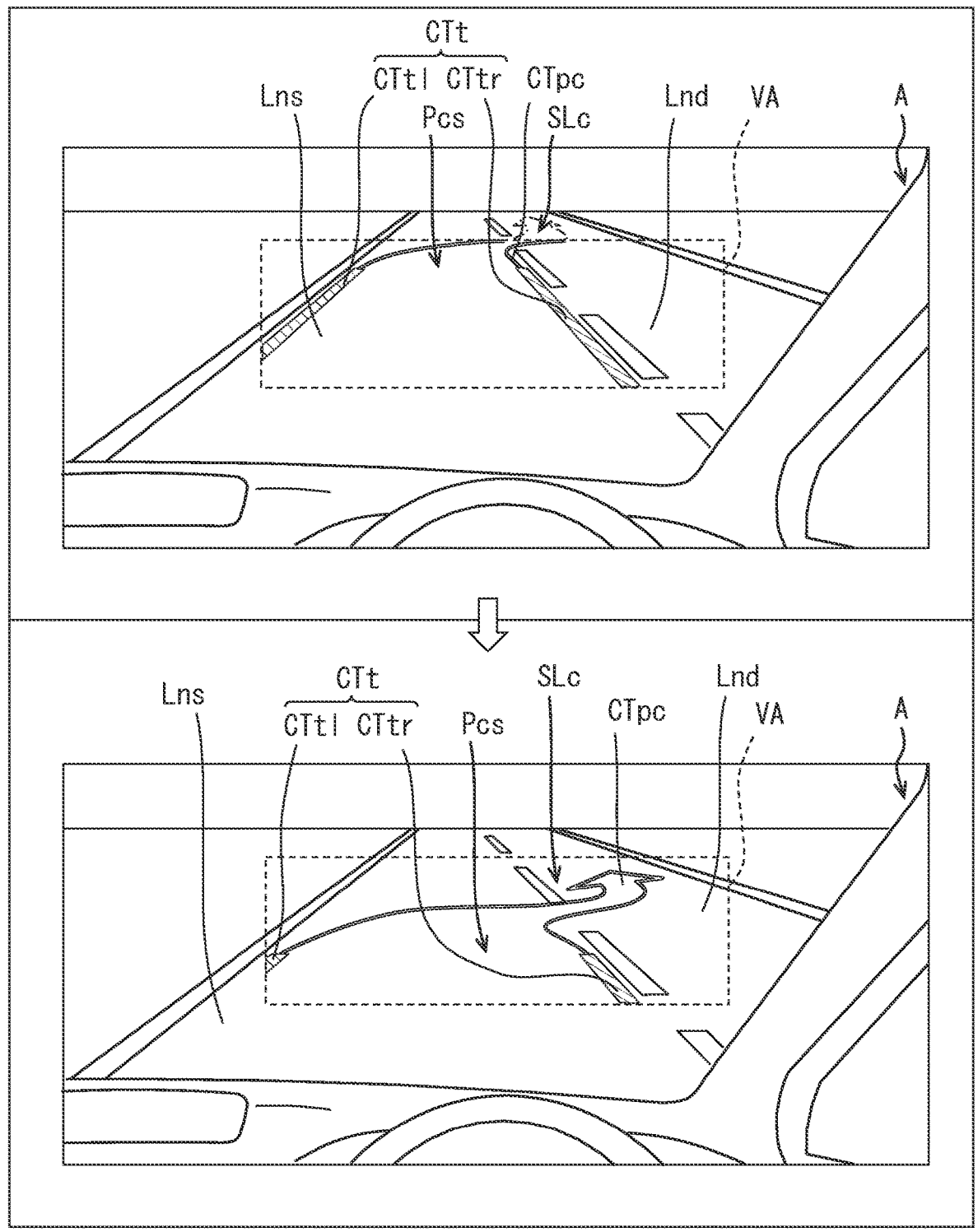
FIG. 25 is a diagram illustrating an LCA standby display of the second embodiment, of a case where the LC execution section is positioned inside the angle of view.

The LCA standby display shown in FIG. 25 is an LCA standby display when the LC execution section SLc is within the angle of view VA. The LCA standby display includes the LTA execution content CTt and the LCA announcement content CTpc. Also in the second embodiment, the LTA execution content CTt gradually shortens the boundary lines CTtl and CTtr as the LC transition point Pcs approaches the vehicle A.

The LCA announcement content CTpc has an arrow shape extending from the subject vehicle lane Lns to the destination lane Lnd. The LCA announcement content CTpc is located ahead of the LTA execution content CTt and is displayed in an arrangement that does not overlap with the LTA execution content CTt. The base end portion of the LCA announcement content CTpc is continuous with the tip end portions of the boundary lines CTtl and CTtr, respectively. When the LC transition point Pcs is near the upper edge of the angle of view VA, the LCA announcement content CTpc has a drawing shape in which the tip portion (see chain double-dashed line) indicating the traveling direction is cut off from the angle of view VA. Then, when the LC transition point Pcs reaches near the center of the angle of view VA, almost the entire LCA announcement content CTpc is displayed.

Figure 26:
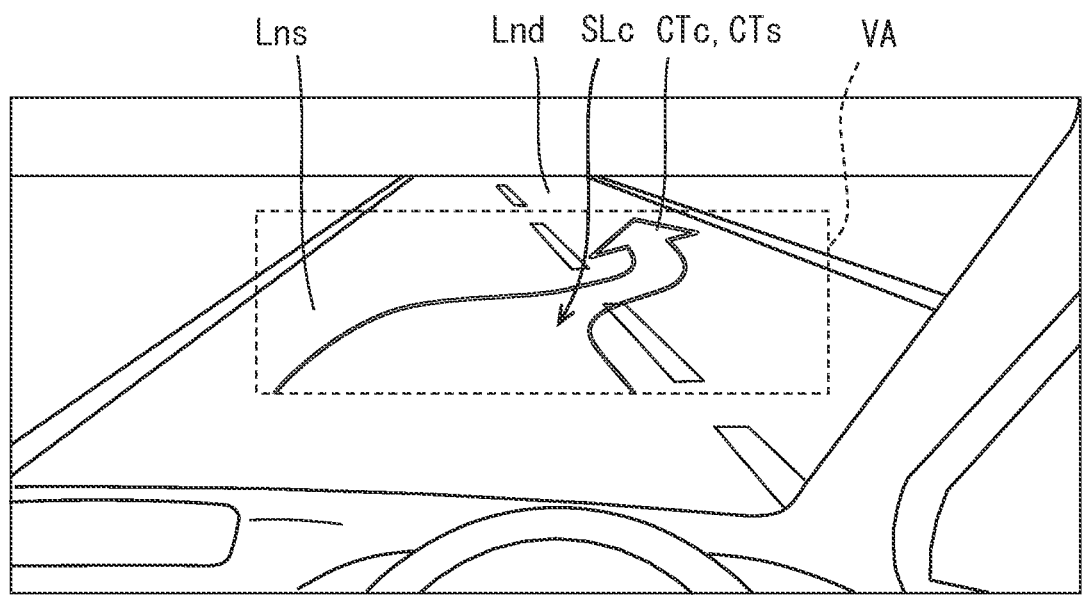
FIG. 26 is a diagram illustrating an LCA execution display of the second embodiment.

The LCA execution display shown in FIG. 26 includes the LCA execution content CTc. Also in the LCA execution display of the second embodiment, the LTA execution content CTt (see FIG. 25) is hidden. The LCA execution content CTc is displayed in substantially the same mode as the LCA announcement content CTpc (see FIG. 25) when the LC execution section SLc is within the angle of view VA. The LCA execution content CTc has the arrow shape extending from the subject vehicle lane Lns to the destination lane Lnd. As a result, a smooth display transition is carried out from the LCA announcement content CTpc to the LCA execution content CTc.

Figure 27:
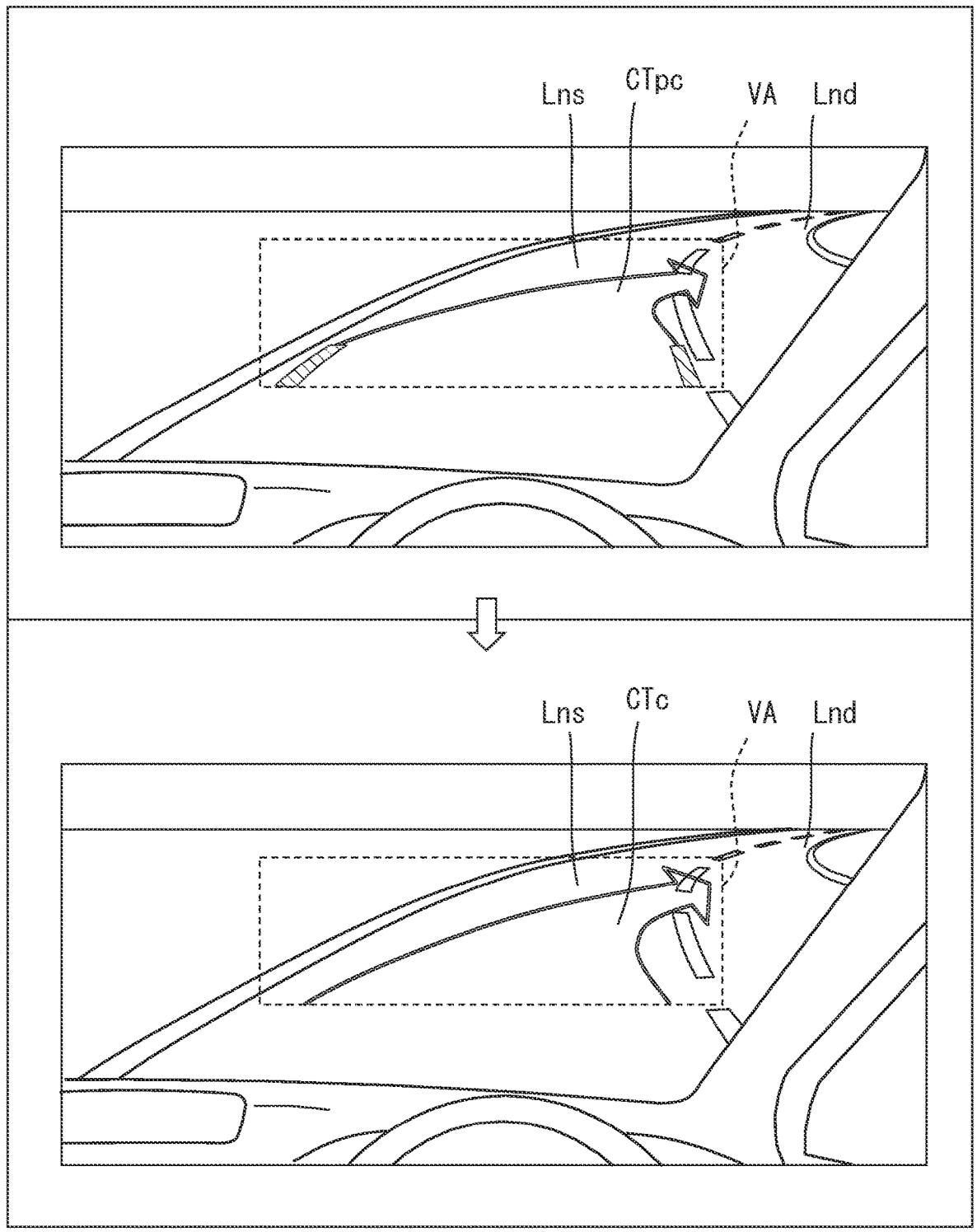
FIG. 27 is a diagram illustrating an LCA standby display and an LCA execution display of the second embodiment, of a case where the destination lane is not positioned inside the angle of view.

The LCA standby display and the LCA execution display shown in FIG. 27 are displays selected in a driving scene in which the road surface of the destination lane Lnd does not enter the angle of view VA. In each display in such a driving scene, the LCA announcement content CTpc and the LCA execution content CTc are mainly superimposed on the road surface of the subject vehicle lane Lns within the angle of view VA, and each have an arrow shape indicating the direction of the destination lane Lnd at the tip portion. Therefore, each content CTpc and CTc exerts a function of indicating an execution schedule and an estimated trajectory of the lane change even if the range of the road surface range to which the display is superimposed is limited.

Figure 28:
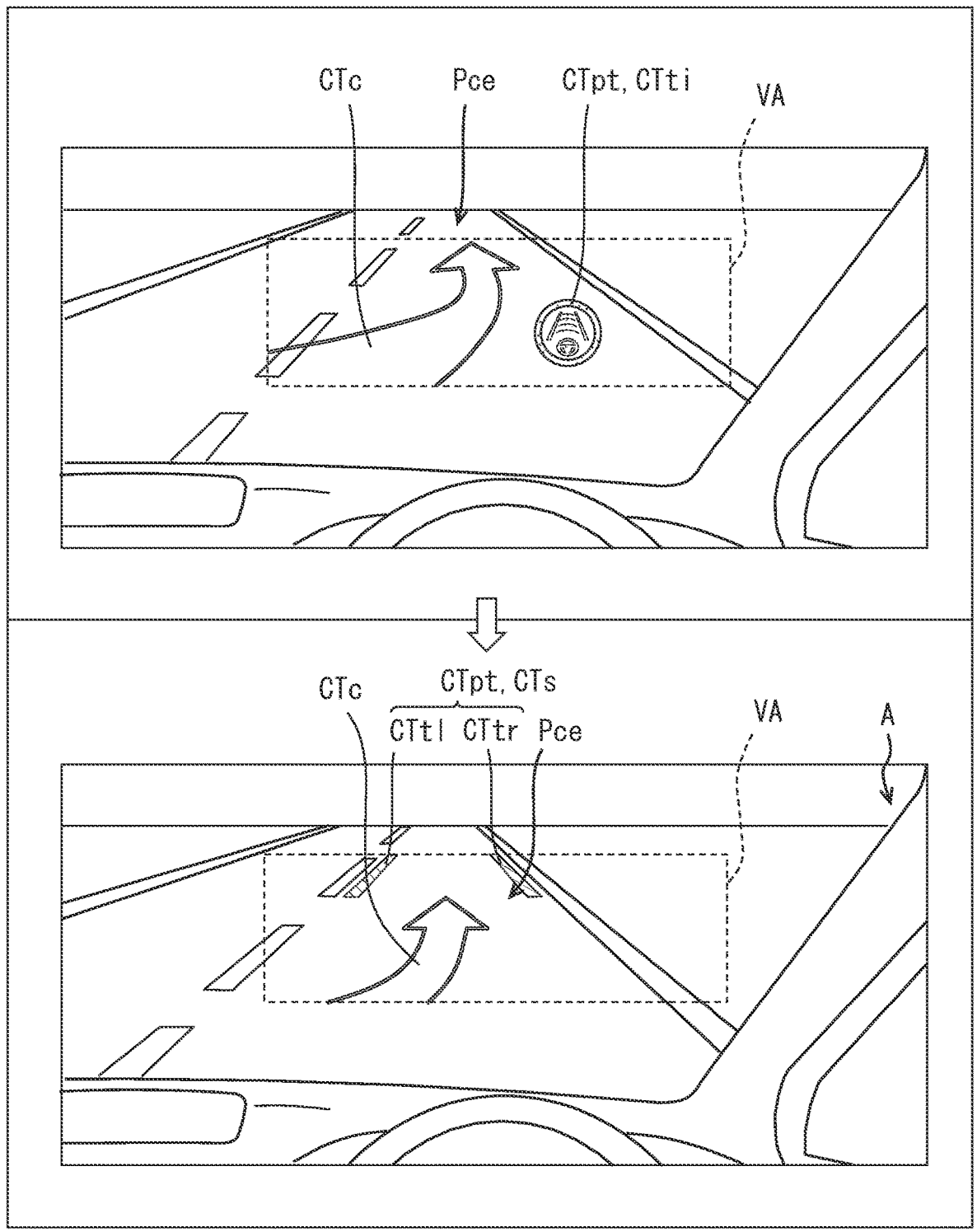
FIG. 28 is a diagram illustrating an LTA transition display of the second embodiment.
Figure 29:
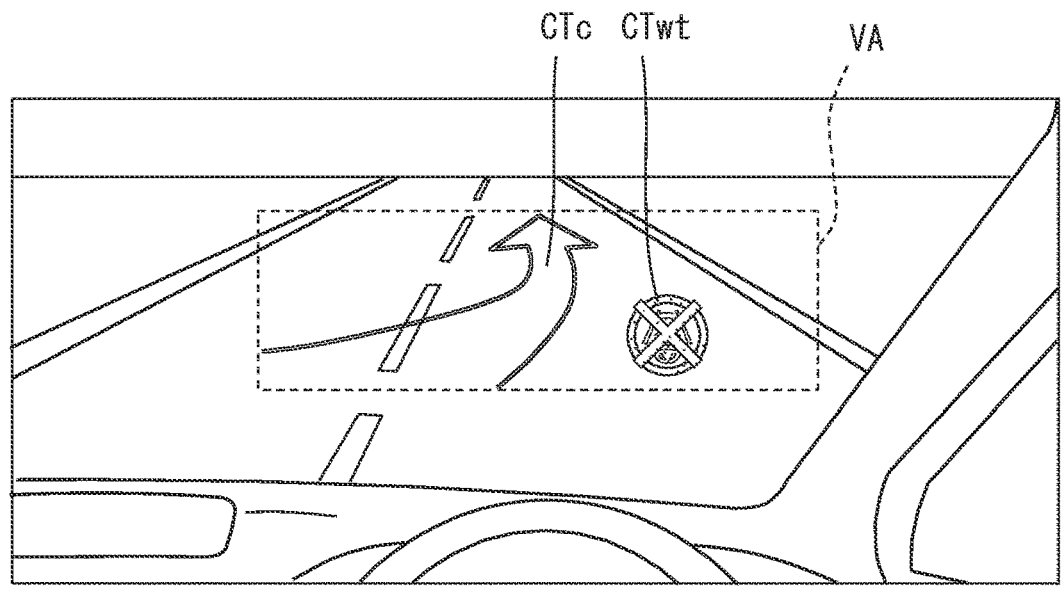
FIG. 29 is a diagram illustrating an LTA standby display of the second embodiment.

The LTA transition display shown in FIG. 28 includes the LTA announcement content CTpt in addition to the LCA execution content CTc described above. When the LTA transition point Pce is outside the angle of view VA, the LTA icon CTti is displayed as the LTA announcement content CTpt as in the first embodiment. The LTA icon CTti is displayed in an arrangement that does not overlap with the LCA execution content CTc, on the side of the LCA execution content CTc On the other hand, when the LTA transition point Pce is within the angle of view VA, the LTA announcement content CTpt is displayed as the superimposition content CTs. The LTA announcement content CTpt is displayed in substantially the same mode as the LTA execution content CTt (see FIG. 22), and includes the boundary lines CTtl and CTtr. The boundary lines CTtl and CTtr are located ahead of the LCA execution content CTc and are displayed in an arrangement that does not overlap with the LCA execution content CTc. The boundary lines CTtl and CTtr indicate the scheduled trajectory of the in-lane traveling after the completion of the lane change. As the LTA transition point Pce approaches the vehicle A, the LTA execution content CTc contracts, and the boundary lines CTtl and CTtr gradually extend downward (toward the subject vehicle side).

In addition to the LCA execution content CTc described above, the LTA standby display shown in FIG. 29 includes the LTA standby content CTwt having a drawing shape substantially the same as that of the first embodiment. The LTA standby content CTwt is displayed in the angle of view VA and at a position that does not overlap with the LCA execution content CTc and is aligned with the LCA execution content CTc.

Figure 30:
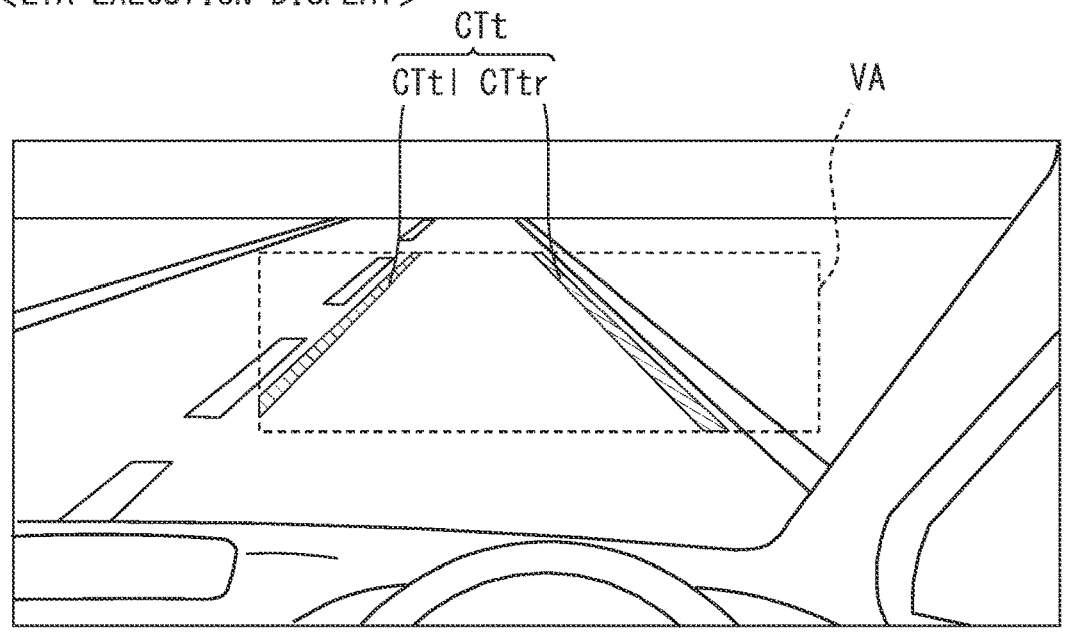
FIG. 30 is a diagram illustrating an LTA execution display after the completion of a lane change by the LCA function.

The LTA execution display after the lane change shown in FIG. 30 includes the LTA execution content CTt as in the LTA execution display before the lane change (see FIG. 22). The LTA execution content CTt has the boundary line CTtl and CTtr in common with those of the LTA announcement content CTpt (see FIG. 28). That is, the display transition from the LTA announcement content CTpt to the LTA execution content CTt is executed by extending the boundary lines CTtl and CTtr to the vicinity of the lower edge of the angle of view VA, In the second embodiment described above, the similar effects to those in the first embodiment can be achieved. As a result, the driver can recognize the transition schedule of the control from the change in the display recognized through the normal visual behavior. Therefore, it is possible to provide easy-to-understand guidance regarding the in-lane traveling and the lane change.

In addition, in the second embodiment, the LTA execution content CTt and the LTA announcement content CTpt are displayed to superimposed on the road surface in an arrangement that is continuous with each other and does not overlap with each other. According to such a content display, the change point from the in-lane traveling control to the lane change control is presented to the driver in easy-to-understand manner.

Third Embodiment

Figure 31:
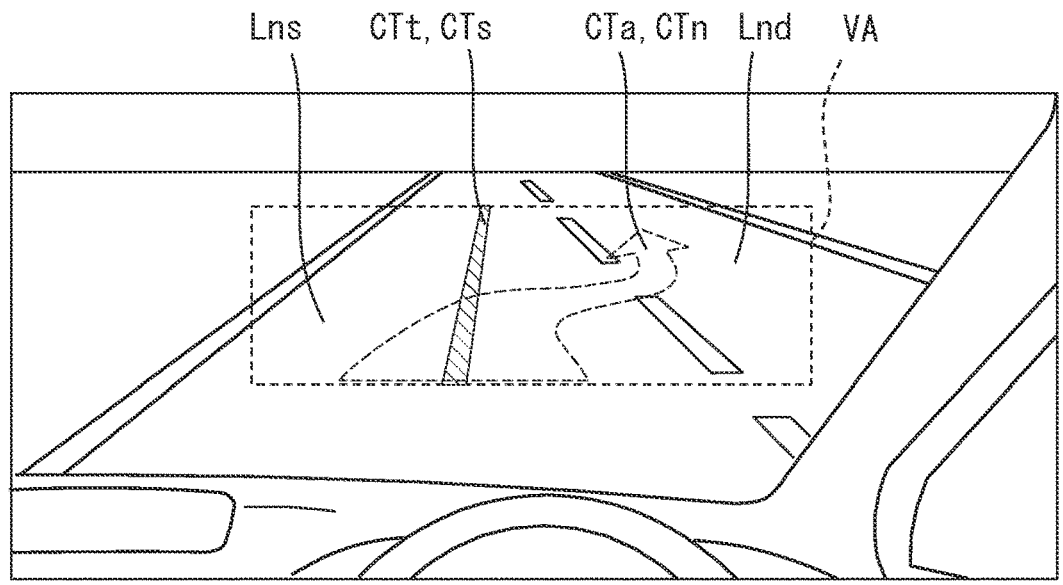
FIG. 31 is a diagram illustrating an LCA acceptance display of a third embodiment of the present disclosure.
Figure 32:
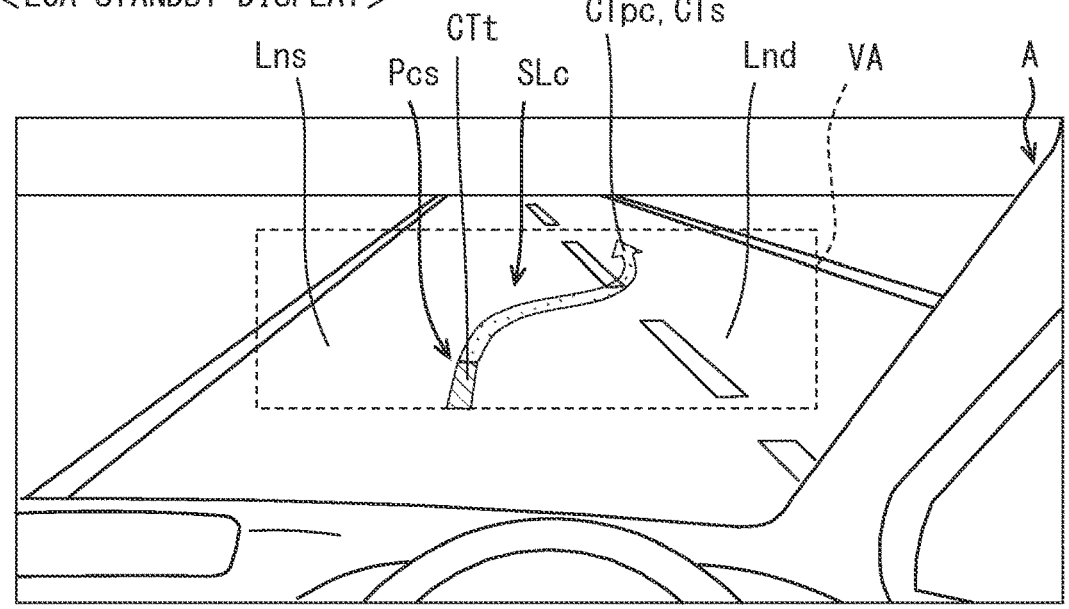
FIG. 32 is a diagram illustrating an LCA standby display of the third embodiment.
Figure 33:
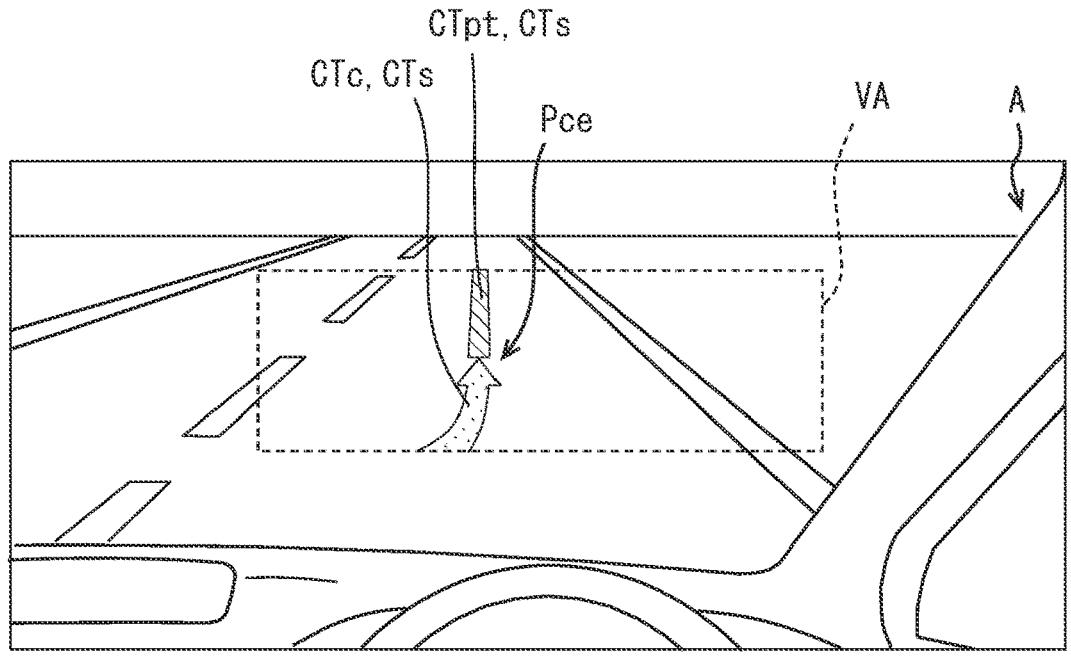
FIG. 33 is a diagram illustrating an LTA transition display of the third embodiment.

A third embodiment of the present disclosure shown in FIGS. 31 to 33 is another modification of the first embodiment. Also in the third embodiment, the drawing shape of each content is different from the first and second embodiments described above. Hereinafter, the details of the display of each pattern of the third embodiment will be described in order based on FIGS. 31 to 33 with reference to FIGS. 3 to 5. The LTA execution display of the third embodiment is substantially the same as that of the first embodiment.

The LCA acceptance display shown in FIG. 31 includes the LTA execution content CTt and the response notification content CTa. The LTA execution content CTt is a superimposition content CTs substantially the same as those in the first embodiment, and is displayed to be superimposed in the center of the subject vehicle lane Lns.

The response notification content CTa is a non-superimposition content CTn, and the drawing shape and drawing size of the response notification content CTa in the angle of view VA are predetermined so as to be superimposed over both the subject vehicle lane Lns and the destination lane Lnd. Similar to the LCA announcement content CTpc (see FIG. 32) and the LCA execution content CTc (see FIG. 33) described later, the response notification content CTa has an arrow shape that extends from the subject vehicle lane Lns toward the adjacent lane corresponding to the input direction of the on-operation. The response notification content CTa is displayed in a mode that is less attractive than the LTA execution content CTt. As an example, the response notification content CTa is displayed with a display brightness lower than that of the LTA execution content CTt. Further, the response notification content CTa may be drawn in a broken line shape in outline or in whole.

The LCA standby display shown in FIG. 32 is an LCA standby display when the LC execution section SLc is within the angle of view VA. The LCA standby display includes the LTA execution content CTt and the LCA announcement content CTpc. The LTA execution content CTt extends in a strip shape to the front side (subject vehicle side) of the LC transition point Pcs.

The LCA announcement content CTpc is a superimposition content CTs having an arrow shape, and extends from the subject vehicle lane Lns to the destination lane Lnd while being curved. The base end portion of the LCA announcement content CTpc is located at the LC transition point Pcs, and is continuous with the tip end portion of the LTA execution content CTt at this LC transition point Pcs. The tip portion of the LCA announcement content CTpc is superimposed on the road surface of the destination lane Lnd and indicates the traveling direction of the vehicle A.

The LCA announcement content CTpc, together with the LTA execution content CTt, indicates the estimated trajectory of the vehicle A. The connected portion of the LCA announcement content CTpc and the LTA execution content CTt moves downward (front side) in the angle of view VA in accordance with the movement of the LC transition point Pcs in the foreground. As a result, the display change in which the LTA execution content CTt contracts and the display change in which the LCA announcement content CTpc expands are both implemented as the vehicle A travels.

The LTA transition display shown in FIG. 33 includes the LCA execution content CTc and the LTA announcement content CTpt. The LCA execution content CTc is a superimposition content CTs having an arrow shape, similar to the above-described LCA announcement content CTpc (see FIG. 32). The LCA execution content CTc extends in a band shape along the scheduled traveling line PRL to the front side (subject vehicle side) of the LTA transition point Pce.

Similar to the above-mentioned LTA execution content CTt (see FIG. 31), the LTA announcement content CTpt is a superimposition content CTs having a strip shape, and extends from the LTA transition point Pce toward a far side along the scheduled traveling line PRL. The base end portion of the LTA announcement content CTpt is continuous with the tip end portion of the LCA execution content CTc at the LTA transition point Pce.

The connected portion of the LTA announcement content CTpt and the LCA execution content CTc moves downward (front side) in the angle of view VA in accordance with the movement of the LTA transition point Pce in the foreground. As a result, the display change in which the LTA announcement content CTpt contracts and the display change in which the LCA execution content CTc expands are both implemented as the vehicle A travels.

In the LCA execution display of the third embodiment, the LCA execution content CTc described above is displayed to be superimposed to extend across the subject vehicle lane Lns and the destination lane Lnd. Further, in the LTA standby display of the third embodiment, the LTA standby content CTwt (see FIG. 29), which has an icon shape substantially the same as that of the second embodiment, is displayed in the vicinity of the LCA execution content CTc described above.

The third embodiment described so far also achieves the similar effects to those of the first embodiment, and the driver can recognize the transition schedule of the control from the change in the display recognized through the normal visual action. Therefore, it is possible to provide easy-to-understand guidance regarding the in-lane traveling and the lane change.

Fourth Embodiment

A fourth embodiment of the present disclosure shown in FIGS. 34 to 39 is still another modification of the first embodiment. In the fourth embodiment, the display of the superimposition content CTs is suppressed in order to reduce the annoyance of the driver. Specifically, the display generation unit 75 does not always display the LTA execution content CTt in the LTA execution display (see FIG. 7) during the in-lane traveling by the lane keeping control unit 51. The display generation unit 75 alternately repeats the period for displaying the LTA execution content CTt and the period for hiding the LTA execution content CTt at a predetermined cycle.

In addition, the display generation unit 75 exclusively displays only one of the superimposition content CTs related to the LTA and the superimposition content CTs related to the LCA. Hereinafter, a LCA acceptance display (see FIG. 34), a LCA standby display (see FIG. 35), a LCA cancellation display (see FIG. 36), a LTA transition display (see FIG. 37), a LTA standby display (see FIG. 38), and a LCA execution display (see FIG. 39) of the fourth embodiment will be described in order.

Figure 34:
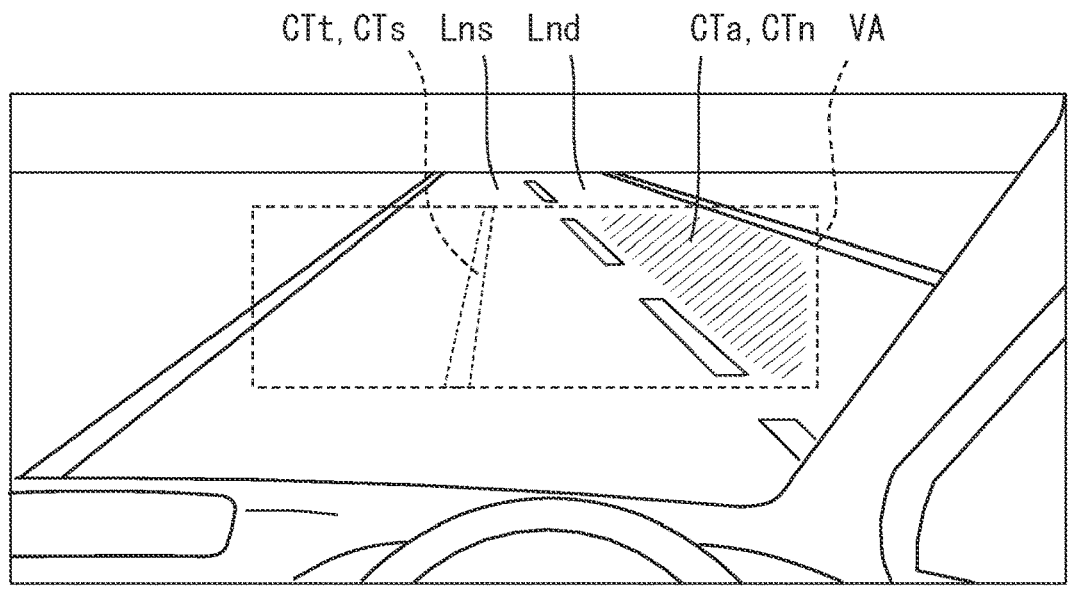
FIG. 34 is a diagram illustrating an LCA acceptance display of a fourth embodiment of the present disclosure.

In the LCA acceptance display shown in FIG. 34, the LTA execution content CTt is hidden. More specifically, the display generation unit 75 ends the display of the LTA execution content CTt, when acquiring LCA information, specifically, operation information indicating an on operation of the turn signal switch 56 (direction indicator) during the in-lane traveling (see FIG. 19, S105). The display generation unit 75 ends the display of the LTA execution content CTt, and then starts the display of the response notification content CTa (see FIG. 19, S106). The display of the response notification content CTa is started promptly without delay after the display of the LTA execution content CTt is ended. The display of the LTA execution content CTt may be stopped substantially simultaneously with the start of the display of the response notification content CTa.

Figure 35:
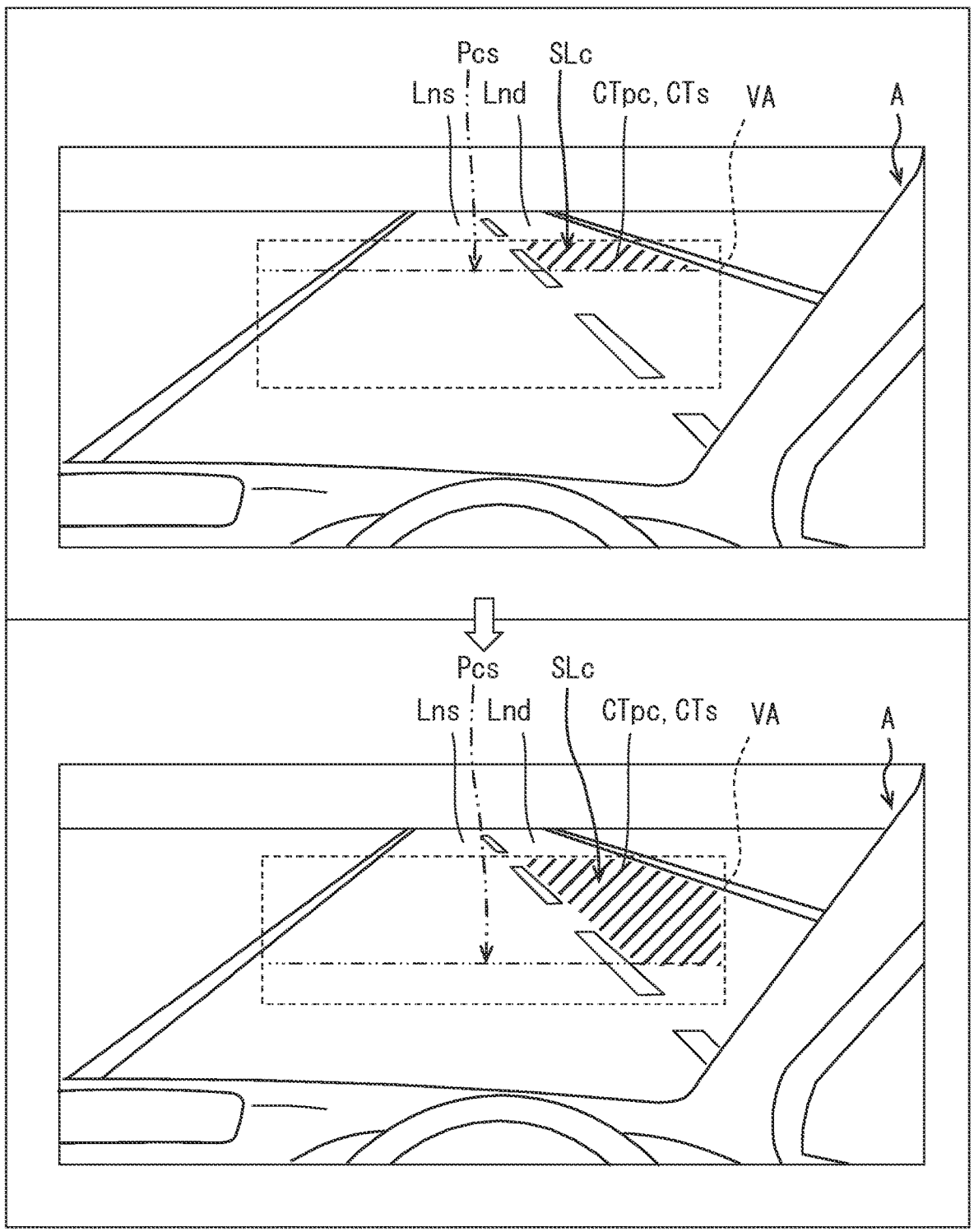
FIG. 35 is a diagram illustrating an LCA standby display of the fourth embodiment.

In the LCA standby display shown in FIG. 35, the LTA announcement content CTpt is displayed instead of the response notification content CTa. That is, after finishing the display of the LTA execution content CTt, the display generation unit 75 temporarily displays the response notification content CTa, and then displays the LCA announcement content CTpc indicating the estimated trajectory of the lane change based on the LCA information. As described above, in the LCA standby display, only the LCA announcement content CTpc is displayed as the superimposition content CTs related to the LTA and the LCA. Similar to the first embodiment, the LCA announcement content CTpc is superimposed on the road surface of the destination lane Lnd on the far side (LC execution section SLc) of the LC transition point Pcs.

In a case where the LCA information is acquired in the period where the LTA execution content CTt is hidden, the display generation unit 75 sequentially displays the response notification content CTa and the LCA announcement content CTpc without displaying the LTA execution content CTt.

Figure 36:
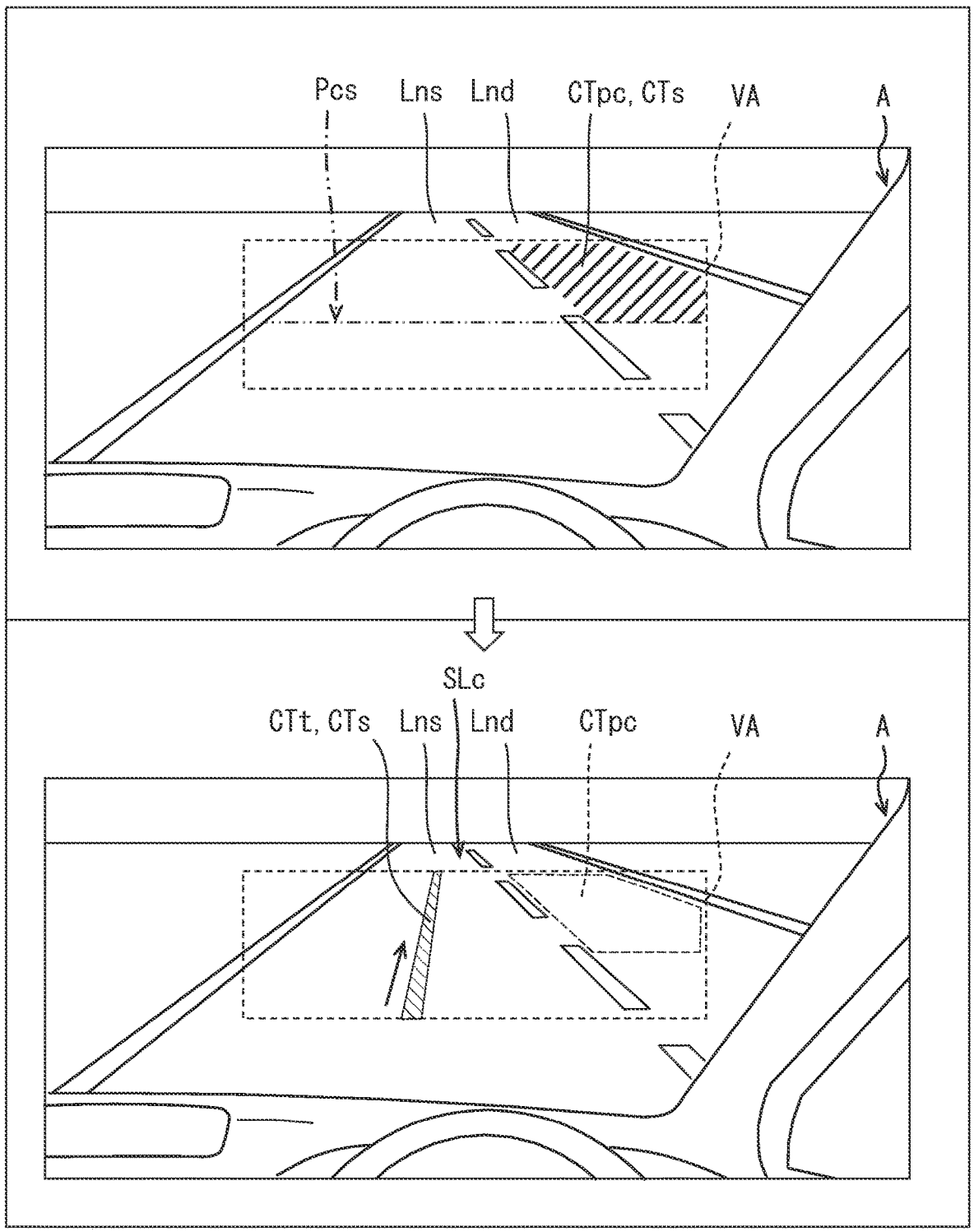
FIG. 36 is a diagram illustrating an LCA cancellation display of the fourth embodiment.

In the LCA cancellation display shown in FIG. 36, the display of the LCA announcement content CTpc or the LCA standby content CTwc (see FIG. 9) is terminated based on the transition to the off state of the LCA function (see the broken line range in the lower part of FIG. 36). After terminating the display of the superimposition content CTs related to the LCA, the display generation unit 75 displays the LTA execution content CTt indicating the estimated trajectory of the in-lane traveling based on the LTA information. The LTA execution content CTt is highlighted as an animation extending from the lower edge (subject vehicle side) of the angle of view VA toward the upper edge (far side). As described above, even in the LCA cancellation display, only one superimposition content CTs related to the LTA or the LCA is displayed.

Figure 37:
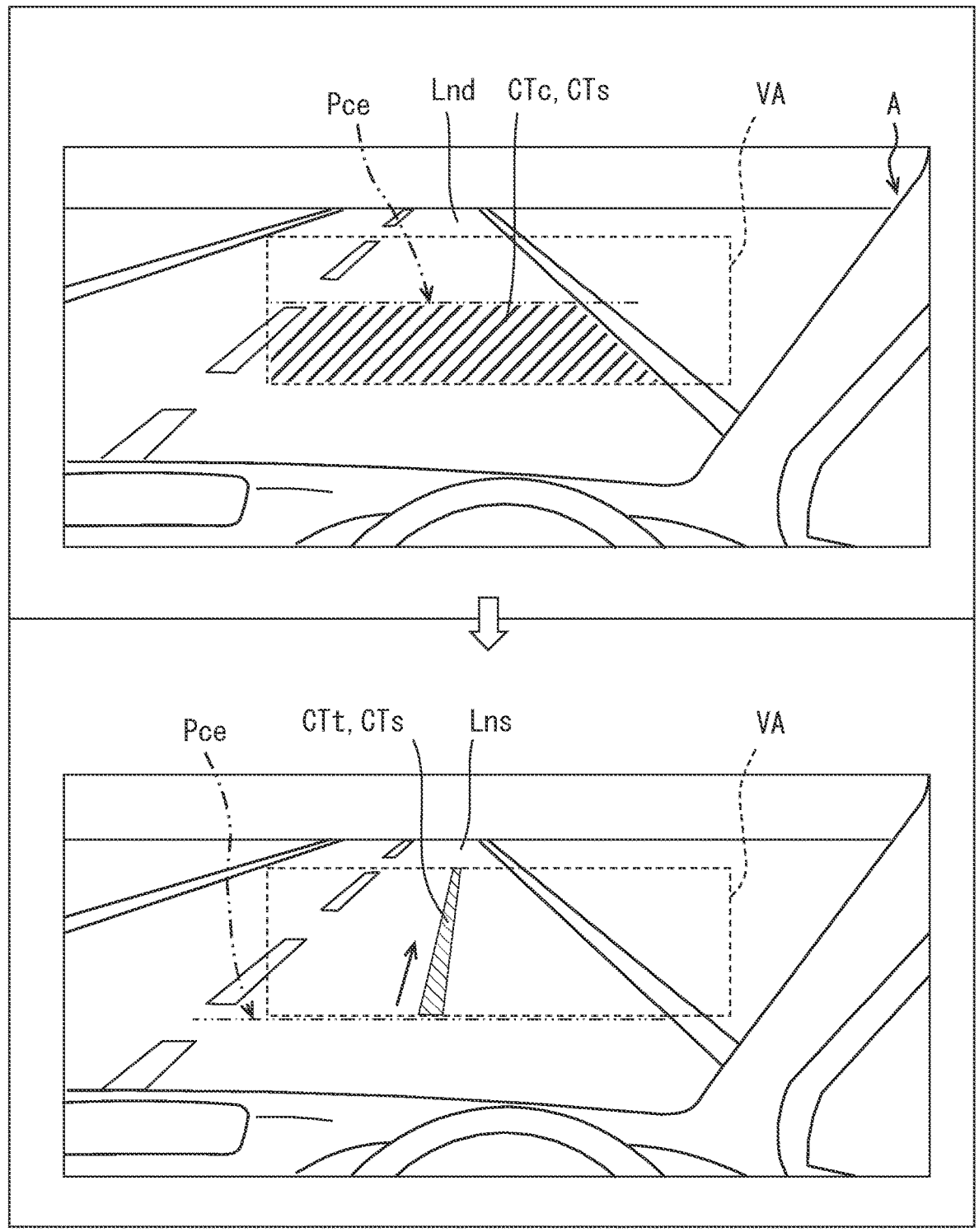
FIG. 37 is a diagram illustrating an LTA standby display of the fourth embodiment.

In the LTA transition display shown in FIG. 37, the LCA execution content CTc and the LTA execution content CTt are displayed in order. When the LTA transition point Pce moves out of the angle of view VA, the display generation unit 75 terminates the display of the LCA execution content CTc and starts the display of the LTA execution content CTt. In the LTA transition display, the LTA execution content CTt is displayed as an animation to extend along the subject vehicle lane Lns from the front side to the far side. The display generation unit 75 displays the LTA execution content CTt for a predetermined time (for example, about 5 seconds), and then starts alternately repeating the hiding period and the display period. The repetition of displaying and hiding the LTA execution content CTt may be omitted.

Figure 38:
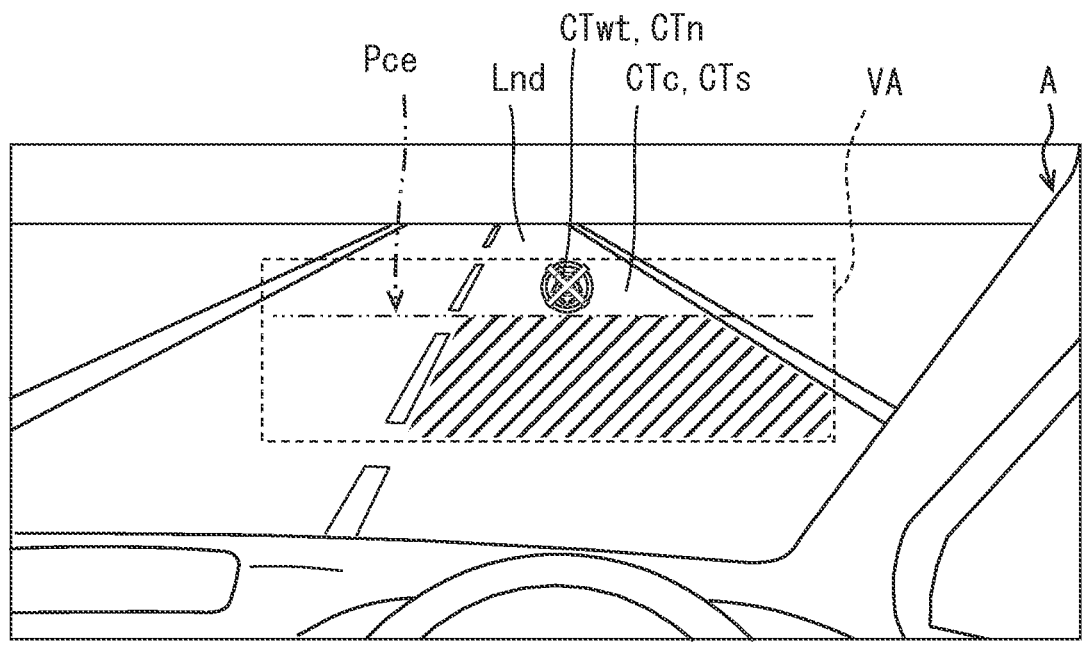
FIG. 38 is a diagram illustrating an LTA transition display of the fourth embodiment.

The LTA standby display shown in FIG. 38 is an example displayed at a stage where the in-lane traveling after the lane change is not available. The LTA standby display at this stage functions as an LTA unavailable display that notifies the driver that the in-lane traveling will not be resumed. Similar to the first embodiment, the LTA standby display includes the LCA execution content CTc and the LTA standby content CTwt.

The LCA execution content CTc is displayed to be superimposed on the road surface of the destination lane Lnd on the front side (subject vehicle side) of the LTA transition point Pce. The LTA standby content CTwt has substantially the same drawing shape as that of the first embodiment, and is displayed above (far side of) the LCA execution content CTc (LTA transition point Pce). The LTA standby content CTwt is the non-superimposition content CTn and is displayed at the center of the angle of view VA in the horizontal direction. As a result, the LTA standby content CTwt is visually recognized so as to overlap the road surface on a far side in the destination lane Lnd.

Figure 39:
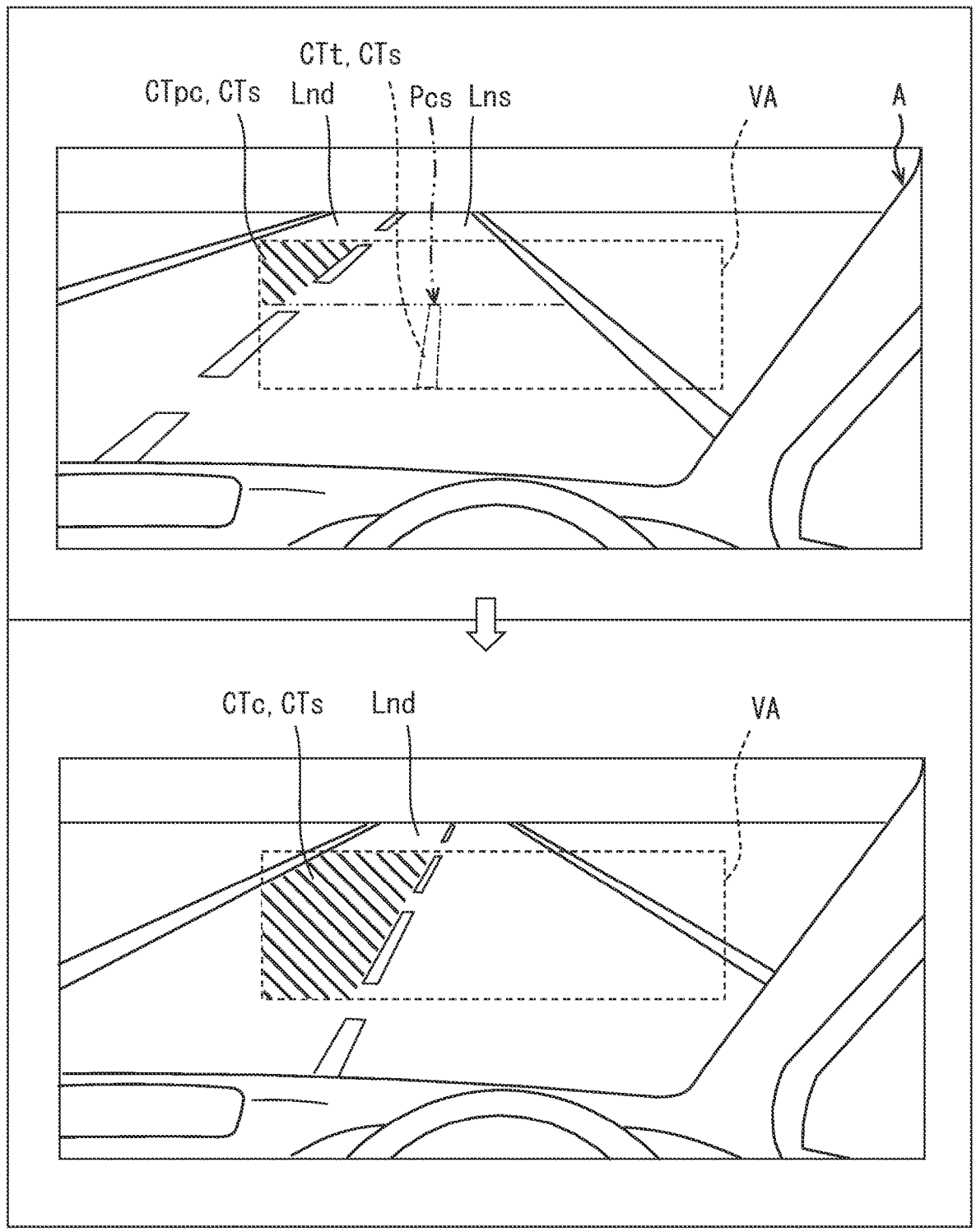
FIG. 39 is a diagram illustrating an LCA standby display and an LCA execution display of the fourth embodiment.

Also in the LTA standby display of the second lane change shown in FIG. 39, the LTA announcement content CTpc is displayed after the display of the LTA execution content CTt is terminated. The display generation unit 75 hides the LTA execution content CTt in the display period of the LTA execution content CTt, and starts displaying the LCA announcement content CTpc as it is in the hiding period of the LTA execution content CTt.

Then, when the vehicle A reaches the LC transition point Pcs, the LCA standby display is changed to the LCA execution display, and the LTA announcement content CTpt turns to the LCA execution content CTc. In a case where the lane change is started immediately after the driver's on operation to the turn signal switch 56, the display generation unit 75 shifts the LTA execution content CTt to the LCA execution content CTc while omitting the display of the LCA standby content CTwc.

In the fourth embodiment described so far, when shifting from the in-lane traveling by the lane keeping control unit 51 to the lane change by the lane change control unit 52, the LCA announcement content CTpc indicating the estimated trajectory of the lane change is displayed in place of the LTA execution content CTt. The LTA execution content CTt is the superimposition content CTs displayed to be superimposed on the road surface. As described above, if the LTA execution content CTt and the LCA announcement content CTpc (or the LCA execution content CTc) are sequentially displayed, the driver can recognize the transition schedule of the control from the change in the display recognized through the normal visual action. Therefore, it is possible to provide easy-to-understand guidance regarding the in-lane traveling and the lane change.

The process of terminating the display of the LTA execution content CTt can be performed at a timing different from the LCA acceptance display (S106) that is displayed when the turn signal switch 56 is turned on (FIG. 19, S105: YES). Specifically, the display of the LTA-related superimposition content CTs may be terminated at the timing when the peripheral check is completed (S107: YES) or the timing when the automatic lane change becomes available (S108: YES). In the fourth embodiment, the LCA execution content CTc, the LCA announcement content CTpc, and the LCA standby content CTwc correspond to the "lane change content".

Fifth Embodiment

Figure 40:
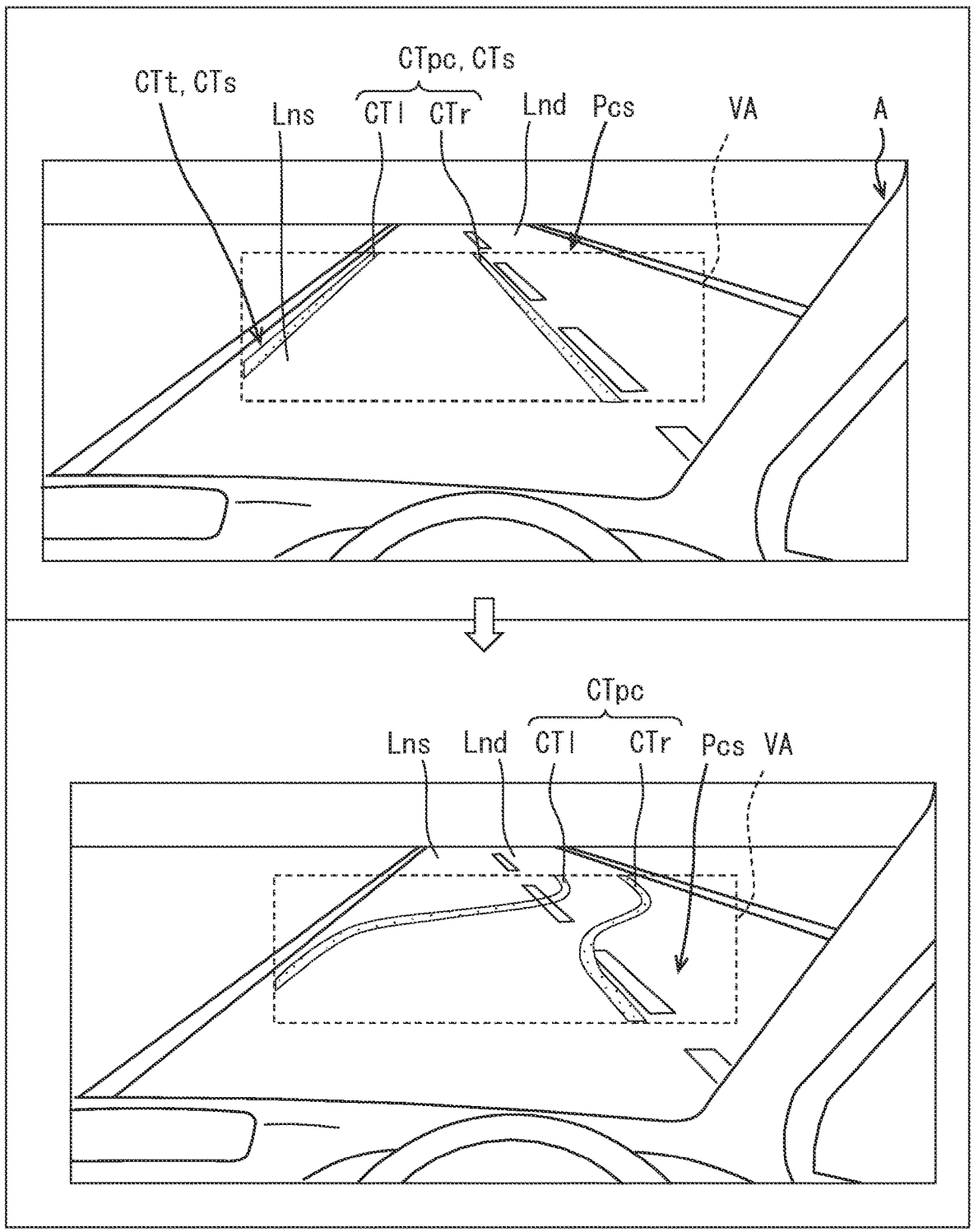
FIG. 40 is a diagram illustrating an LCA standby display of a fifth embodiment of the present disclosure.
Figure 41:
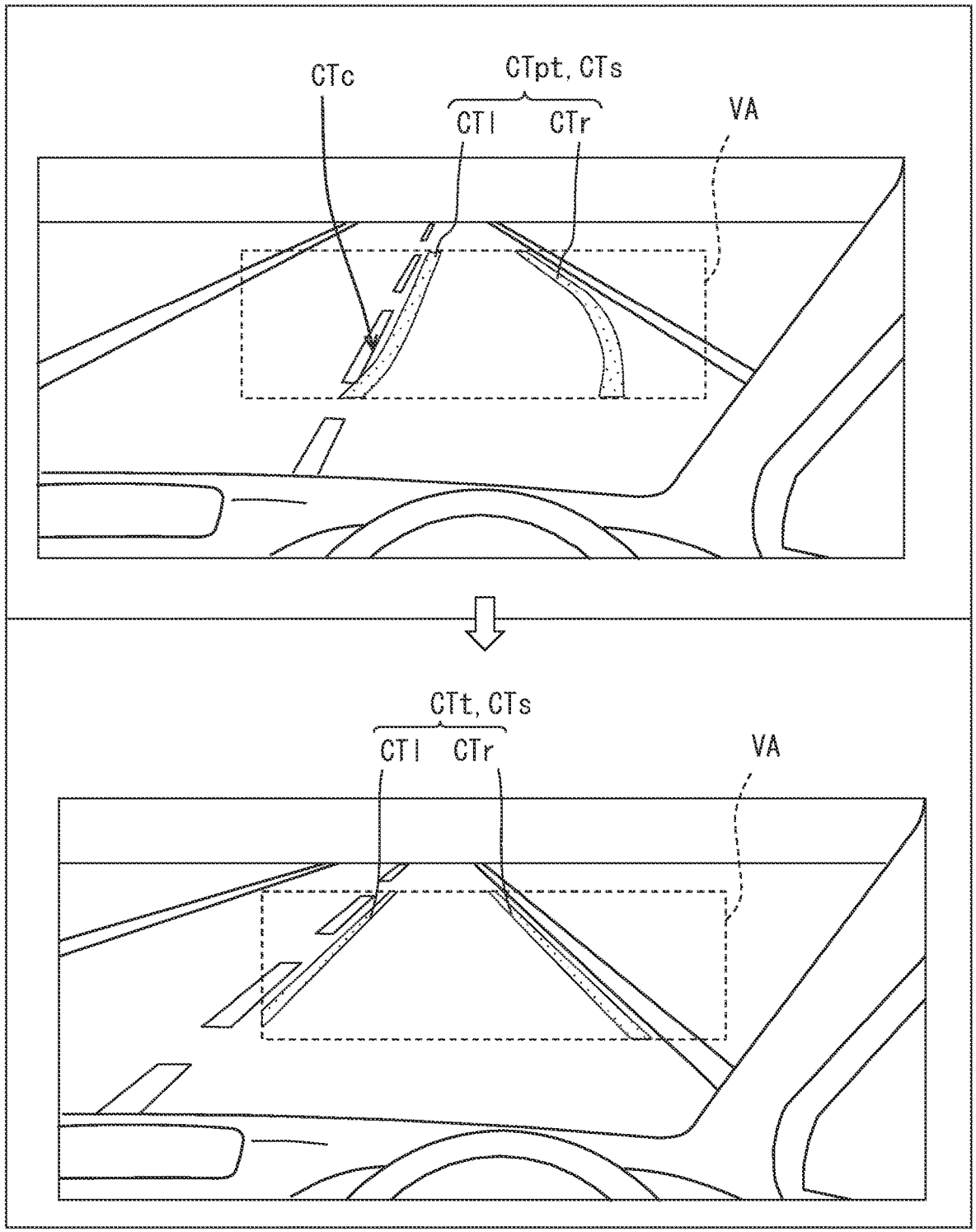
FIG. 41 is a diagram illustrating an LCA execution display and a subsequent LTA execution display of the fifth embodiment.
Figure 42:
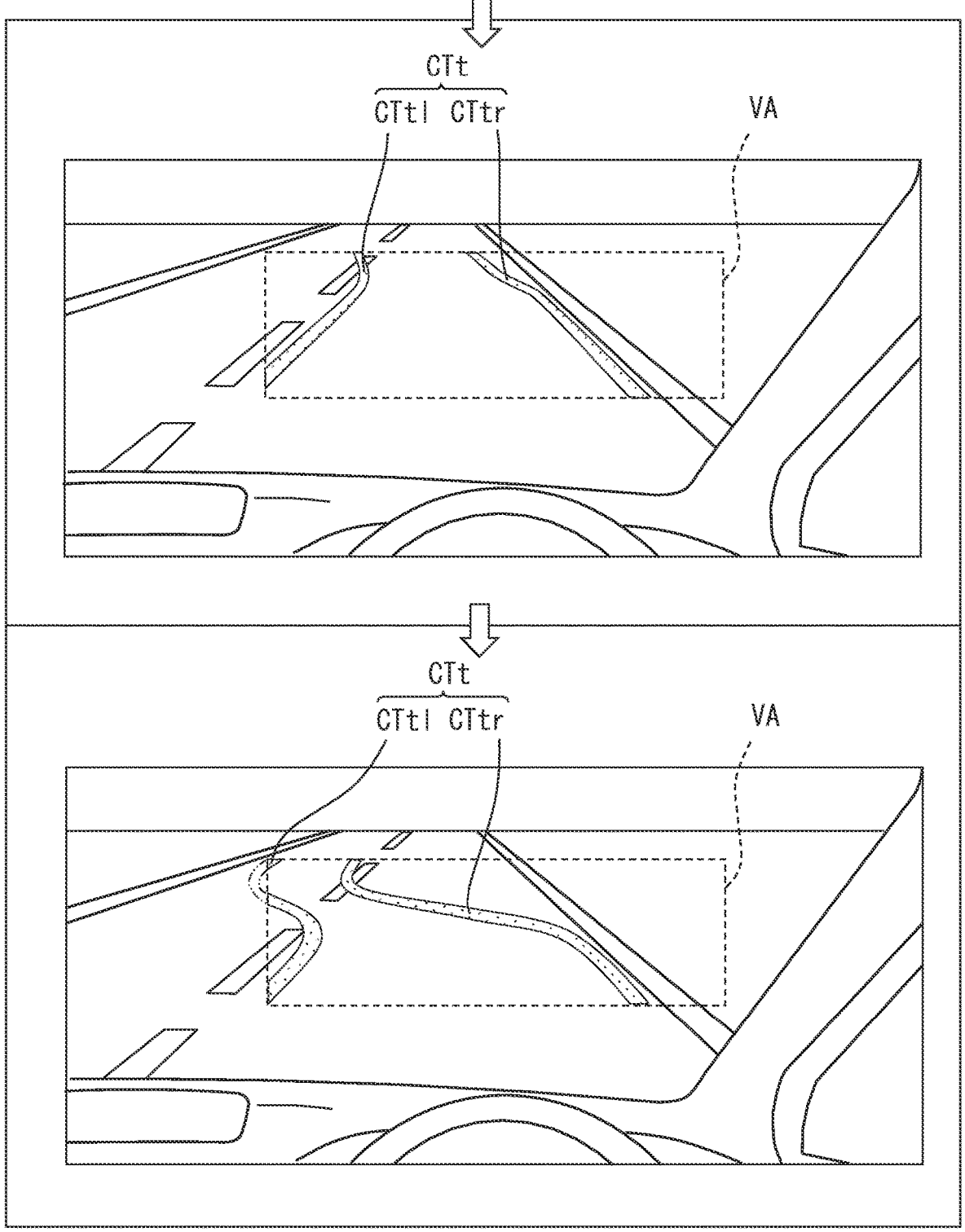
FIG. 42 is an LCA standby display of the fifth embodiment.

A fifth embodiment of the present disclosure shown in FIGS. 40 to 42 is a modification of the second embodiment. In the fifth embodiment, the drawing shapes of a LCA announcement content CTpc and a LCA execution content CTc are different from those of the second embodiment. Each content CTpc, CTc of the fifth embodiment includes a left boundary line CTcl and a right boundary line CTcr. The boundary lines CTcl and CTcr are respectively drawn so as to be integrally continuous with the boundary lines CTtl and CTtr of the LTA announcement content CTpt or the LTA execution content CTt. That is, each boundary line CTcl, CTcr is displayed with substantially the same display color and display brightness as each boundary line CTtl, CTtr.

In the LCA standby display shown in FIG. 40, the left boundary line CTl and the right boundary line CTr transition from the LTA execution content CTt to the LCA announcement content CTpc while maintaining the display state, based on the on operation of the turn signal switch 56 by the driver. The left boundary line CTl and the right boundary line CTr are superimposed on the road surface in the foreground so as to indicate the shape of the scheduled traveling line PRL (see FIG. 4) based on the line shape information.

Specifically, the display generation unit 75 moves the front ends (ends on the far side) of the left boundary line CTl and the right boundary line CTr from the subject vehicle lane Lns to the destination lane Lnd in accordance with the approach of the LC transition point Pcs. As such, the left boundary line CTl and the right boundary line CTr extending while curving from the road surface of the subject vehicle lane Lns to the road surface of the destination lane Lnd are displayed. Each of the boundary lines CTl and CTr becomes the LTA execution content CTt after the LTA transition point Pce moves out of the angle of view VA.

Also in the LCA execution display and the LTA execution display shown in FIG. 41, the left boundary line CTl and the right boundary line CTr present the shape of the scheduled traveling line PRL to the driver. In the LCA execution display (see the upper part of FIG. 41), the boundary lines CTl and CTr are superimposition content CTs that also serve as the LCA execution content CTc and the LTA announcement content CTpt. Further, in the LTA execution display (see the lower part of FIG. 41), the boundary lines CTl and CTr are displayed as the LTA execution content CTt.

Also in the LCA standby display in the second lane change shown in FIG. 42, the rear ends of the boundary lines CTl and CTr are transformed from the subject vehicle lane Lns to the destination lane Lnd, based on the on operation of the turn signal switch 56 by the driver. Through such animation, each boundary line CTl, CTr transitions from the LTA execution content CTt to the LTA announcement content CTpt or the LTA execution content CTt.

In the fifth embodiment described so far, after the completion of the first lane change, a situation that the in-lane traveling is in the execution state and a situation that the second lane change is started are continuously presented by the boundary lines CTl and CTr. Accordingly, the driver can recognize the transition schedule of the control from the change in the display recognized through the normal visual action, as in the fourth embodiment in which only one superimposition content CTs related to LTA and LCA is displayed. Therefore, it is possible to provide easy-to-understand guidance regarding the in-lane traveling and the lane change.

Sixth Embodiment

A sixth embodiment of the present disclosure illustrated in FIGS. 43 to 46 is still another modification of the first embodiment. An LCA standby content CTwc and an LCA execution content CTc of the sixth embodiment are displayed in a mode that fills the road surface of the destination lane Lnd, as in the first embodiment. A LTA execution content CTt and a LTA announcement content CTpt include two boundary lines CTtl and CTtr, as in the second embodiment.

The distance between the boundary lines CTtl and CTtr is defined with reference to the vehicle width of the vehicle A (subject vehicle), and is set narrower than that in the second embodiment. As an example, assuming that the boundary lines CTtl and CTtr are projected onto the road surface in the foreground, the distance between the boundary lines CTtl and CTtr on the road surface is slightly wider than the vehicle width of the subject vehicle A. As such, a gap is apparently secured between each boundary line CTtl, CTtr and the corresponding lane marking line adjacent thereto. As a result, misidentification between the actual lane marking line and each boundary line CTtl, CTtr is less likely to occur.

Figure 43:
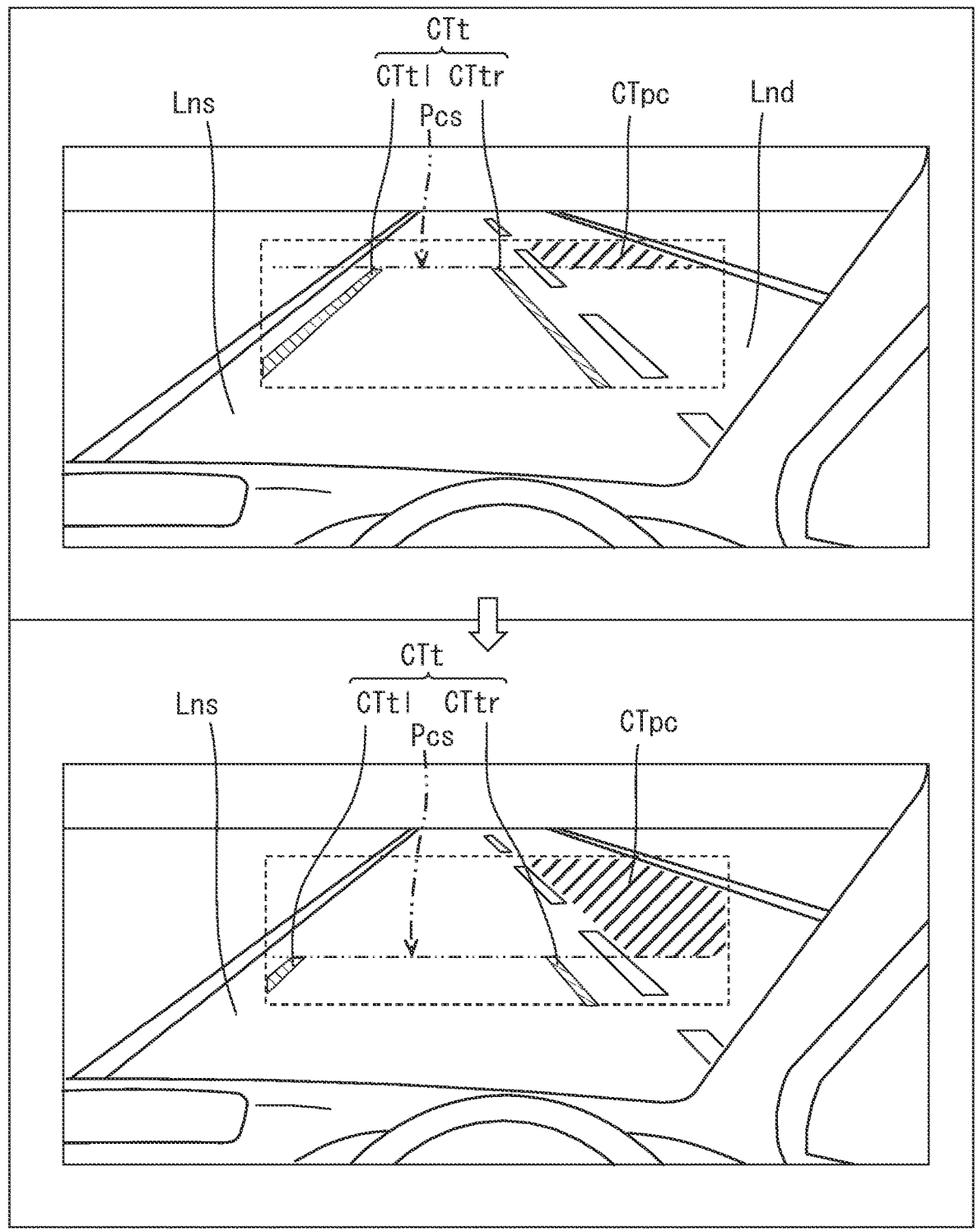
FIG. 43 is a diagram illustrating an LCA standby display of a sixth embodiment of the present disclosure.

Specifically, the LCA standby display shown in FIG. 43 includes a LTA execution content CTt and a LCA announcement content CTpc. The boundary lines CTtl and CTtr of the LTA execution content CTt are displayed to be superimposed on the road surface of the subject vehicle lane Lns in a range on the front side (subject vehicle side) of the LC transition point Pcs. The LCA announcement content CTpc is displayed to be superimposed on the road surface of the destination lane Lnd in a range on the far side (traveling direction side) of the LC transition point Pcs. As the LC transition point Pcs approaches, the boundary lines CTtl and CTtr are shortened downward, while the LCA announcement content CTpc is expanded downward.

Figure 44:
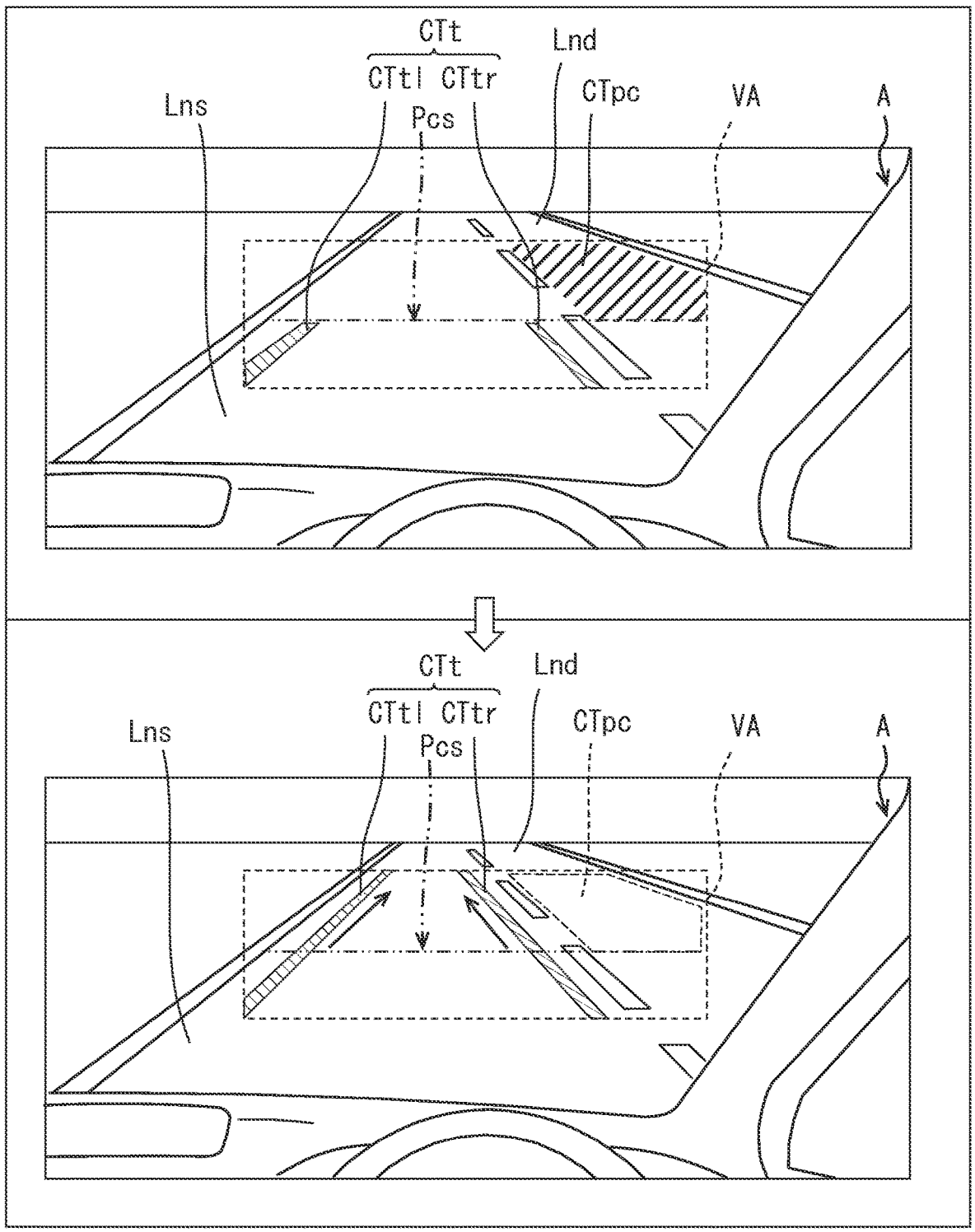
FIG. 44 is a diagram illustrating an LCA cancellation display of the sixth embodiment.

In a LCA cancellation display shown in FIG. 44, the display of the LCA announcement content CTpc (or the LCA standby content CTwc) is terminated (see the broken line range in the lower part of FIG. 44). In addition, in the LCA cancellation display, an animation to extend the boundary lines CTtl and CTtr from the LC transition point Pcs in the traveling direction is displayed after the display of the LCA announcement content CTpc is terminated.

Figure 45:
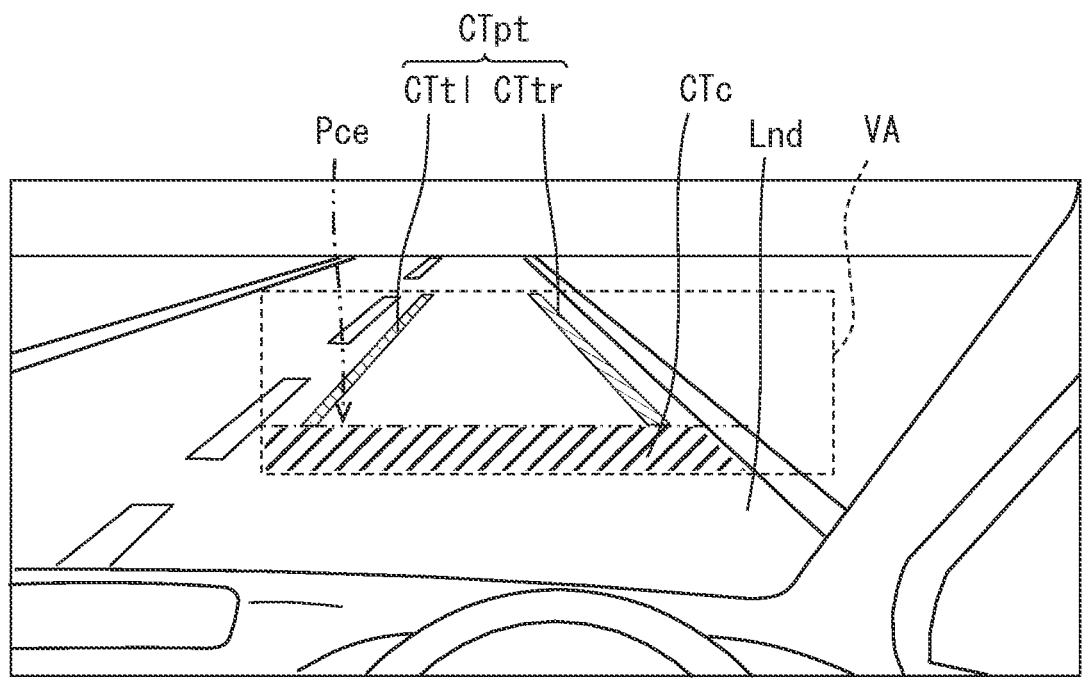
FIG. 45 is a diagram illustrating an LTA transition display of the sixth embodiment.

A LTA transition display shown in FIG. 45 includes the LCA execution content CTc and the LTA announcement content CTpt. The LCA execution content CTc is displayed to be superimposed on the road surface of the destination lane Lnd in a range on the front side (subject vehicle side) from the LTA transition point Pce. The boundary lines CTtl and CTtr of the LTA announcement content CTpt are displayed to be superimposed on the road surface of the destination lane Lnd in a range on the far side (traveling direction side) from the LTA transition point Pce. The boundary lines CTtl and CTtr are each superimposed at a position with a predetermined gap from a corresponding lane marking of the destination lane Lnd. The boundary lines CTtl and CTtr each become the LTA execution content CTt (see FIG. 46), and is hidden after its display is continued for a predetermined time.

Figure 46:
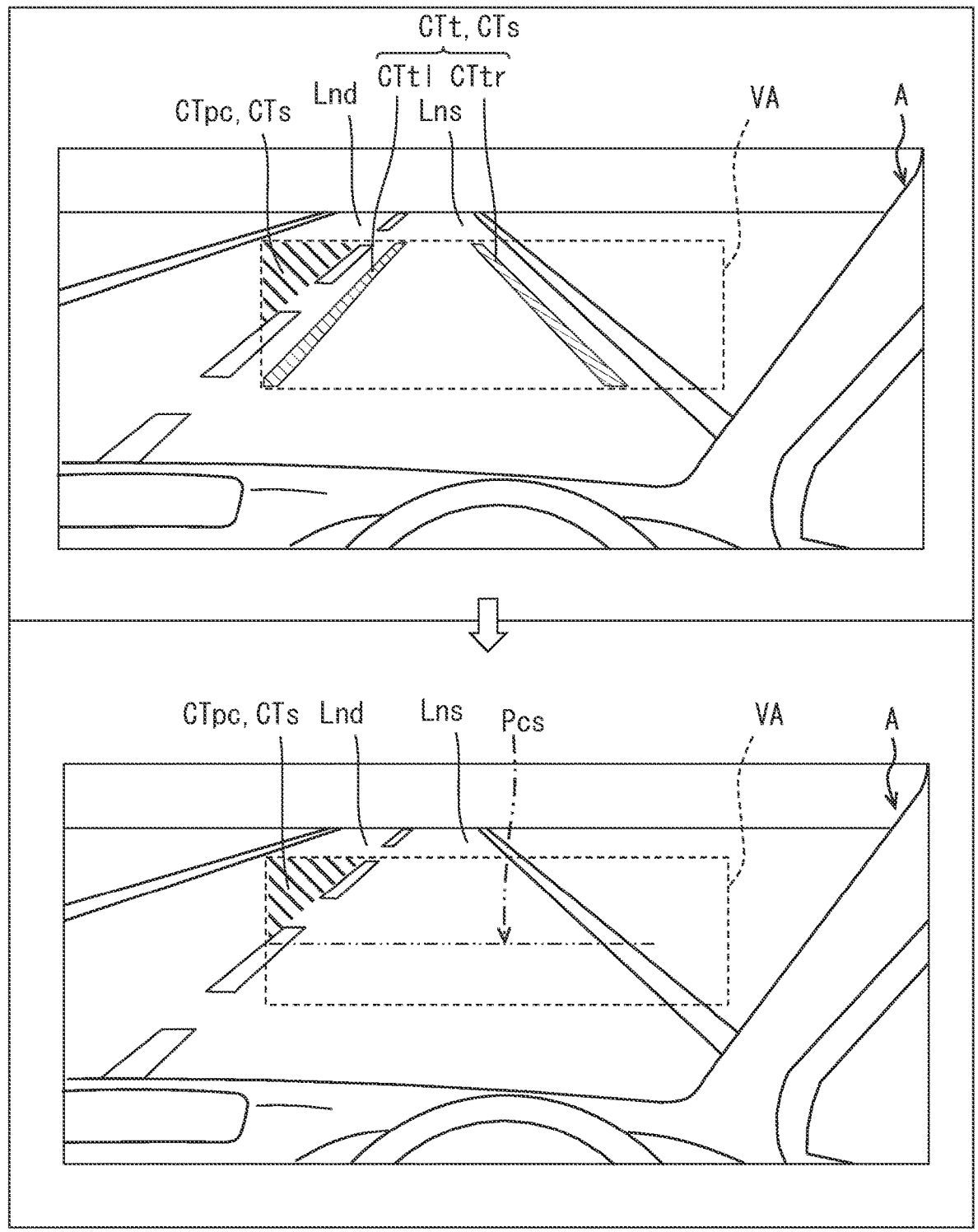
FIG. 46 is a diagram illustrating an LCA standby display of the sixth embodiment.

The LTA transition display shown in FIG. 46 is displayed when the driver's on operation of the second lane change is input while the display of the LTA execution content CTt started after the first lane change is continued. In this case, both the LTA execution content CTt and the superimposition content CTs related to the LCA are displayed. The superimposition content CTs related to the LCA is not limited to the LCA announcement content CTpc, but may be the LCA standby content CTwc (see FIG. 9) or the LCA execution content CTc (see FIG. 45). After displaying the two superimposition content CTs together, the display generation unit 75 limits the display of the LTA execution content CTt to the range of the road surface on the front side of the LC transition point Pcs, or hides the LTA execution content CTt.

The sixth embodiment described so far also achieves the similar effects to those of the first embodiment, and the driver can recognize the transition schedule of the control from the change in the display recognized through the normal visual action. Therefore, it is possible to provide easy-to-understand guidance regarding the in-lane traveling and the lane change.

OTHER EMBODIMENTS

Although the multiple embodiments of the present disclosure have been described hereinabove, the present disclosure is not construed as being limited to the above-described embodiments, and can employ various embodiments and combinations within a range that does not depart from the spirit of the present disclosure.

Figure 47:
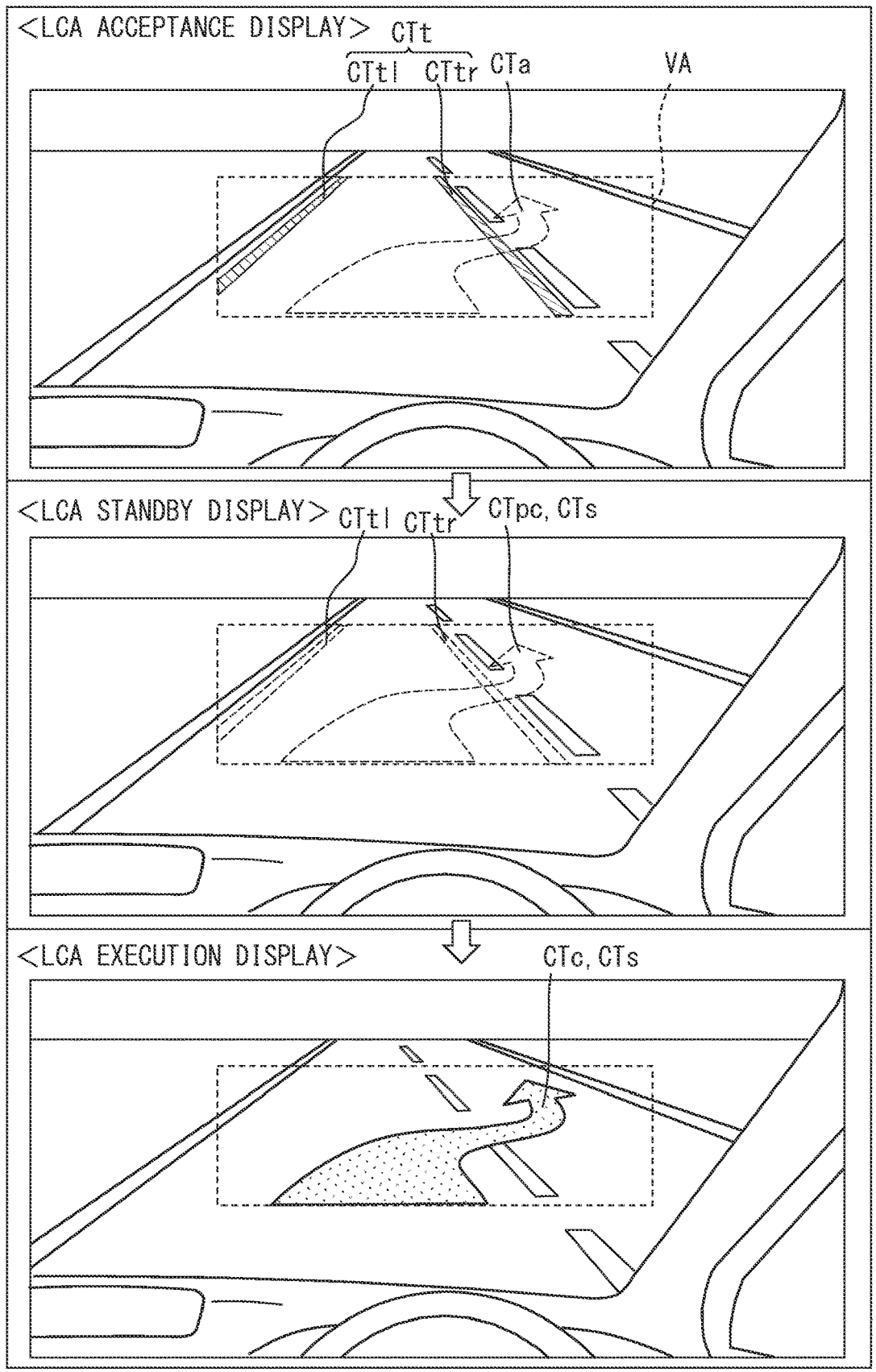
FIG. 47 is a diagram illustrating transitions between an LCA acceptance display, an LCA standby display, and an LCA execution display of a first modification.

In a first modification shown in FIG. 47, as a modification of the second embodiment, in the process of shifting from the in-lane traveling control to the lane change control, the display control for fading out the LTA-related content and fading in the LCA-related content is performed.

More specifically, in the LCA acceptance display of the first modification, the LTA execution content CTt composed of the boundary lines CTtl and CTtr is displayed in a normal display state, that is, in a state where the display brightness is secured. On the other hand, in the LCA acceptance display, the response notification content CTa is displayed in a display state having a lower attractiveness than the boundary lines CTtl and CTtr, that is, a state in which the display brightness is low. The drawing shape of the response notification content CTa of the first modification is substantially the same arrow shape as that of the third embodiment.

By the transition from the LCA acceptance display to the LCA standby display, the arrow-shaped superimposition content CTs that follows the display feature of the response notification content CTa is displayed as the LCA announcement content CTpc. The display brightness of the LCA announcement content CTpc is about the same as that of the response notification content CTa, or slightly higher than that of the response notification content CTa. On the other hand, in the LCA standby display, the display brightness of each boundary line CTtl and CTtr is lower than that of the LCA acceptance display. For example, the display brightness of each boundary line CTtl and CTtr is set to be about the same as the display brightness of the LCA announcement content CTpc.

Further, due to the transition from the LCA standby display to the LCA execution display, the display brightness of each boundary line CTtl and CTtr is gradually lowered, and reduced to a non-display state. On the other hand, the LCA announcement content CTpc becomes the LCA execution content CTc that gradually increases the display brightness and indicates the estimated trajectory of the lane change. The display brightness of the LCA execution content CTc is set to be about the same as the boundary lines CTtl and CTtr of the LCA acceptance display.

Figure 48:
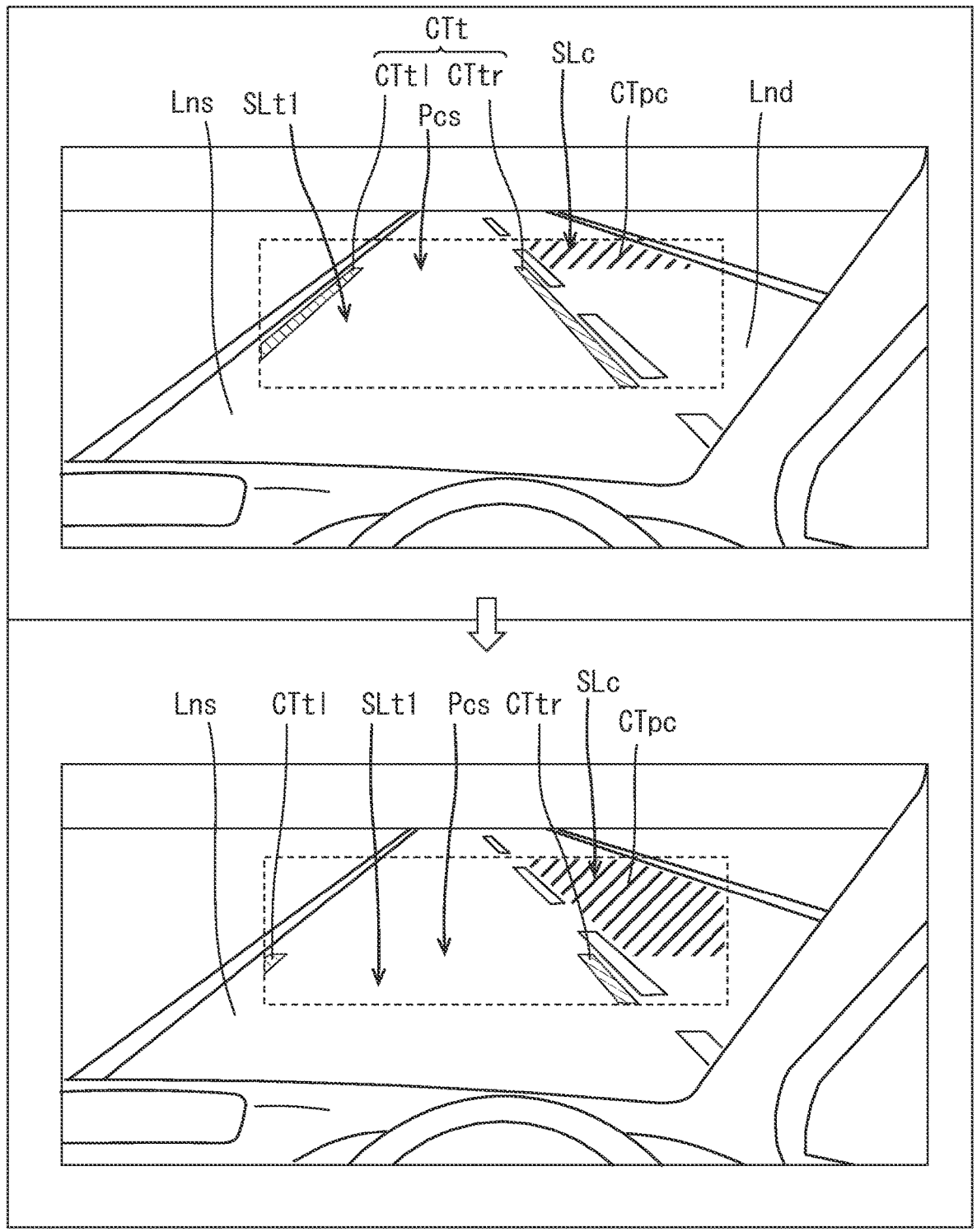
FIG. 48 is a diagram illustrating an LCA standby display of a second modification.
Figure 49:
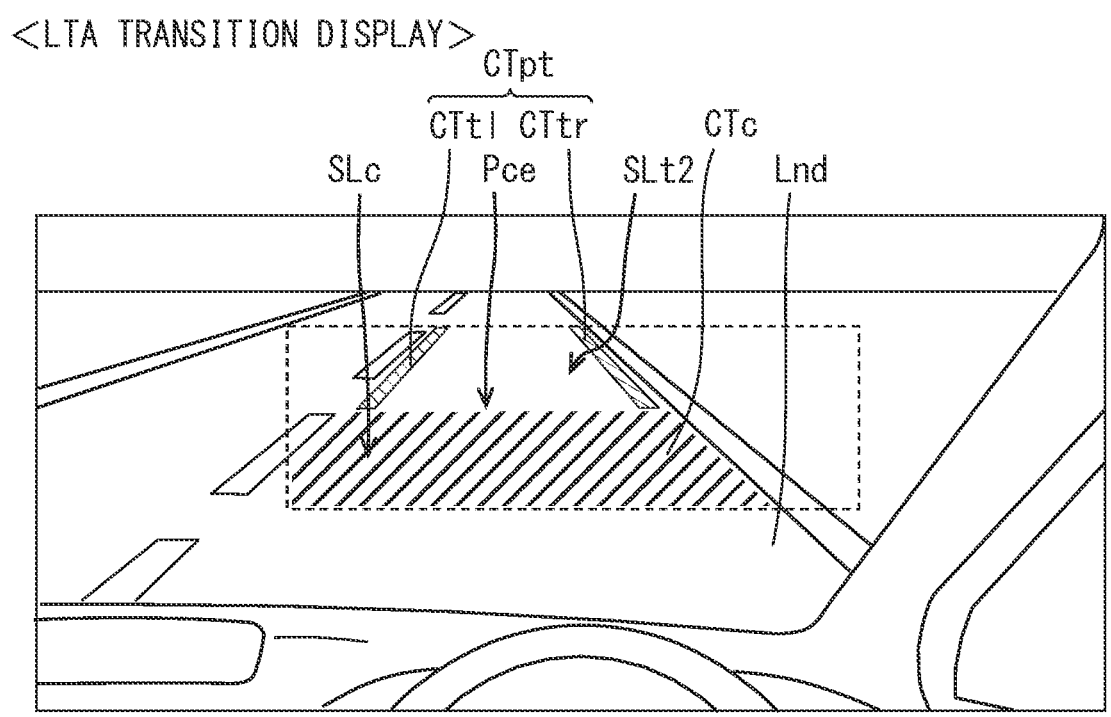
FIG. 49 is a diagram illustrating an LTA transition display of the second modification.

In a second modification in FIGS. 48 and 49, as a modification of the sixth embodiment, the LTA execution content CTt and the LTA announcement content CTpt include two boundary lines CTtl and CTtr, as in the sixth embodiment. Unlike the sixth embodiment, the boundary lines CTtl and CTtr are arranged according to the lane width of the subject vehicle lane Lns. As an example, the gap between each boundary line CTtl, CTtr and each of the left and right lane marking lines is narrower than the width of each boundary line CTtl, CTtr.

In the LCA standby display shown in FIG. 48, the boundary lines CTtl and CTtr are displayed to be superimposed on the road surface of the subject vehicle lane Lns in the range of the LTA execution section SLt1 which is on the front side (subject vehicle side) of the LC transition point Pcs, as the LTA execution content CTt. In addition, in the LCA standby display, the LCA announcement content CTpc in a form of filling the road surface is displayed to be superimposed on the road surface of the destination lane Lnd on the range of the LC execution section SLc that is on the far side of the LC transition point Pcs.

In the LTA transition display shown in FIG. 49, the LCA execution content CTc in a form of filing the road surface is displayed to be superimposed on the road surface of the previous destination lane Lnd, which is now the subject vehicle lane, in the range of the LC execution section SLc, which is on the front side of the LTA transition point Pce. In addition, in the LTA transition display, the boundary lines CTtl and CTtr are displayed to be superimposed on the road surface of the previous destination lane Lnd in the range of the LTA execution section SLt2, which is on the far side of the LTA transition point Pce, as the LTA announcement content CTpt.

Figure 50:
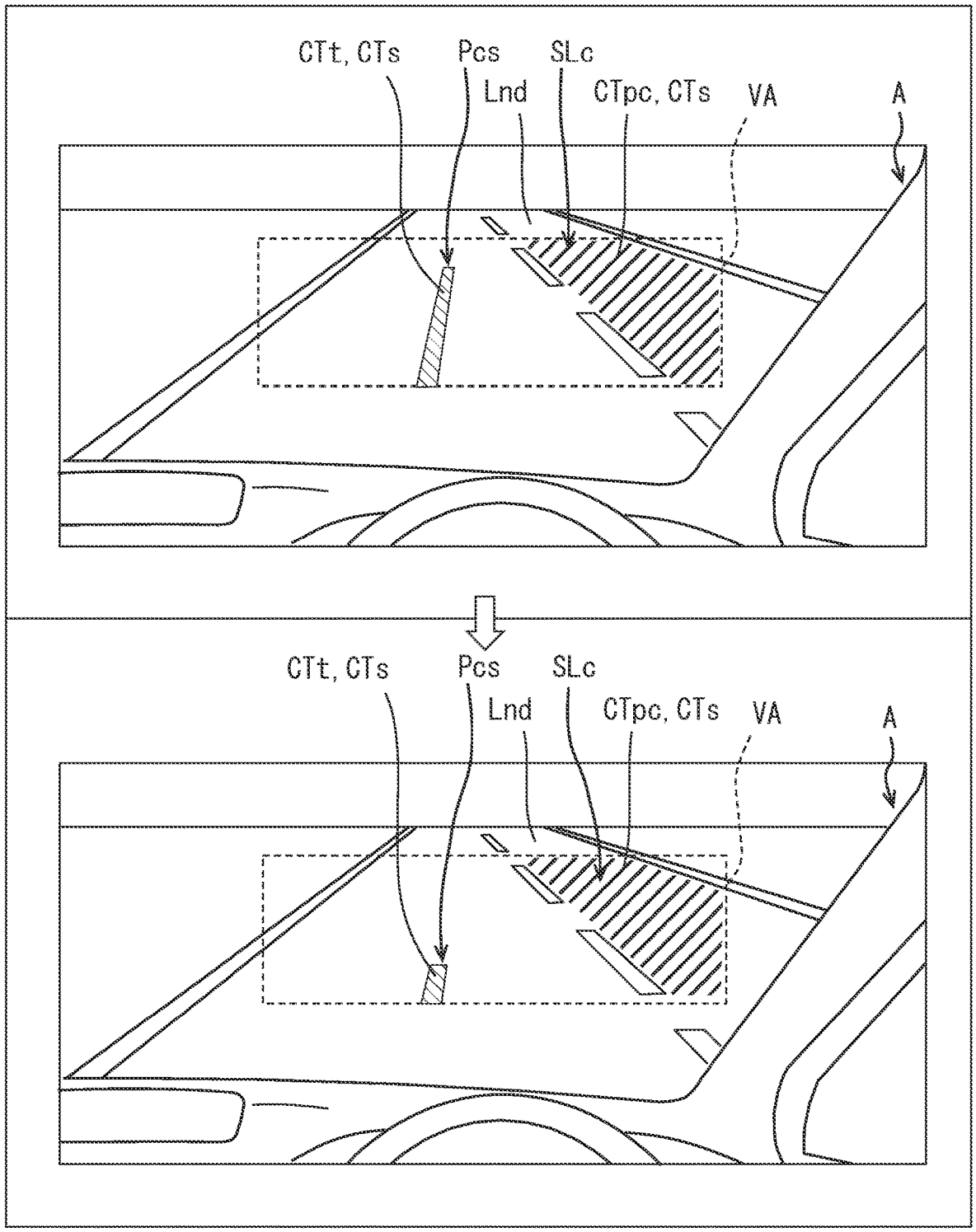
FIG. 50 is a diagram illustrating an LCA standby display of a third modification.

In a third modification shown in FIG. 50, as a modification of the first embodiment, the drawing shape of the LCA announcement content CTpc is different from that of the first embodiment. Similar to the LCA standby content CTwc (see FIG. 8), the LCA announcement content CTpc of the third modification is displayed to be superimposed on the entire range of the road surface of the destination lane Lnd that overlaps with the angle of view VA. That is, the superimposition range of the LCA announcement content CTpc is not limited to the LC execution section SLc. Therefore, in the LCA standby display of the third modification, the approach of the LC transition point Pcs is notified to the driver by shortening the LTA execution content CTt.

As described above, the LCA announcement content CTpc does not have to be located on the far side of the LTA execution content CTt as long as it does not overlap with the LTA execution content CTt. The LCA announcement content CTpc may be displayed side by side with the LTA execution content CTt. With such a drawing shape, the display area of the LCA announcement content CTpc can be sufficiently secured even if the LC transition point Pcs is far from the vehicle A. Therefore, it is possible for the driver to recognize the lane change schedule at an earlier timing.

Figure 51:
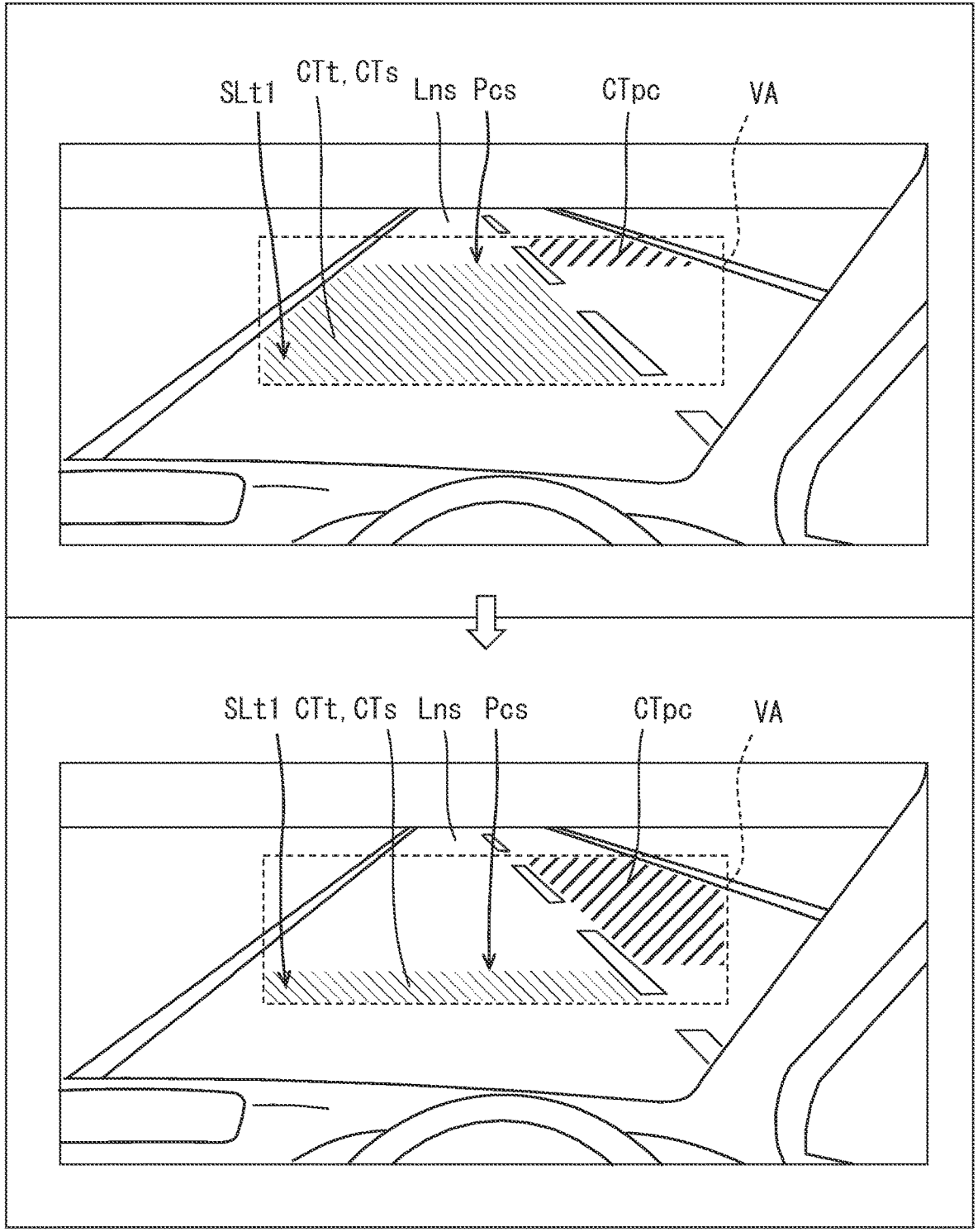
FIG. 51 is a diagram illustrating an LCA standby display of a fourth modification.

In a fourth modification shown in FIG. 51, as a modification of the first embodiment, the drawing shape of the LTA execution content CTt is different from that of the first embodiment. Similar to the LCA announcement content CTpc and the like, the LTA execution content CTt is a superimposition content CTs that fills the traveling lane. The LTA execution content CTt is displayed to be superimposed on the road surface of the subject vehicle lane Lns in the range of the LTA execution section SLt1, which is on the front side of the LC transition point Pcs. In the fourth modification, the LTA announcement content may also be displayed to be superimposed on the far side of the LCA execution content so as to fill the road surface of the LTA execution section.

Figure 52:
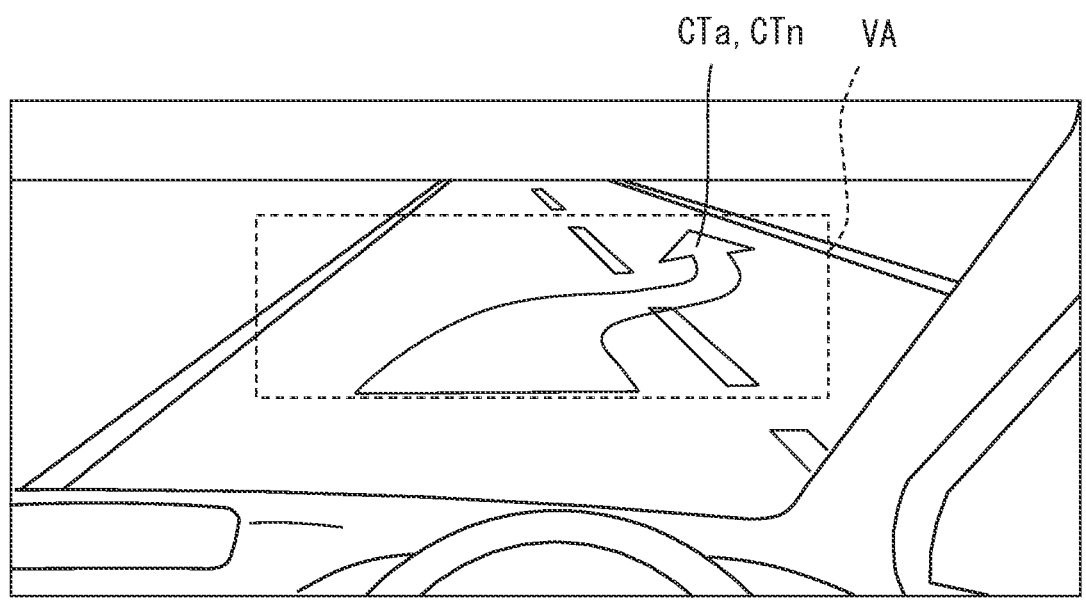
FIG. 52 is a diagram illustrating an LCA acceptance display of a fifth modification.

In a fifth modification shown in FIG. 52, as a modification of the third embodiment, the LTA execution content CTt (see FIG. 47 and the like) is temporarily hidden in the LCA acceptance display. As a result, the arrow-shaped non-superimposition content CTn is displayed as the response notification content CTa in the angle of view VA. The display brightness of the response notification content CTa may be about the same as that of the LTA execution content CTt. The LTA execution content CTt may be displayed again after the display transition to the LCA standby display.

Figure 53:
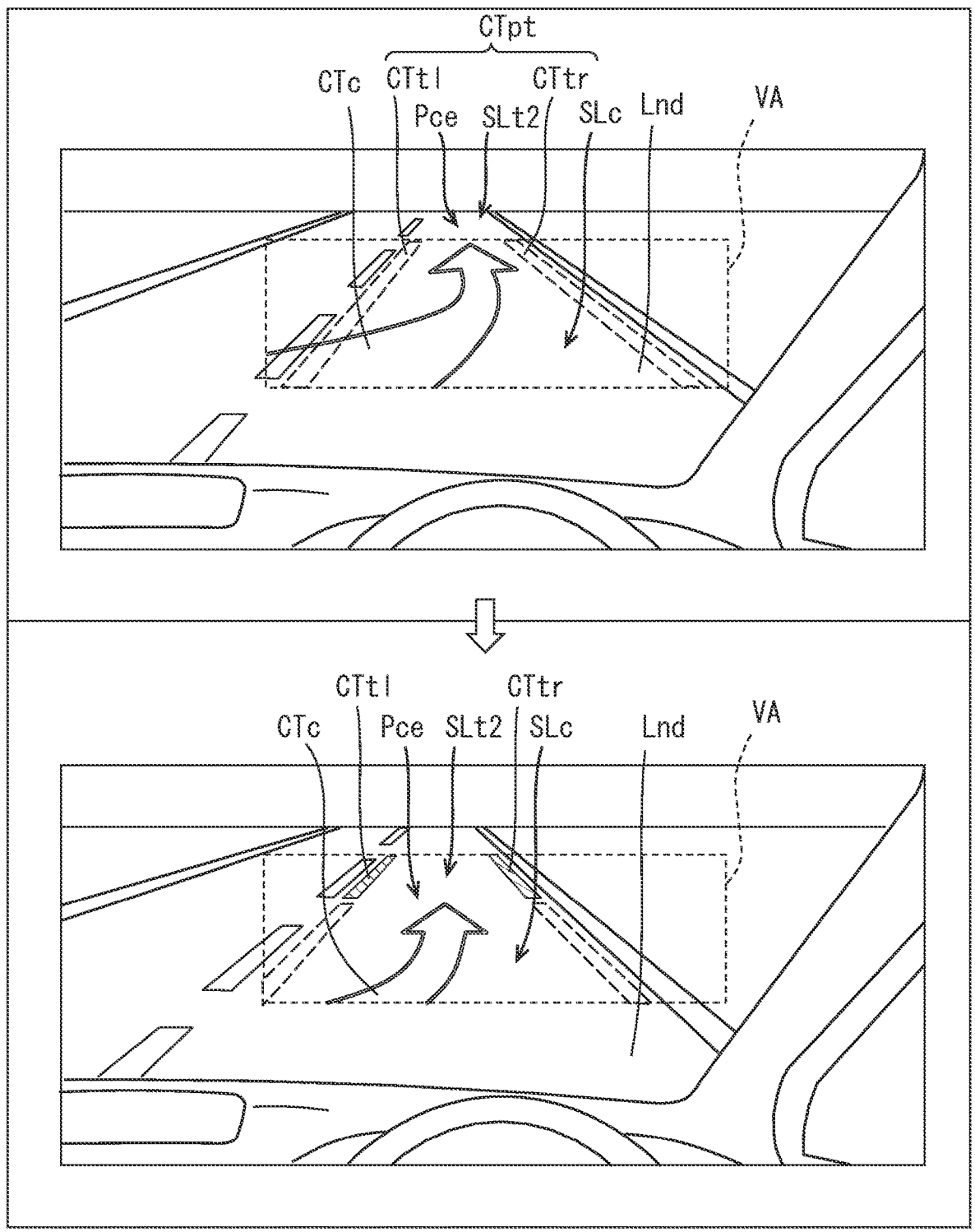
FIG. 53 is a diagram illustrating an LTA transition display of a sixth modification.

In a sixth modification shown in FIG. 53, as a modification of the second embodiment, the drawing shape of the LTA announcement content CTpt is different from that of the second embodiment in the LTA transition display. The superimposition range of the LTA announcement content CTpt is not limited to the road surface of the LTA execution section SLt2. The LTA announcement content CTpt may be superimposed on the road surface of the subject vehicle lane (former destination lane Lnd) included in the angle of view VA.

More specifically, when the LTA transition point Pce is outside the angle of view VA, the range overlapping the angle of view VA is entirely the LC execution section SLc. In this case, the boundary lines CTtl and CTtr of the LTA announcement content CTpt are superimposed on the road surface of the destination lane Lnd in a display state with low attractiveness. For example, the boundary lines CTtl and CTtr are displayed on both sides of the LCA execution content CTc with a display brightness lower than that of the LCA execution content CTc.

When the LTA transition point Pce is within the angle of view VA, each boundary line CTtl, CTtr has a portion superimposed on the LTA execution section SLt2 (hereinafter, execution section portion) and a portion superimposed on the LC execution section SLc (hereinafter, standby section portion). The execution state portion and the standby section portion have different display states. The execution section portion located on the far side of the LCA execution content CTc is displayed with the same display brightness as the LCA execution content CTc. On the other hand, the standby section portion located on the far side pf the LCA execution content CTc is displayed with a lower display brightness than the execution section portion and the LCA execution content CTc.

Figure 54:
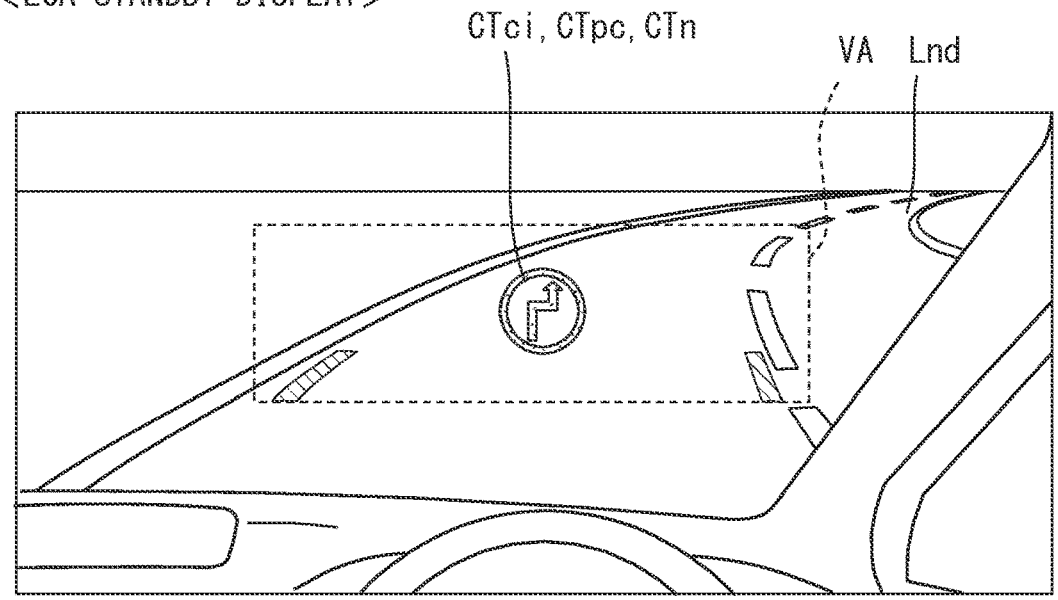
FIG. 54 is a diagram illustrating an LCA standby display of a seventh modification, of a case where the destination lane is positioned outside the angle of view.

In a seventh modification shown in FIG. 54, as a modification of the second embodiment, the LCA standby display includes the LCA icon CTci displayed as the LCA announcement content CTpc as in the first embodiment. The LCA icon CTci of the seventh modification is the non-superimposition content CTn, and is displayed in the substantially center of the angle of view VA. The LCA icon CTci of the seventh modification may continue to be displayed as the LCA execution content until the road surface of the destination lane Lnd enters the angle of view VA.

Figure 55:
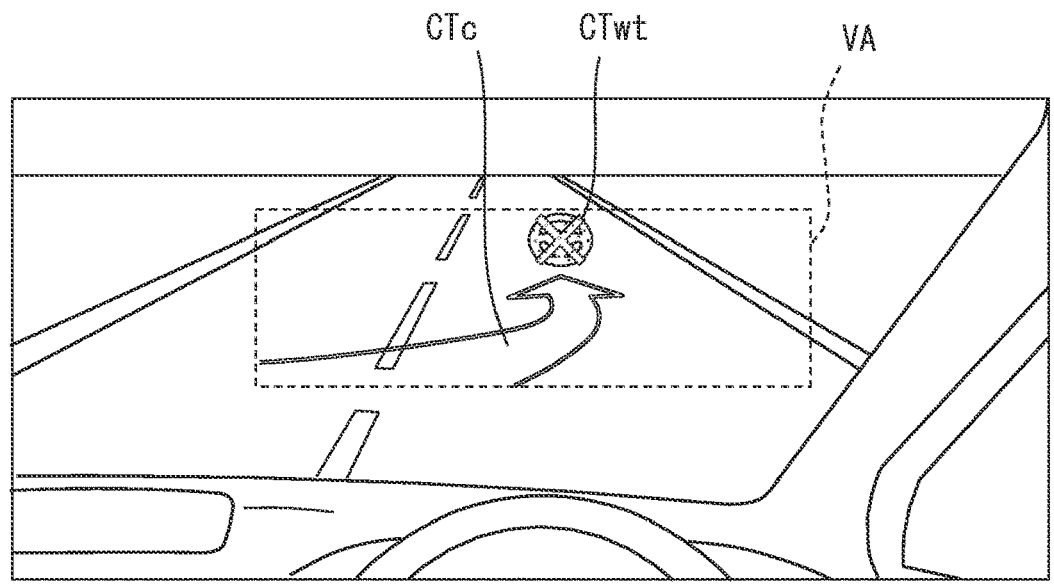
FIG. 55 is a diagram illustrating an LTA standby display of an eighth modification.

In an eighth modification shown in FIG. 55, as a modification of the second embodiment, the LTA standby content CTwt is displayed at a position that does not overlap with the LCA execution content CTc and on the far side of the LCA execution content CTc in the LTA standby display. With such a display layout, the LTA standby content CTwt can clearly indicate to the driver that the estimate trajectory is disappeared on the system side and there is a possibility that the operation control may be cancelled. The drawing shape of the LTA standby content CTwt is such that "x" indicating denial is superimposed on the drawing object imitating the steering wheel.

Figure 56:
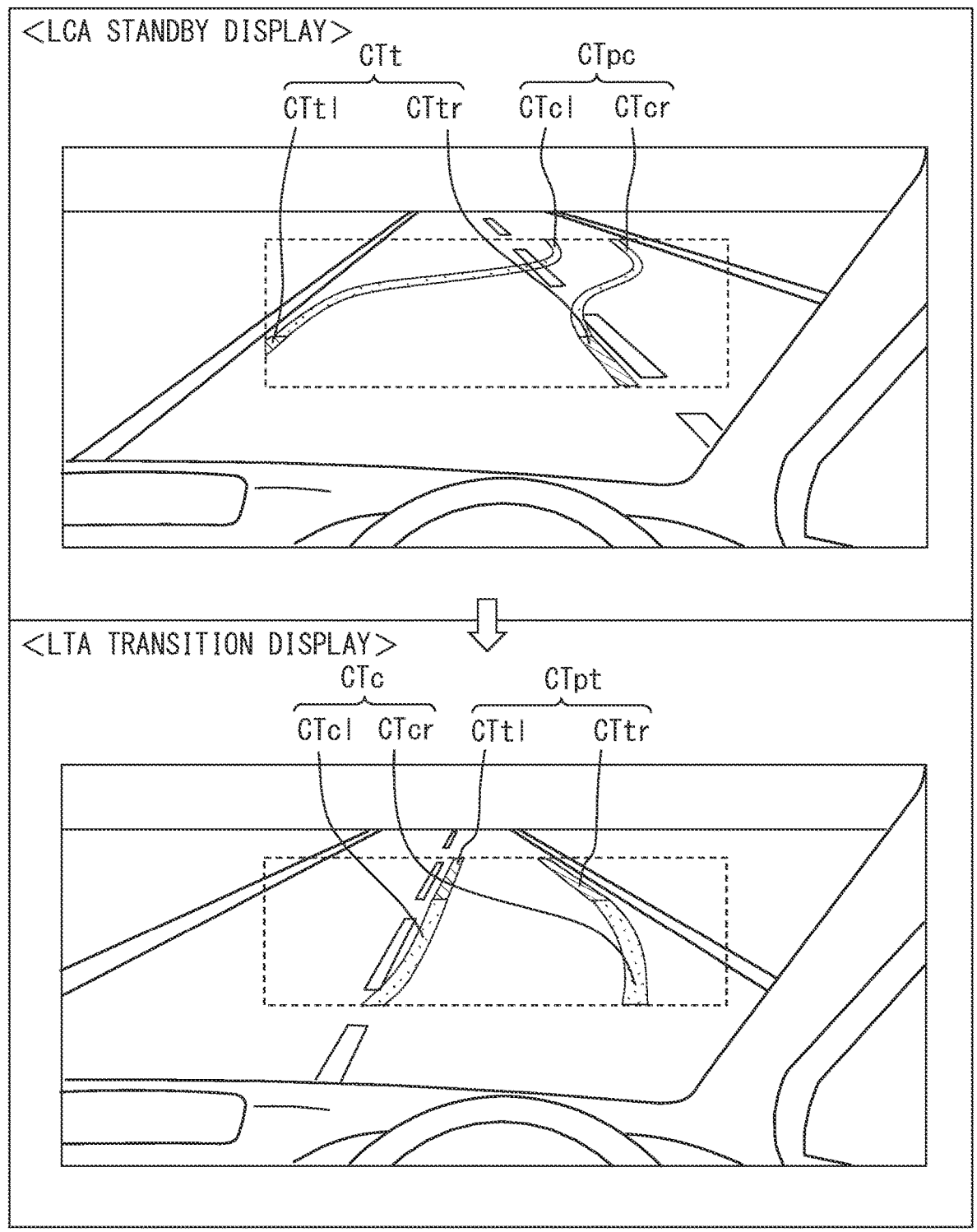
FIG. 56 is a diagram illustrating an LCA standby display and an LTA transition display of a ninth modification.

In a ninth modification shown in FIG. 56, as a modification of the fifth embodiment, the boundary lines CTcl and CTcr included in the LCA-related contents CTpc and CTc are displayed to be distinguishable from the boundary lines CTtl and CTtr included in the LTA-related contents CTpt and CTt. As an example, each boundary line CTcl, CTcr is displayed with a display color or display brightness different from that of each boundary line CTtl, CTtr.

Specifically, in the LCA standby display of the ninth modification, each of the boundary lines CTtl and CTtr of the LTA execution content CTt has a tip portion that is continuous to a base end portion of a corresponding one of the boundary lines CTcl and CTcr of the LCA announcement content CTpc, respectively. Similarly, in the LCA standby display, each of the boundary lines CTcl and CTcr of the LCA execution content CTc has a tip portion that is continuous to a base end portion of a corresponding one of the boundary lines CTtl and CTtr of the LTA announcement content CTpt.

In a tenth modification, as a modification of each of the embodiments described above, the LCA announcement content CTpc and the LTA execution content CTt are displayed to be partially overlapped with each other. In addition, in the tenth modification, the LCA standby content CTwc and the LTA execution content CTt are displayed to be partially overlapped with each other.

In an eleventh modification, as a modification of each of the embodiments described above, even when the LC execution section SLc is within the angle of view VA, the estimated trajectory of the lane change by the LCA function is notified to the driver by the LCA icon CTci, which is the non-superimposition content CTn.

In a twelfth modification, as a modification of each of the embodiments described above, the LCA acceptance display including the response notification content CTa is omitted. In the twelfth modification, a direct display transition from the LTA execution display to the LCA standby display or the LCA execution display is performed after the peripheral check based on the input of the on operation is completed. The on operation for activating the LCA function may be input to an input unit different from the turn signal switch 56.

In a thirteenth modification, as a modification of each of the embodiments described above, the LCA standby display when the LC execution section SLc is outside the angle of view VA is omitted. That is, the display of the LCA standby content CTwc is not performed. In the thirteenth modification, the display transition from the LCA acceptance display to the LCA standby display is performed at the timing when the LC execution section SLc enters the angle of view VA.

In the embodiments and modifications described above, when each content is displayed in a different mode, at least one of static elements such as display color, display brightness, and reference display shape may be different to the extent that it can be distinguished by the driver as being in a different mode. When each content is displayed in a different mode, at least one of the dynamic elements such as the presence or absence of blinking, the cycle of blinking, the presence or absence of animation, and the operation of animation may be different to the extent that it can be distinguished by the driver as being in a different mode.

In the embodiments and modifications described above, the driving scene in which the information presentation is illustrated is an example. The HCU can present information in combination with non-superimposition content and superposed content in a driving scene different from the example described above. Further, the shape, display position, display color, display brightness, presence or absence of animation, and the like of each content may be changed as appropriate, and may be changed according to, for example, the preference of a driver.

In the HCU of the embodiments described above, the projection shape and projection position of the virtual image light for forming the superimposition content are sequentially controlled using the position information of the eye point detected by the DSM so that the superimposition content is superimposed on the superimposed object without deviation when viewed from the driver. Alternatively, in a fourteenth modification as a modification the embodiments described above, the HCU controls the projection shape and projection position of the virtual image light for forming the superimposition content, without using the detection information of the DSM, but using the setting information of the center of the reference eye point set in advance.

As a fifteenth modification, the projector 21 of the HUD 20 is provided with an electro luminescence (EL) panel, in place of the LCD panel and the backlight. Further, in place of the EL panel, the HUD 20 may employ a projector using a display such as a plasma display panel, a cathode ray tube and an LED, in place of the EL panel.

As a sixteenth modification, the HUD 20 is provided with a laser module (hereinafter referred to as "LSM") and a screen, in place of the LCD and the backlight. The LSM includes, for example, a laser light source, a micro electro mechanical systems (MEMS) scanner, and the like. The screen is, for example, a micro mirror array or a microlens array. In such a HUD 20, a display image is drawn on the screen by scanning the laser beam emitted from the LSM. The HUD 20 projects the display image drawn on the screen onto the windshield by the magnifying optical element, and displays the virtual image Vi in the air.

As a seventeenth modification, the HUD 20 is provided with a DLP (Digital Light Processing, registered trademark) projector. The DLP projector has a digital mirror device (hereinafter referred to as DMD) provided with a large number of micro mirrors, and a projection light source that projects light toward the DMD. The DLP projector draws a display image on the screen under the control of linking the DMD and the projection light source.

As an eighteenth modification, the HUD 20 is provided with a projector using LCOS (liquid crystal on silicon). As a nineteenth modification, the HUD 20 is provided with a holographic optical element, as one of the optical systems for displaying the virtual image Vi in the air.

As a twentieth modification of the embodiments described above, the HCU 100 and the HUD 20 are integrally configured. That is, the processing function of the HCU is mounted on the control circuit of the HUD. In such a twentieth modification, the HUD corresponds to the "display control device". Further, the processing function of the HCU may be mounted on the meter ECU, the navigation ECU, the display audio ECU, and the like. In such modifications, the meter device, the navigation device, and the display audio device correspond to the "display control device".

As a twenty-first modification of the embodiments described above, the HCU 100 is provided with a camera image acquisition unit that acquires the imaged data obtained by capturing the foreground of the subject vehicle, which is the imaged data of the front camera 31. The display generation unit 75 generates video data in which the original images of the LTA-related contents CTt, CTpt, the LCA-related contents CTwc, CTpc, CTc, and the like are superimposed on the real image of the foreground based on the captured data. Based on such video data, the HUD 20 projects, as a virtual image, a display in which each content is superimposed on a real image in the foreground. When the angle of view of the HUD 20 is not sufficient as in the twenty-first modification, a virtual image display in which the original image such as the content used for the AR display is superimposed on the real image may be displayed in a scene where the AR content deviates from the angle of view VA.

In the embodiments described above, the respective functions provided by the HCU can be also provided by software and hardware for executing the software, only software, only hardware, and complex combinations of software and hardware. In cases where these functions are provided by electronic circuits as hardware, the respective functions can be also provided by analog circuits or digital circuits which include a large number of logic circuits.

Further, the specific implementation of the storage medium for storing the program or the like capable of executing the above-described display control method may be changed as appropriate. For example, the storage medium is not limited to the configuration provided on the circuit board, and may be provided in the form of a memory card or the like. The storage medium may be inserted into a slot portion, and electrically connected to the control circuit of the HCU. The storage medium may include an optical disk which forms a source of programs to be copied into a HCU, a hard disk drive therefor, and the like.

The vehicle equipped with the HMI system is not limited to a general private car, but may be a rented vehicle, a vehicle for man-driving taxi, a vehicle for sharing vehicle service, a freight vehicle, a bus, or the like. The HIM system including the HCU may be equipped to a driverless vehicle used for the mobility service.

The vehicle equipped with the HMI system may be a right-hand drive vehicle or a left-hand drive vehicle. Further, the traffic environment in which the vehicle travels may be a traffic environment premised on left-hand traffic, or may be a traffic environment premised on right-hand traffic. The lane keeping control and its related display according to the present disclosure are appropriately optimized according to the road traffic law of each country and region, the steering wheel position of the vehicle, and the like.

The control unit and the method thereof which have been described in the present disclosure may be also implemented by a special purpose computer which includes a processor programmed to execute one or more functions implemented by computer programs. Alternatively, the device and the method therefor which have been described in the present disclosure may be also realized by a special purpose hardware logic circuit. Also, the device and the method therefor which have been described in the present disclosure may be also realized by one or more dedicated computers which are constituted by combinations of a processor for executing computer programs and one or more hardware logic circuits. The computer program may be stored, as instructions to be executed by a computer, in a tangible non-transitory computer-readable medium.

What is claimed is:

1. A display control device for a vehicle to control a display on a head-up display, the display control device comprising:
   a control information acquisition unit that acquires driving control information related to a driving control of the vehicle, from a lane keeping control unit that controls an in-lane traveling of the vehicle to cause the vehicle to travel in a lane;
   a change information acquisition unit that acquires lane change information related to a lane change of the vehicle, from a lane change control unit that controls the lane change of the vehicle; and
   a display control unit that displays an estimated trajectory content indicating an estimated trajectory of the in-lane traveling to be superimposed on a road surface as a superimposition target, based on the driving control information, wherein
   in response to acquiring the lane change information during the in-lane traveling, the display control unit displays a lane change content indicating an estimated trajectory of the lane change together with the estimated trajectory content, based on the lane change information, and
   in response to recognizing interruption of the lane change based on the lane change information, the display control unit highlights the estimated trajectory content on the display by extending the estimated trajectory in a traveling direction in the lane beyond a transition point at which the lane change was to be performed.

2. The display control device according to claim 1, wherein
   the display control unit displays the lane change content indicating the estimated trajectory of the lane change to be superimposed on the road surface and to be integrally continuous with the estimated trajectory content.

3. The display control device according to claim 1, wherein
   the display control unit displays the lane change content at a position that does not overlap with the estimated trajectory content.

4. The display control device according to claim 1, wherein
   the display control unit displays the lane change content at a position visually recognized on a far side with respect to the estimated trajectory content.

5. The display control device according to claim 1, wherein
   the lane change information includes destination lane information related to a destination lane to which the vehicle moves by the lane change, and
   the display control unit displays the lane change content at a position visually recognized on the destination lane side with respect to the estimated trajectory content.

6. The display control device according to claim 1, wherein
   when an execution section of the lane change by the lane change control unit is within an angle of view of the head-up display, the display control unit displays the lane change content to be superimposed on a road surface including at least a part of the execution section.

7. The display control device according to claim 6, wherein
   when the execution section is outside the angle of view, the display control unit displays a change standby content indicating that the lane change is to be performed in a mode different from the lane change content that is displayed when the execution section is within the angle of view.

8. The display control device according to claim 7, wherein
   the display control unit displays the change standby content at a position that does not overlap with the estimated trajectory content.

9. A display control device for a vehicle to control a display on a head-up display, the display control device comprising:

a control information acquisition unit that acquires driving control information related to a driving control of the vehicle, from a lane keeping control unit that controls an in-lane traveling of the vehicle to cause the vehicle to travel in a lane;
a change information acquisition unit that acquires lane change information related to a lane change of the vehicle, from a lane change control unit that controls the lane change of the vehicle; and
a display control unit that displays an estimated trajectory content indicating an estimated trajectory of the in-lane traveling to be superimposed on a road surface as a superimposition target, based on the driving control information, wherein
in response to acquiring the lane change information during the in-lane traveling, the display control unit displays a lane change content indicating an estimated trajectory of the lane change together with the estimated trajectory content, based on the lane change information,
the lane change information includes on-operation information indicating input of an on operation instructing the lane change control unit to perform the lane change, and
the display control unit displays a response notification content for notifying an acceptance of the on operation together with the estimated trajectory content.

10. A display control device for a vehicle to control a display on a head-up display, the display control device comprising:
a control information acquisition unit that acquires driving control information related to a driving control of the vehicle, from a lane keeping control unit that controls an in-lane traveling of the vehicle to cause the vehicle to travel in a lane;
a change information acquisition unit that acquires lane change information related to a lane change of the vehicle, from a lane change control unit that controls the lane change of the vehicle; and
a display control unit that displays an estimated trajectory content indicating an estimated trajectory of the in-lane traveling to be superimposed on a road surface as a superimposition target, based on the driving control information, wherein
in response to acquiring the lane change information during the in-lane traveling, the display control unit begins to display a lane change content indicating an estimated trajectory of the lane change based on the lane change information, after terminating display of the estimated trajectory content, and
in response to recognizing interruption of the lane change based on the lane change information, the display control unit highlights the estimated trajectory content on the display by extending the estimated trajectory in a traveling direction in the lane beyond a transition point at which the lane change was to be performed.

11. The display control device according to claim 10, wherein
the display control unit displays the lane change content at a position visually recognized on a far side with respect to the estimated trajectory content.

12. The display control device according to claim 10, wherein
the lane change information includes destination lane information related to a destination lane to which the vehicle moves by the lane change, and
the display control unit displays the lane change content at a position visually recognized on the destination lane side with respect to the estimated trajectory content.

13. The display control device according to claim 10, wherein
when an execution section of the lane change by the lane change control unit is within an angle of view of the head-up display, the display control unit displays the lane change content to be superimposed on a road surface including at least a part of the execution section.

14. The display control device according to claim 13, wherein
when the execution section is outside the angle of view, the display control unit displays a change standby content indicating that the lane change is to be performed in a mode different from the lane change content that is displayed when the execution section is within the angle of view.

15. The display control device according to claim 14, wherein
the display control unit displays the change standby content at a position that does not overlap with the estimated trajectory content.

16. A display control device for a vehicle to control a display on a head-up display, the display control device comprising:
a control information acquisition unit that acquires driving control information related to a driving control of the vehicle, from a lane keeping control unit that controls an in-lane traveling of the vehicle to cause the vehicle to travel in a lane;
a change information acquisition unit that acquires lane change information related to a lane change of the vehicle, from a lane change control unit that controls the lane change of the vehicle; and
a display control unit that displays an estimated trajectory content indicating an estimated trajectory of the in-lane traveling to be superimposed on a road surface as a superimposition target, based on the driving control information, wherein
in response to acquiring the lane change information during the in-lane traveling, the display control unit begins to display a lane change content indicating an estimated trajectory of the lane change based on the lane change information, after terminating display of the estimated trajectory content,
the display control unit displays the estimated trajectory content indicating the estimated trajectory of the in-lane traveling to be superimposed only on a road surface of a subject vehicle lane on which the vehicle is currently traveling, without displaying on a road surface of an adjacent lane as a destination lane of the lane change, and
the display control unit displays the lane change content indicating the estimated trajectory of the lane change only on the road surface of the adjacent lane.

17. A display control device for a vehicle to control a display on a head-up display, the display control device comprising:
a control information acquisition unit that acquires driving control information related to a driving control of the vehicle, from a lane keeping control unit that controls an in-lane traveling of the vehicle to cause the vehicle to travel in a lane;
a change information acquisition unit that acquires lane change information related to a lane change of the vehicle, from a lane change control unit that controls the lane change of the vehicle; and a display control unit that displays an estimated trajectory content indicating an estimated trajectory of the in-lane traveling to be superimposed on a road surface as a superimposition target, based on the driving control information, wherein in response to acquiring the lane change information during the in-lane traveling, the display control unit begins to display a lane change content indicating an estimated trajectory of the lane change based on the lane change information, after terminating display of the estimated trajectory content, the lane change information includes on-operation information indicating input of an on operation instructing the lane change control unit to perform the lane change, and the display control unit displays a response notification content for notifying an acceptance of the on operation together with the estimated trajectory content.

18. A display control device for a vehicle to control a display on a head-up display, the display control device comprising:

a change information acquisition unit that acquires lane change information related to a lane change of the vehicle, from a lane change control unit that controls the lane change of the vehicle; and a display control unit that displays a lane change content indicating an estimated trajectory of the lane change to be superimposed on a road surface as a superimposition target, based on the lane change information, in response to acquiring the lane change information, wherein when an execution section of the lane change by the lane change control unit is within an angle of view of the head-up display, the display control unit displays the lane change content to be superimposed on the road surface including at least a part of the execution section, and when the execution section is outside the angle of view and the lane change to a destination lane is in a standby state awaiting movement to the destination lane to become available, the display control unit displays a change standby content indicating that the lane change is in the standby state superimposed on a road surface of the destination lane on the display inside the angle of view in a mode different from the lane change content that is displayed when the execution section is within the angle of view.

19. The display control device according to claim 18, further comprising:

a control information acquisition unit that acquires driving control information related to a driving control of the vehicle from a lane keeping control unit that controls an in-lane traveling of the vehicle to cause the vehicle to travel in a lane, wherein the display control unit displays an estimated trajectory content indicating an estimated trajectory of the in-lane traveling superimposed on the road surface as a superimposition target, based on the driving control information, and in response to acquiring the lane change information during the in-lane traveling, the display control unit displays the lane change content together with the estimated trajectory content indicating the estimated trajectory of the in-lane traveling.

20. The display control device according to claim 18, further comprising:

a control information acquisition unit that acquires driving control information related to a driving control of the vehicle from a lane keeping control unit that controls an in-lane traveling of the vehicle to cause the vehicle to travel in a lane, wherein the display control unit displays an estimated trajectory content indicating an estimated trajectory of the in-lane traveling superimposed on a road surface as a superimposition target, based on the driving control information, and in response to acquiring the lane change information during the in-lane traveling, the display control unit begins to display the lane change content indicating the estimated trajectory of the lane change based on the lane change information, after terminating display of the estimated trajectory content.

21. A non-transitory computer-readable storage medium which stores program instructions for controlling a head-up display of a vehicle, the program instructions configured to cause one or more processors to:

acquire driving control information related to a driving control of the vehicle, from a lane keeping control unit that controls an in-lane traveling of the vehicle to cause the vehicle to travel in a lane;

display an estimated trajectory content indicating an estimated trajectory of the in-lane traveling to be superimposed on a road surface as a superimposition target, based on the driving control information;

acquire lane change information related to a lane change of the vehicle from a lane change control unit that control the lane change of the vehicle; and in response to acquiring the lane change information during the in-lane traveling, display a lane change content indicating an estimated trajectory of the lane change together with the estimated trajectory content, based on the lane change information, and in response to recognizing interruption of the lane change based on the lane change information, highlight the estimated trajectory content on the display by extending the estimated trajectory in a traveling direction in the lane beyond a transition point at which the lane change was to be performed.

22. The non-transitory computer-readable storage medium according to claim 21, wherein the program instructions configured to cause the one or more processors to display the lane change content indicating the estimated trajectory of the lane change to be superimposed on the road surface and to be integrally continuous with the estimated trajectory content.

23. The non-transitory computer-readable storage medium according to claim 21, wherein the program instructions configured to further cause the one or more processors to:

display, when an execution section of the lane change by the lane change control unit is within an angle of view of the head-up display, the lane change content to be superimposed on a road surface including at least a part of the execution section, and display, when the execution section is outside the angle of view, a change standby content indicating that the lane change is to be performed in a mode different from the lane change content that is displayed when the execution section is within the angle of view.

24. A non-transitory computer-readable storage medium which stores program instructions for controlling a head-up display of a vehicle, the program instructions configured to cause one or more processors to:

acquire driving control information related to a driving control of the vehicle from a lane keeping control unit that controls an in-lane traveling of the vehicle to cause the vehicle to travel in a lane;

display an estimated trajectory content indicating an estimated trajectory of the in-lane traveling to be superimposed on a road surface as a superimposition target, based on the driving control information;

acquire a lane change information related to a lane change of the vehicle from a lane change control unit that controls the lane change of the vehicle; and in response to acquiring the lane change information during the in-lane traveling, begins to display a lane change content indicating an estimated trajectory of the lane change based on the lane change information, after terminating display of the estimated trajectory content; and in response to recognizing interruption of the lane change based on the lane change information, highlight the estimated trajectory content on the display by extending the estimated trajectory in a traveling direction in the lane beyond a transition point at which the lane change was to be performed.

25. The non-transitory computer-readable storage medium according to claim 24, wherein the program instructions configured to further cause the one or more processors to:

display, when an execution section of the lane change by the lane change control unit is within an angle of view of the head-up display, the lane change content to be superimposed on a road surface including at least a part of the execution section, and display, when the execution section is outside the angle of view, a change standby content indicating that the lane change is to be performed in a mode different from the lane change content that is displayed when the execution section is within the angle of view.

26. A non-transitory computer-readable storage medium which stores program instructions for controlling a head-up display of a vehicle, the program instructions configured to cause one or more processors to:

acquire driving control information related to a driving control of the vehicle from a lane keeping control unit that controls an in-lane traveling of the vehicle to cause the vehicle to travel in a lane;

display an estimated trajectory content indicating an estimated trajectory of the in-lane traveling to be superimposed on a road surface as a superimposition target, based on the driving control information;

acquire a lane change information related to a lane change of the vehicle from a lane change control unit that controls the lane change of the vehicle;

in response to acquiring the lane change information during the in-lane traveling, begins to display a lane change content indicating an estimated trajectory of the lane change based on the lane change information, after terminating display of the estimated trajectory content;

display the estimated trajectory content indicating the estimated trajectory of the in-lane traveling to be superimposed only on a road surface of a subject vehicle lane on which the vehicle is currently traveling, without displaying on a road surface of an adjacent lane as a destination lane of the lane change; and display the lane change content indicating the estimated trajectory of the lane change only on the road surface of the adjacent lane.

27. A non-transitory computer-readable storage medium which stores program instructions for controlling a head-up display of a vehicle, the program instructions configured to cause one or more processors to:

acquire lane change information related to a lane change of the vehicle from a lane change control unit that control the lane change of the vehicle; and in response to acquiring the lane change information, display a lane change content indicating an estimated trajectory of the lane change to be superimposed on a road surface as a superimposition target, based on the lane change information, wherein when an execution section of the lane change by the lane change control unit is within an angle of view of the head-up display, the lane change content is displayed to superimpose on the road surface including at least a part of the execution section, and when the execution section is outside the angle of view and the lane change to a destination lane is in a standby state awaiting movement to the destination lane to become available, a change standby content indicating that the lane change is in the standby state is displayed on the display superimposed on a road surface of the destination lane inside the angle of view in a mode different from the lane change content that is displayed when the execution section is within the angle of view.

28. The non-transitory computer-readable storage medium according to claim 27, wherein the program instructions are further configured to cause the one or more processors to:

acquire driving control information related to a driving control of the vehicle from a lane keeping control unit that controls an in-lane traveling of the vehicle to cause the vehicle to travel in a lane;

display an estimated trajectory content indicating an estimated trajectory of the in-lane traveling to be superimposed on a road surface as a superimposition target, based on the driving control information; and in response to acquiring the lane change information during the in-lane traveling, display the lane change content indicating the estimated trajectory of the lane change together with the estimated trajectory content, based on the lane change information.

29. The non-transitory computer-readable storage medium according to claim 27, wherein the program instructions are further configured to cause the one or more processors to:

acquire driving control information related to a driving control of the vehicle from a lane keeping control unit that controls an in-lane traveling of the vehicle to cause the vehicle to travel in a lane;

display an estimated trajectory content indicating an estimated trajectory of the in-lane traveling to be superimposed on a road surface as a superimposition target, based on the driving control information; and in response to acquiring the lane change information during the in-lane traveling, begin to display the lane change content indicating the estimated trajectory of the lane change based on the lane change information, after terminating display of the estimated trajectory content.

* * * * *